US012270331B2

(12) United States Patent
Riley

(10) Patent No.: US 12,270,331 B2
(45) Date of Patent: Apr. 8, 2025

(54) ROTARY ENGINE, PARTS THEREOF, AND METHODS

(71) Applicant: ASTRON AEROSPACE LLC, Derby, KS (US)

(72) Inventor: Matthew T. Riley, Wichita, KS (US)

(73) Assignee: ASTRON AEROSPACE LLC, Derby, KS (US)

( * ) Notice: Subject to any disclaimer, the term of this patent is extended or adjusted under 35 U.S.C. 154(b) by 0 days.

(21) Appl. No.: 18/587,705

(22) Filed: Feb. 26, 2024

(65) Prior Publication Data

US 2024/0344480 A1 Oct. 17, 2024

Related U.S. Application Data

(60) Provisional application No. 63/448,100, filed on Feb. 24, 2023, provisional application No. 63/458,974, filed on Apr. 13, 2023, provisional application No. 63/471,920, filed on Jun. 8, 2023.

(51) Int. Cl.

| | |
|---|---|
| ***F02B 53/04*** | (2006.01) |
| ***F01C 11/00*** | (2006.01) |
| ***F01C 21/08*** | (2006.01) |
| ***F02M 25/028*** | (2006.01) |
| ***F02M 26/04*** | (2016.01) |
| ***F02M 27/04*** | (2006.01) |

(52) U.S. Cl.

CPC ............ *F02B 53/04* (2013.01); *F01C 11/004* (2013.01); *F01C 21/08* (2013.01); *F02M 25/028* (2013.01); *F02M 26/04* (2016.02); *F02M 27/04* (2013.01)

(58) Field of Classification Search

CPC ...... F02B 53/04; F02M 26/04; F02M 25/028; F02M 27/04; F01C 11/004; F01C 21/08

See application file for complete search history.

(56) References Cited

U.S. PATENT DOCUMENTS

| | | | | |
|---|---|---|---|---|
| 9,334,793 | B1 * | 5/2016 | Marc | F01C 1/12 |
| 2015/0308272 | A1 * | 10/2015 | Rolus Borgward | F01C 21/18 123/210 |

FOREIGN PATENT DOCUMENTS

| | | | | |
|---|---|---|---|---|
| CN | 111255561 A * | 6/2020 | F02B 53/08 |
| RU | 2551718 C2 | 5/2015 | |
| WO | WO-2022086348 A1 * | 4/2022 | A61M 16/0057 |
| WO | 2022096868 A1 | 5/2022 | |
| WO | 2024191587 A2 | 9/2024 | |

OTHER PUBLICATIONS

Astron Aerospace. "Introducing the Omega 1. A revolutionary engine." YouTube. Nov. 11, 2021. https://www.youtube.com/watch?v=gi7IOXQ7oyo.*

* cited by examiner

*Primary Examiner* — Ngoc T Nguyen
(74) *Attorney, Agent, or Firm* — Kutak Rock LLP

(57) ABSTRACT

The instant invention includes systems for and methods of maximizing efficiencies in an internal combustion engine while minimizing costs and weight for the same and while also minimizing maintenance requirements for the same. Such systems include a compression assembly for compressing fluid to a desired pressure for combustion (such as above 220 psi) and a combustion assembly configured to receive at least a portion of the compressed volume of air for each power stroke. In this way, the power stroke of the engine is independent of the compression stroke of the engine, thereby eliminating or otherwise minimizing transitional losses associated with the same.

20 Claims, 91 Drawing Sheets

FIG. 4

ROTARY ENGINE, PARTS THEREOF, AND METHODS

CROSS-REFERENCE TO RELATED APPLICATIONS

This application claims priority to U.S. Provisional Patent Application Ser. No. 63/448,100 filed Feb. 24, 2023, U.S. Provisional Patent Application Ser. No. 63/458,974 filed Apr. 13, 2023, and U.S. Provisional Patent Application Ser. No. 63/471,920 filed Jun. 8, 2023, the entire disclosures of which are incorporated herein by reference.

FIELD OF THE INVENTION

The present invention relates generally to engines. More specifically, the present invention is concerned with rotary engines, components thereof, and methods associated therewith.

BACKGROUND

Most existing internal combustion engines fall into two main categories—gas turbine engines and reciprocating engines—each with their own advantages and disadvantages. For instance, gas turbine engines have a very high power-to-weight ratio when compared to reciprocating engines. Gas turbine engines also tend to be smaller in size than equivalently-powered reciprocating engines. These advantages have led the aircraft industry to move almost exclusively (with the exception of smaller aircraft applications) to using gas turbine engines. Reciprocating engines, on the other hand, tend to be more fuel efficient and more responsive to changes in power settings. Reciprocating engines also tend to be less expensive than equivalently-powered gas turbine engines. These advantages have led the automotive industry to move almost exclusively to using reciprocating engines. While there are many differences between gas turbine engines and reciprocating engines, they each rely on fluid expansion associated with a combustion process.

Gas turbine engines, such as "jet" engines, utilize combustion of energy-rich fuel to generate heat energy, which in turn is utilized to power a turbine. More specifically, the heat energy from the combustion process is utilized to heat a volume of working fluid, thereby causing the working fluid to expand. The expanding working fluid is directed through blades of the turbine, thereby causing the turbine to rotate. Depending on the specific application of the gas turbine, the rotation of the turbine can be harnessed in a number of ways.

U.S. Pat. No. 2,168,726, the entire disclosure of which is incorporated herein by reference, teaches a "turbojet" having a turbine that powers a compressor. The compressor draws a stream of fluid (air) into a front portion of the turbojet and expels the fluid out a rear portion of the turbojet, thereby generating thrust. A portion of the stream of compressed fluid is diverted to a combustion chamber to enable a combustion process and to serve as the working fluid during a subsequent expansion process. After expanding through the turbine, thereby powering the compressor, the working fluid is rejoined with the main flow. The result is a high-velocity stream of exhaust gas ("jet propulsion").

U.S. Pat. No. 2,478,206 (to "Redding"), U.S. Pat. No. 2,504,414 (to "Hawthorne"), U.S. Pat. No. 2,505,660 (to "Baumann"), U.S. Pat. No. 2,526,409 (to "Price"), U.S. Pat. No. 2,526,941 (to "Fishbein"), U.S. Pat. No. 2,541,098 (to "Redding"), U.S. Pat. No. 2,702,985 (to "Howell"), and U.S.

Pat. No. 3,153,907 (to "Griffith"), the entire disclosure of each being incorporated herein by reference, teach various configurations of a "turboprop". Generally speaking, a turboprop is similar to a turbojet except that a turboprop harnesses a large portion of the fluid flow to drive a propeller. Accordingly, the jet propulsion is reduced when compared with the jet propulsion of a turbojet. In a similar fashion, turboshafts (such as those used for powering helicopter rotors or electric generators) harness even more of the fluid flow, thereby further decreasing or even eliminating the jet propulsion. Conversely, "turbofans" (whether high-bypass or low-bypass) harness the fluid flow to drive a large fan for the purpose of increasing or otherwise altering the jet propulsion.

Reciprocating engines also utilize combustion of energy-rich fuel to generate heat energy, but this energy is used to expand a combustion chamber, not power a turbine. As the combustion chamber expands, a piston is driven linearly away from a top-dead-center position to a bottom-dead-center position. At some point, depending on the configuration of the engine, the expanding gas is exhausted from the cylinder so that more fuel and air (a "charge") can be drawn into the chamber for a subsequent combustion process. Reciprocating engines may utilize external compression sources (such as by way of a supercharger, a turbocharger, or the like), but compression is generally obtained by way of moving the piston from bottom-dead-center to top-dead-center prior to combustion. In this way, the piston reciprocates between bottom-dead-center and top-dead-center, giving the engine its name.

While the reciprocating action of a reciprocating engine increases costs and maintenance due to its complex mechanical motion (as opposed to the relatively simple rotation of a turbine), its combustion chamber is only subjected to intermittent periods of combustion, thereby allowing the combustion chamber to cool and/or preventing the combustion chamber from overheating. Conversely, gas turbine engines utilize continuous combustion (the combustion chamber of a gas turbine engine is sometimes referred to as a "burner"), often requiring expensive materials and routine maintenance to ensure that the engine can withstand the prolonged periods of high temperatures. Accordingly, it would be beneficial to have a system for and a method of enabling intermittent combustion without requiring complex mechanical motion.

Gas turbine engines operate using the Brayton cycle, which is a constant pressure cycle that requires a compressor, a burner (combustion chamber), and an expansion turbine. The efficiency of the Brayton cycle is highly dependent on the pressure inside the combustion chamber relative to environmental pressure. Reciprocating engines, on the other hand, generally operate using the Otto cycle or the Diesel cycle, the efficiency of each being highly dependent on the compression ratio of the same.

U.S. Pat. No. 367,496 (to "Atkins"), the entire disclosure of which is incorporated herein by reference, teaches a reciprocating engine having an expansion ratio that is larger than its compression ratio (Atkins teaches a 2 to 1 ratio was "found to give good results"), thereby utilizing a thermodynamic cycle now known as the Atkins cycle. While the Atkinson cycle provides improved fuel efficiency over a comparable Otto cycle engine, it suffers from loss of power at low speeds. U.S. Pat. No. 2,817,322 (to "Miller"), the entire disclosure of which is incorporated herein by reference, teaches a supercharged engine that "rejects" air from the cylinder during the compression stroke (such as by leaving a valve open during a first portion of the compression stroke) so that "substantially less air than the cylinders full volumetric capacity will be entrapped" during combustion. In this way, the Miller cycle obtains an expansion ratio that exceeds the compression ratio, similar to the Atkinson cycle without (or with less of) the power loss at low speeds. Unfortunately, the Miller cycle still suffers from inefficiencies, such as the general inefficiencies of a reciprocating engine and the specific inefficiencies associated with what is effectively an extended intake stroke of the Miller cycle. Consequently, it would be beneficial to have a system for and a method of maximizing efficiencies of an internal combustion engine.

SUMMARY

This application incorporates by reference in their entireties each of the following (collectively, the "Astron Engine Technology"): U.S. patent application Ser. No. 16/732,318, filed Jan. 1, 2020, and now U.S. Pat. No. 11,384,684, which claims priority pursuant to 35 U.S.C. 119 (e) to U.S. Provisional Patent Application Ser. Nos. 62/884,771, filed Aug. 9, 2019, and 62/894,567, filed Aug. 30, 2019, the entire disclosures of which are incorporated herein by reference; U.S. patent application Ser. No. 17/389,239, filed on Jul. 29, 2021, which claims priority pursuant to 35 U.S.C. 119 (e) to U.S. Provisional Patent Application Ser. No. 63/058,391, filed Jul. 29, 2020, the entire disclosure of which is incorporated herein by reference; U.S. Provisional Patent Application Ser. No. 63/279,163, filed Nov. 14, 2021.

The instant invention includes systems for and methods of maximizing efficiencies in an internal combustion engine while minimizing costs and weight for the same and while also minimizing maintenance requirements for the same. Such systems include a compression assembly for compressing fluid to a desired pressure for combustion (such as above 220 psi) and a combustion assembly configured to receive at least a portion of the compressed volume of air for each power stroke. In this way, the power stroke of the engine is independent of the compression stroke of the engine, thereby eliminating or otherwise minimizing transitional losses associated with the same.

Unlike gas turbines utilizing the Brayton cycle, the Astron Engine Technology utilizes a cycle (the "Riley cycle") that does not require continuous combustion to rotate a turbine. Instead, the Riley cycle enables intermittent combustion in association with maintaining continuous rotational motion without requiring reciprocating action. In this way, the Riley cycle realizes the benefits of reciprocating engines along with the benefits of gas turbine engines.

Unlike reciprocating engines using the Otto and Diesel cycles, the present invention does not require an expansion stroke to alternate with a compression stroke. Instead, the Riley cycle allows for repetitive expansion strokes, each expansion stroke being associated with a partial revolution of a power rotor. In this way, engines utilizing the Riley cycle are easier to produce, are more fuel efficient, and require less maintenance.

The Riley cycle is capable of maximizing expansion ratios of the fuel; but unlike the Atkins cycle, the Riley cycle does not require complex reciprocating components. Instead, the Riley cycle is capable of maximizing expansion ratios by controlling the length of time an inlet valve is open, thereby controlling the size of a charge. In this way, the Riley cycle provides users with the flexibility to use alternative fuels and/or to change fuels if and as required and/or desired.

The present invention is capable of controlling efficiency of the system by controlling the amount of time an inlet valve remains open, which the prior art incapable of doing. For example, the Miller cycle maintains the inlet valve in an open position while a compression chamber is shrinking. In other words, the Miller cycle obtains its efficiency by causing a portion of a charge to be expelled from a combustion chamber prior to compression of the charge. This approach necessarily requires the expelled portion of the charge to be first drawn into the chamber prior to being expelled from the chamber. The Riley cycle does not require expelling any portion of the charge. Instead, the Riley cycle obtains its efficiency by controlling the initial size of the charge (by controlling the timing for opening and inlet valve and by further controlling the amount of time the inlet valve is open), thereby eliminating the need to discharge any portion of the charge.

A compression assembly of some embodiments of the present invention includes a compression rotor having a blade. The compression rotor blade is driven from an intake port towards an isolator rotor of the compression assembly to compress the intake fluid. The compressed fluid (or a portion thereof) ultimately is allowed to flow from the compression assembly into the combustion assembly as a charge. A combustion assembly of the present invention generally includes a power rotor having a blade. Upon a charge being ignited adjacent to the blade, the power blade is driven towards an exhaust port, thereby driving the power rotor. The combustion assembly is configured such that movement of the blade to the exhaust port maximizes usable energy (expansion) from the first charge. Upon the blade moving past the exhaust port, the expanded fluid of the charge exits through the exhaust port.

The combustion assembly of various embodiments disclosed herein further includes an isolator rotor that is positioned behind the ignition point and is configured to prevent, or otherwise inhibit, expansion of charges away from a respective blade. In some embodiments, the isolator rotor is positioned just beyond the exhaust port such that it prevents exhaust gasses from bypassing the exhaust port. Each isolator rotor of both the compression and combustion assemblies includes at least one receptacle for receiving one or more blade of the respective rotor, thereby allowing the rotor to rotate beyond the isolator rotor(s). In this way, the combustion assembly is capable of performing continuously repeating power strokes while also being capable of skipping one or more power stroke if and as desired or required.

In some embodiments, the engine is capable of idling at 2,500 revolutions per minute. In some embodiments, the engine has a linear power and torque curve. In some embodiments, the engine redlines at or above 30,000 revolutions per minute. In some embodiments, the engine facilitates independent control over injection per cycle. In some embodiments, parasitic losses are dramatically reduced over existing technology. In some embodiments, the engine is capable of stratified injection and ignition. In some embodiments, the engine avoids issues associated with reciprocating probabilities. In some embodiments, the engine avoids issues associated with compressor stall. In some embodiments, the engine avoids issues associated with sealing. In some embodiments, the engine is capable of facilitating pre-chamber combustion. In some embodiments, the engine includes on the fly adaptive compression ratio capability, on the fly altitude compensation capability, and/or on the fly adaptive fuel technology. In some embodiments, the engine is air cooled. In some embodiments, heat signatures of the engine are virtually nonexistent. In some embodiments, the engine provides improved power to weight ratios and/or improved emissions when compared with existing technologies. In some embodiments, the engine operates while emitting virtually no NOx emissions.

Many of the embodiments of the Astron Engine Technology disclosed in the patents and patent applications referred to above and incorporated by reference utilize a rotary valve component that is designed to control the fluid flow out of the compression assembly and into the combustion assembly at one or more appropriate time while preventing or otherwise inhibiting such fluid flow at other times. The instant invention includes various embodiments of the Astron Engine Technology in which a rotor of either the compression assembly or the combustion assembly are used instead of a separate rotary valve to control the fluid flow out of the compression assembly and/or into the combustion assembly. In some embodiments, an isolator rotor of the compression assembly is used to control the fluid flow out of the compression assembly. In other embodiments, an isolator rotor of the combustion assembly is used to control the fluid flow into the compression assembly. In other embodiments the power rotor(s) of the combustion and/or compression assemblies are used to control the fluid flow out of the compression assembly and/or into the combustion assembly. In some embodiments a combination of power and/or isolator rotors from the combustion and/or compression assemblies is used to control the fluid flow out of the compression assembly and/or into the combustion assembly.

The structures of the instant invention in which the rotors of the compression and/or combustion assemblies is utilized to control the flow of fluid out of the compression assembly and/or into the combustion assembly are particularly well suited for the use of hydrogen and/or other gaseous fuels. Embodiments of the Astron Engine Technology utilizing a rotary valve typically are preferred when liquid fuels are utilized to provide additional sealing between the compression and combustion assemblies. Nevertheless, it will be appreciated that various embodiments of the inventive concept of the instant invention in which no rotary value is utilized will be used with liquid fuels.

In various embodiments of the inventive concept seals are included on edges of various surfaces of the rotors, components, and/or housing of the compression and/or combustion assemblies to improve sealing between the assemblies and/or within the respective housings and related components.

In some embodiments a ceramic or plasma (or other suitable substance) layer is added to one or more components of the inventive concept to reduce and/or prevent metal fatigue.

In some embodiments water and/or other fluid is injected into the intake of the engine of the inventive concept to help reduce temperatures during combustion. In some embodiments a light amount of steam is utilized within the compression and/or combustion assemblies for sealing and/or cool purposes.

In some embodiments of the inventive concept exhaust is recycled back into the intake of the engine. The amount of exhaust in various embodiments varies from a minimal amount to 100% of the exhaust gases. In some embodiments the amount of exhaust being redirected into the intake is variable. In some such embodiments, the amount of exhaust recycled into the intake is controlled based upon MAP sensor, pressure, mass airflow, humidity, EGR, butterfly valves, and/or other sensor readings and valving structures to optimize desired intake parameters. In some embodiments of the inventive concept, including embodiments in which hydrogen fuel is utilized, the exhaust will include water vapor/steam and oxygen. Recycling the exhaust into the engine provides multiple benefits, including increased oxygen levels for the intake fluid as well as warmer intake fluid. In addition the steam/water vapor or heavier intake fluid creates a natural seal during operation of the engine without the need (in some embodiments) to add any additional water within the system. In some embodiments of a hydrogen fueled engine, an electrolyzer is included within the structure that recycles exhaust gases back to the intake, and is utilized to produce hydrogen from the exhaust vapors to be used as fuel for the engine.

It will be appreciated that various embodiments of the inventive concept utilize various types of ignition including spark, glow plugs and/or other heat or compression ignition, as well as other forms of ignition now known or hereafter discovered. In various embodiments of the inventive concept, ignition occurs at various locations within the engine, including within the combustion assembly, and/or within a transition channel between the compression and combustion assemblies. In some embodiments the ignition source is located on the combustion side of the transition channel within the transition channel. In some embodiments, the ignition source is located near or at the outlet of the transition channel within the combustion assembly.

In various embodiments of the inventive concept, Fuel is injected/added into the engine at various locations, including within the compression assembly, within the combustion assembly, and/or within a transition channel between the compression and combustion assemblies.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in instant application.

FIG. 22 shows a small notched cutout on the right side of the isolator rotor at the bottom of the receptacle portion. This cutout is included in some embodiments to aid in the flow of fluid from the compression chamber into the transition channel.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 91:
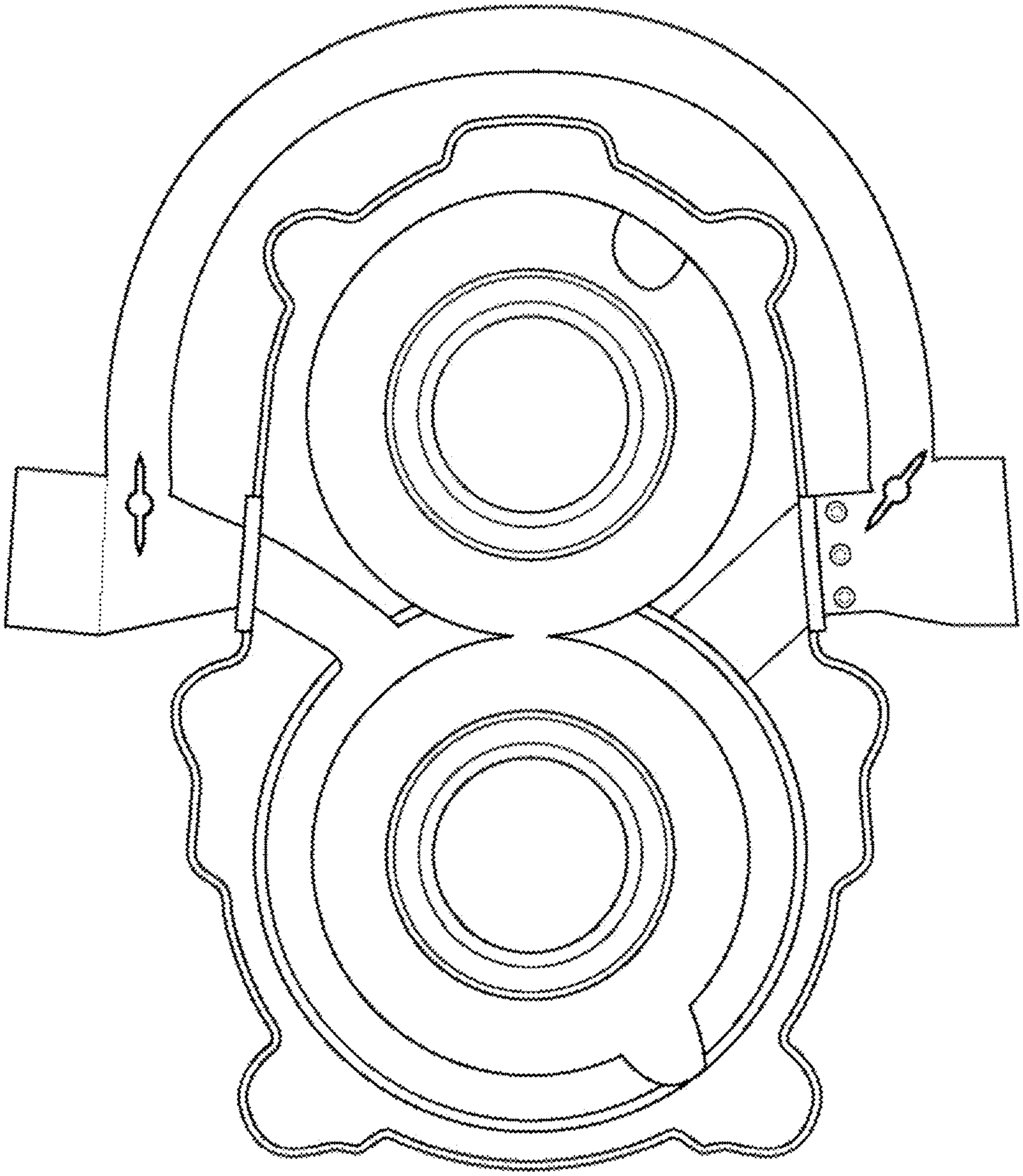
FIG. 91 is a front view of an embodiment of an engine of the inventive concept in which exhaust gases are capable of being recycled back into the intake of the engine.

FIG. 91 shows an exemplary embodiment of an engine of the inventive concept in which exhaust gases are capable of being recycled back into the intake of the engine. In the embodiment shown in FIG. 91, butterfly valves are located at a “t” branch near the engine exhaust and also at a t-branch near the engine intake. In some embodiments, butterfly valves are included at both locations, in other embodiments, only a single butterfly valve is utilized at either the exhaust location or at the intake location, depending upon the desired level of intake/exhaust control. The valve at the exhaust side is capable of closing off the transfer tube from exhaust to intake, such that no exhaust gas is recycled back to the intake, and also capable of closes off the outlet to atmosphere, such that 100% of the exhaust gas is recycled to the intake side of the engine, and/or is capable of controlling the amount of exhaust case to the intake side at any amount from 0-100%. The valve on the intake side likewise is capable of controlling the amount of gas from the transition tube into the intake, anywhere from 100% fresh air intake, to 100% transition tube gas into the engine intake. In the embodiment shown in FIG. 91, an electrolyzer is located at the engine intake to produce hydrogen from the steam/water vapor being pulled into the intake. In the embodiment shown if FIG. 91 an anode is located centrally within the intake, and a cathode is located around the perimeter of the intake. It will be appreciated that in alternative embodiments, the anode is located toward the perimeter and the cathode is located centrally. In other various embodiments, the electrolyzer components are located near the exhaust of the engine. In other embodiments the electrolyzer components are located at a location along the length of the transfer tube. It will be appreciated that in various such embodiments the electrolyzer is capable of being located at any position along the length of the transfer tube. In some embodiments the cross-sectional shape of the transfer tube is circular. In other embodiments the cross-sectional shape of the transfer tube is square, rectangular, triangular, and/or other shapes. In some embodiments, the cross-sectional shape of the electrolyzer is circular. In other embodiments, the cross-sectional shape of the electrolyzer is square, rectangular, and/or other shapes. In some embodiments, the electrolyzer is in the shape of a square box, with cathode and anodes being long flat plates. In some embodiments, the exhaust gas includes water, vapor, steam, or other water fluid/gas state combinations. In some embodiments, additional water is injected into the system for use in hydrogen production.

Figure 1:
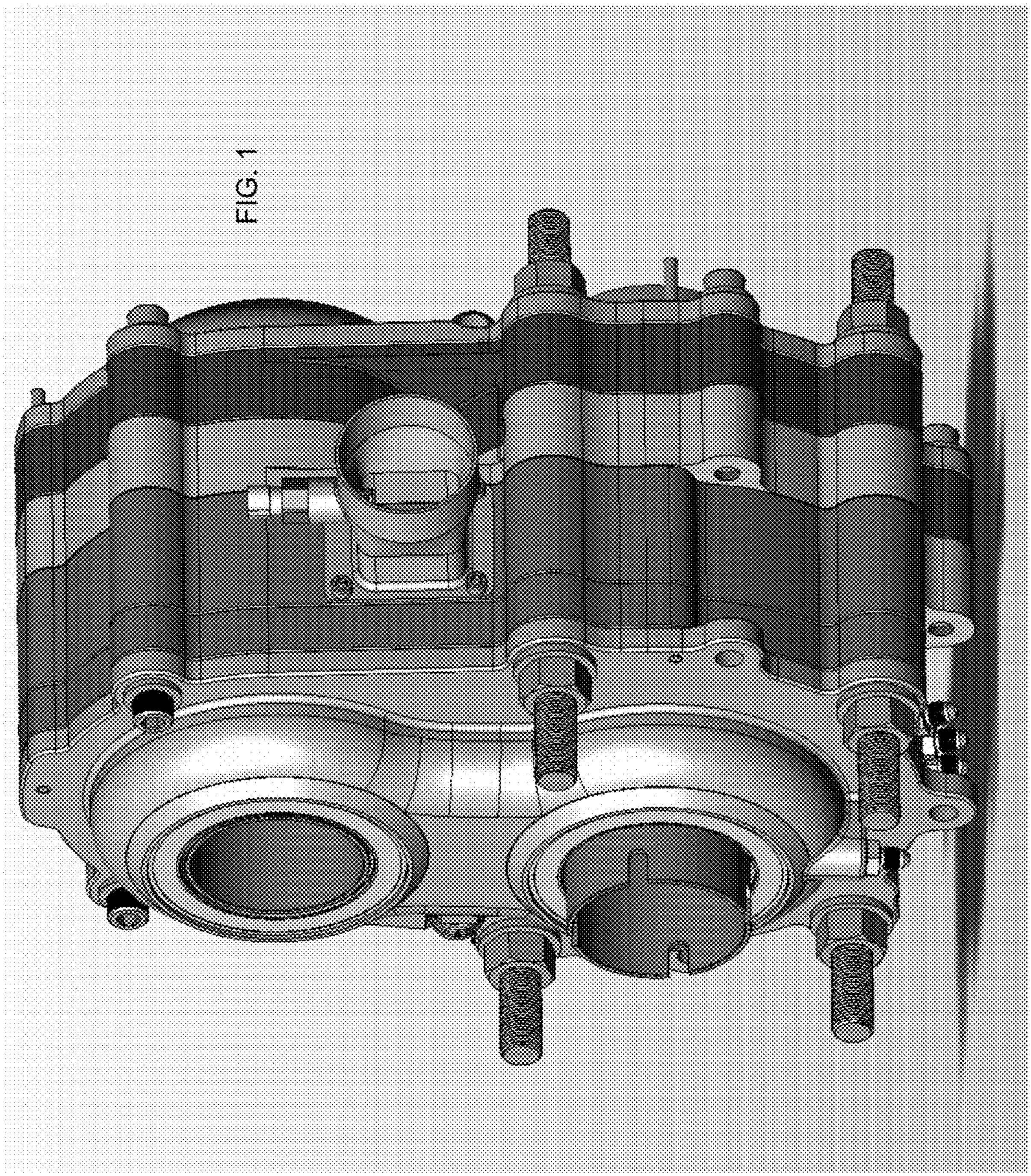
FIG. 1 is a perspective view of an embodiment of an engine of the inventive concept.
Figure 2:
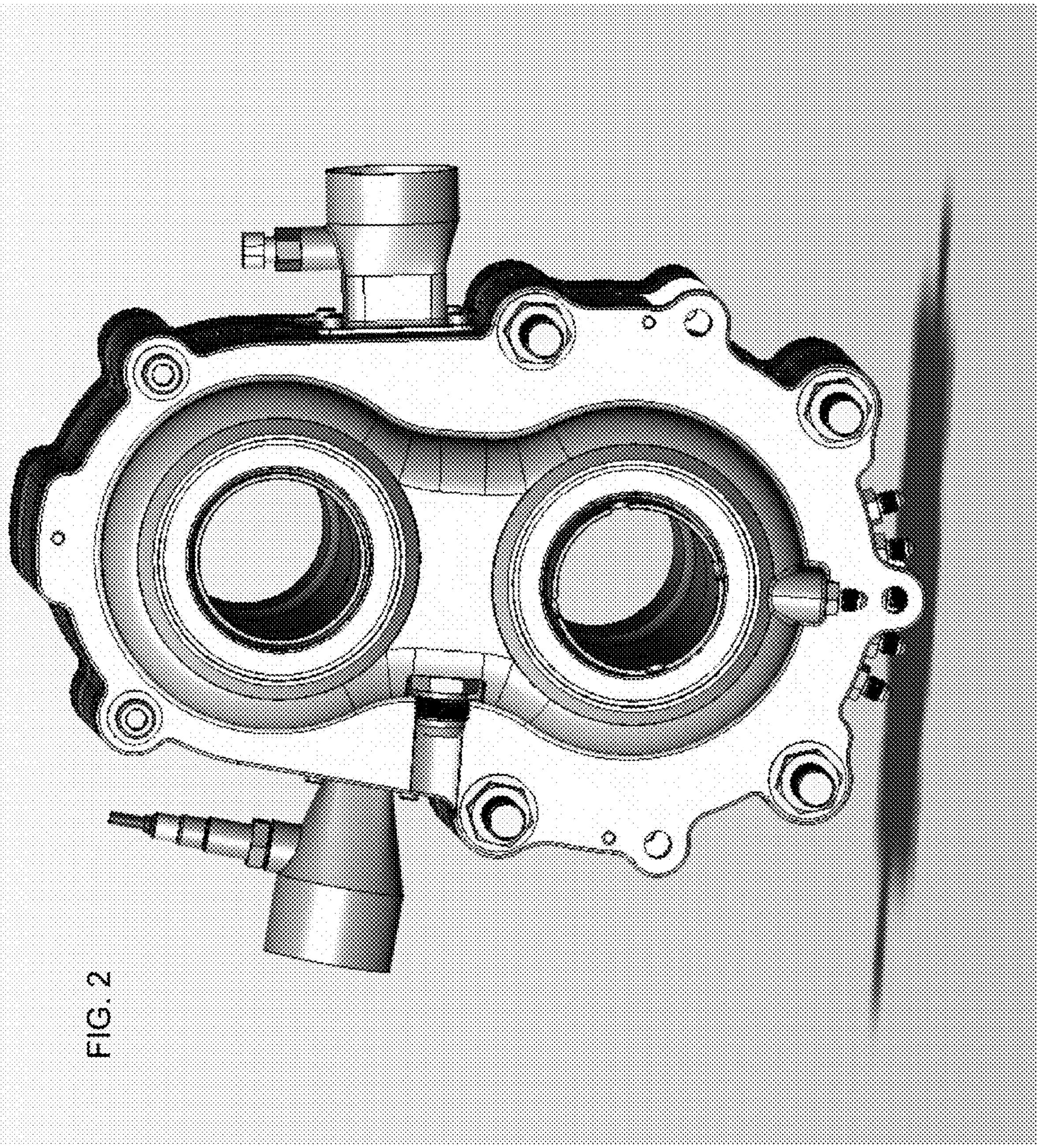
FIG. 2 is a left side perspective view of the engine of FIG. 1, showing the exhaust on the left of FIG. 2 and the intake on the right of FIG. 2.
Figure 3:
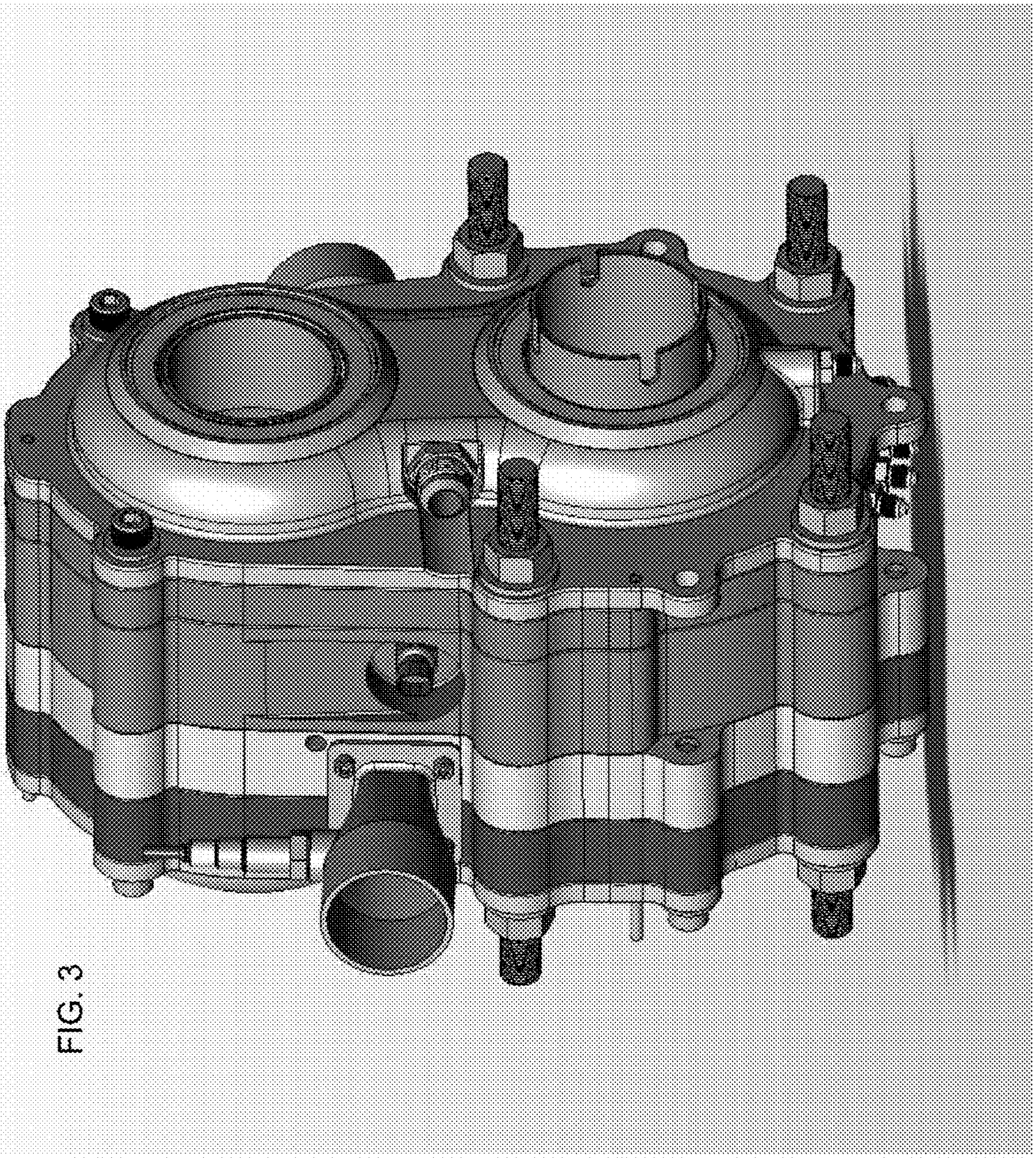
FIG. 3 is a back perspective view of the engine of FIG. 1 showing the exhaust coming out of the combustion assembly housing.
Figure 4:
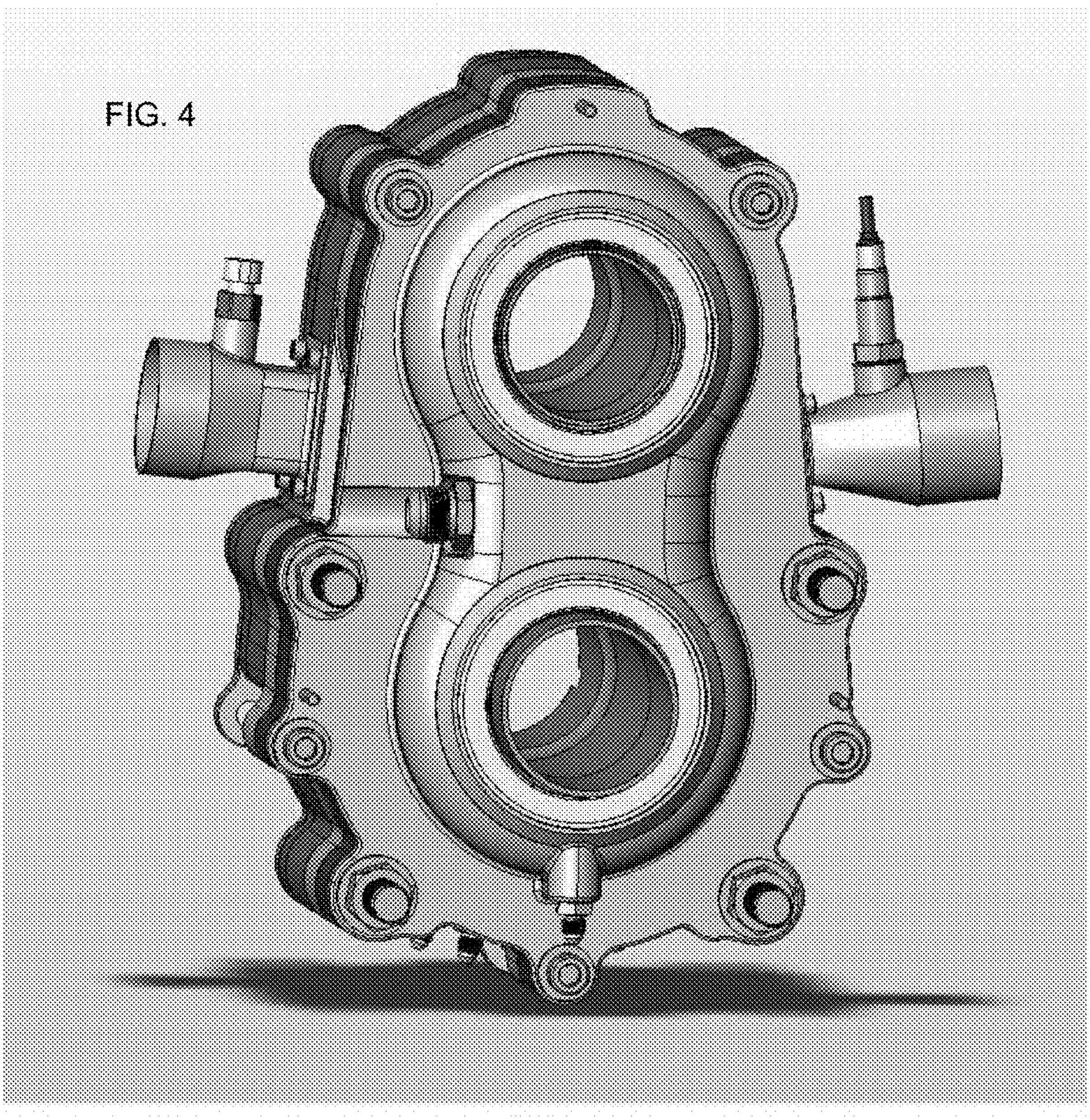
FIG. 4 is a right side perspective view of the engine of FIG. 1.

The intake is shown in FIG. 1 going into the green portion of the compression assembly housing. The dark gray section to the left of the green section is the other half of the compression assembly housing, which fits together like a clamshell with the green section. The light gray section to the right of the green section is a first half of the combustion assembly housing, and the red section to the right of that light gray section is the other half of the combustion assembly housing, which fits together like a clamshell with the light gray section. The left side (as shown in FIG. 1) surface of light gray section of the combustion assembly housing also acts as part of the compression assembly housing to provide a surface one which the power and isolator rotors of the compression assembly are located.

Figure 5:
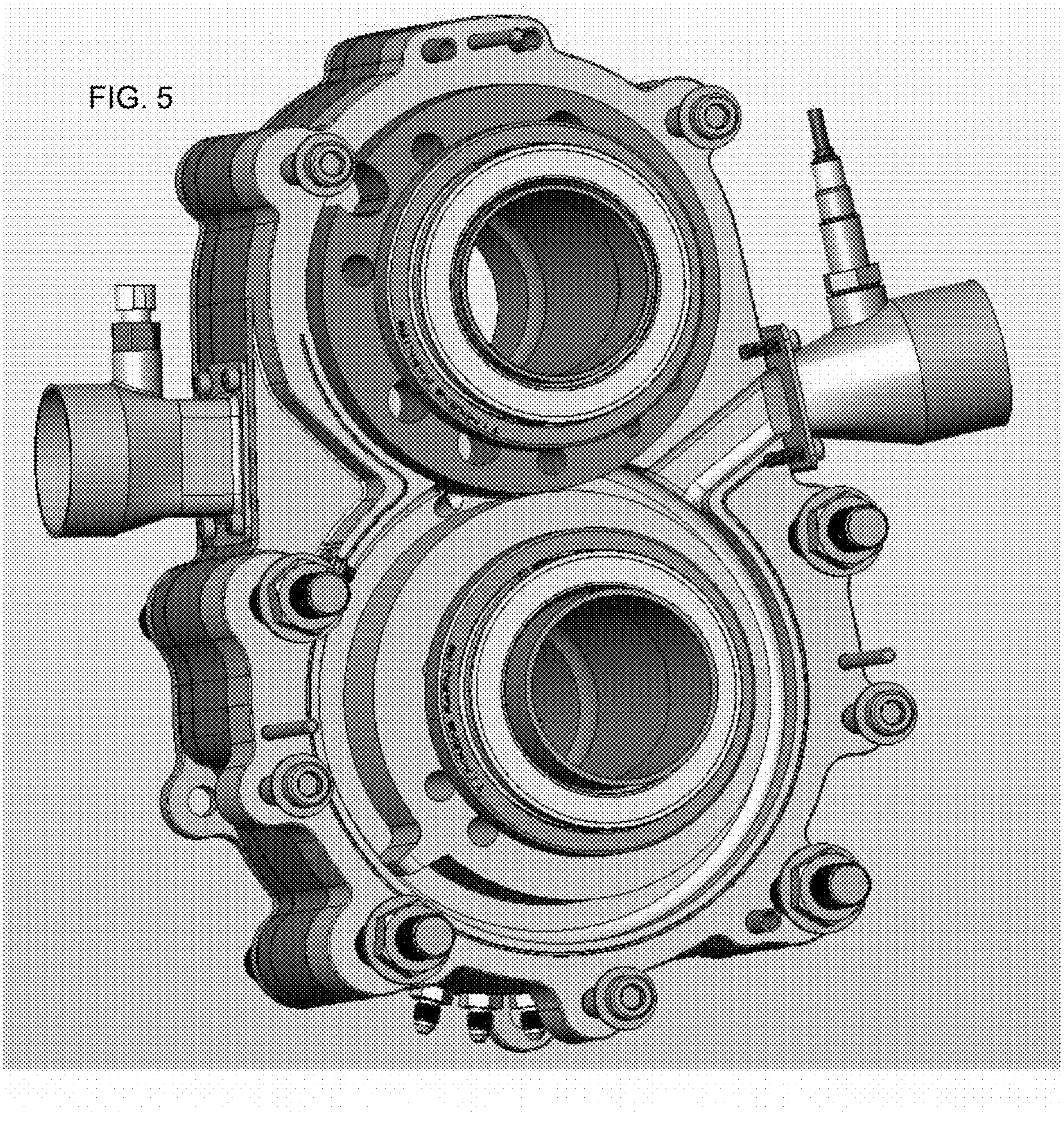
FIG. 5 is a right side perspective view of the engine of FIG. 1 with the red section portion of the combustion assembly housing removed showing the combustion power and isolator rotors.
Figure 6:
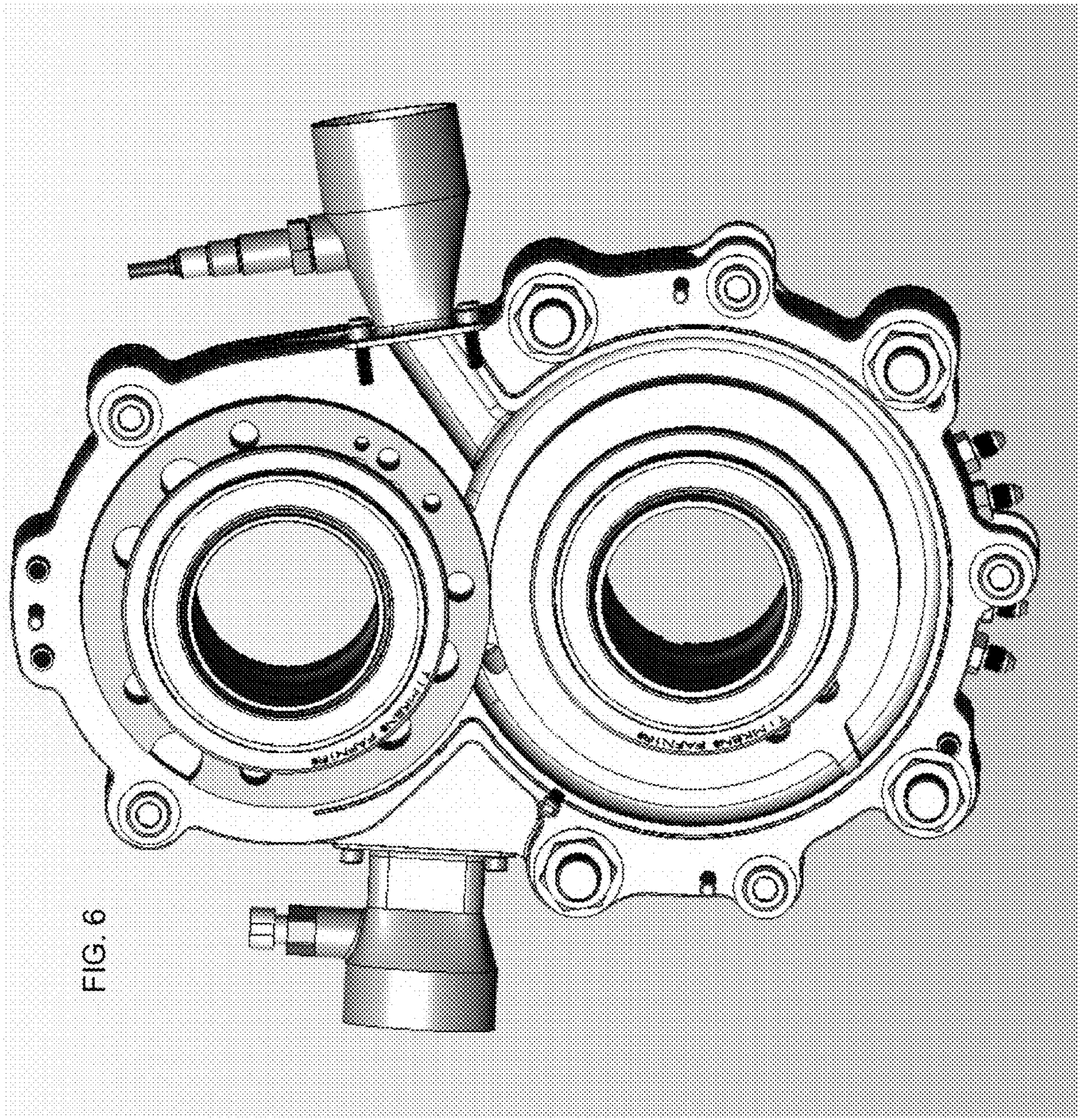
FIG. 6 is another right side perspective view of the engine of FIG. 1 with the red section portion of the combustion assembly housing removed
Figure 7:
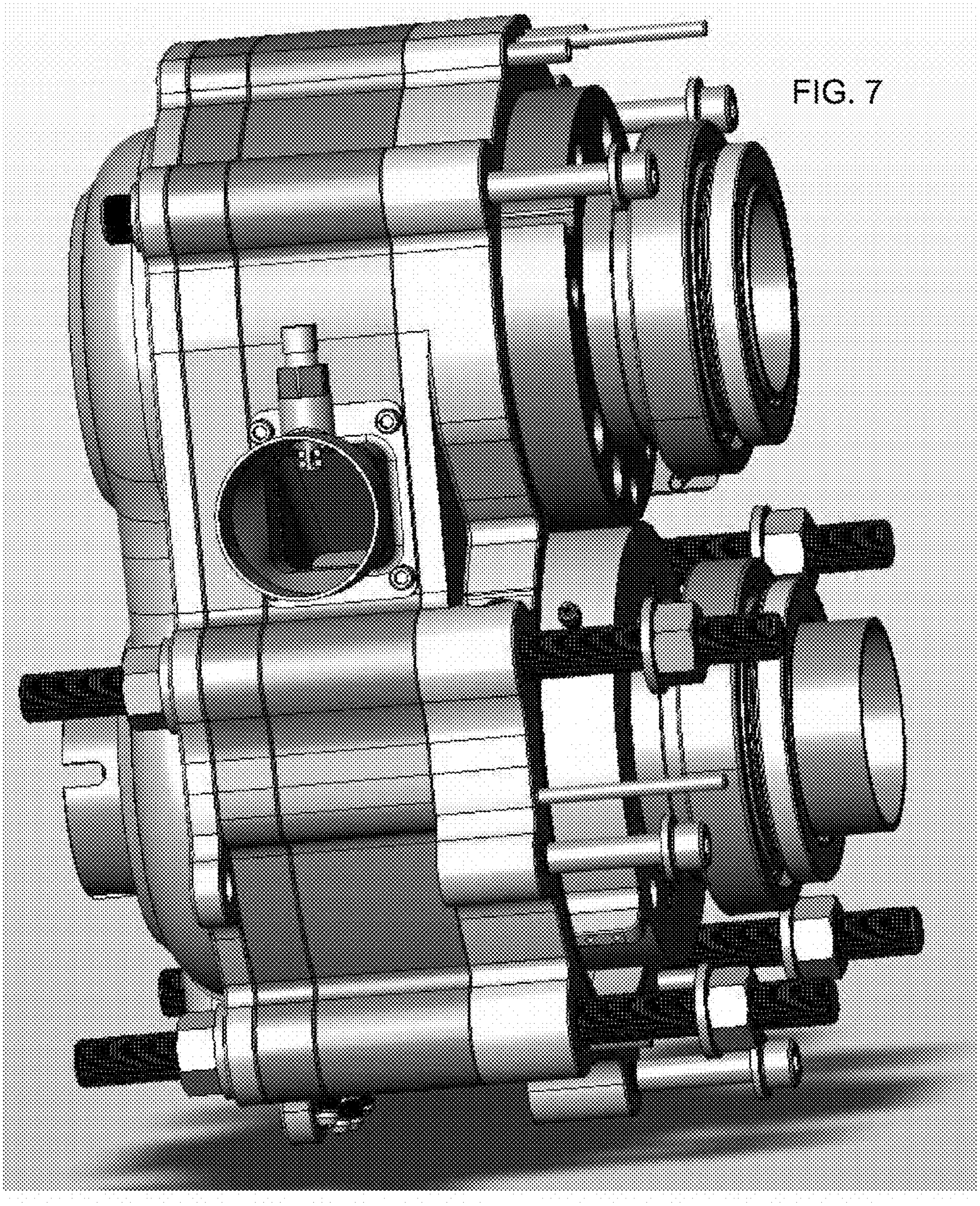
FIG. 7 shows a perspective view of the engine of FIG. 1 with the red section portion of the compression assembly removed.
Figure 8:
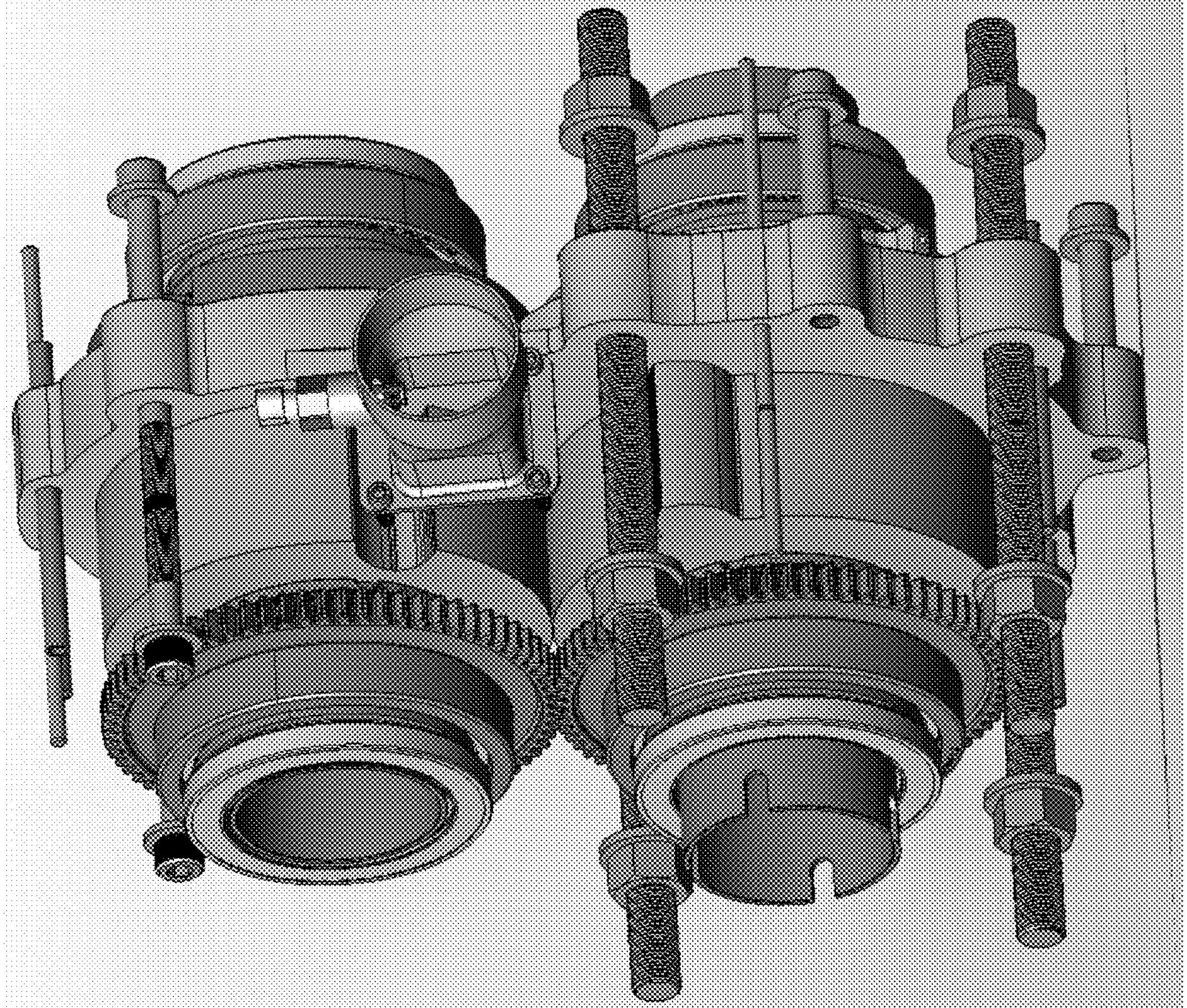
FIG. 8 shows a perspective view of the engine of FIG. 1 with both the red section of the compression assembly removed, as well as both sections of the compression assembly removed. The isolator and power rotors of the compression assembly are shown located along the left side surface of the grey section of the combustion assembly housing.
Figure 9:
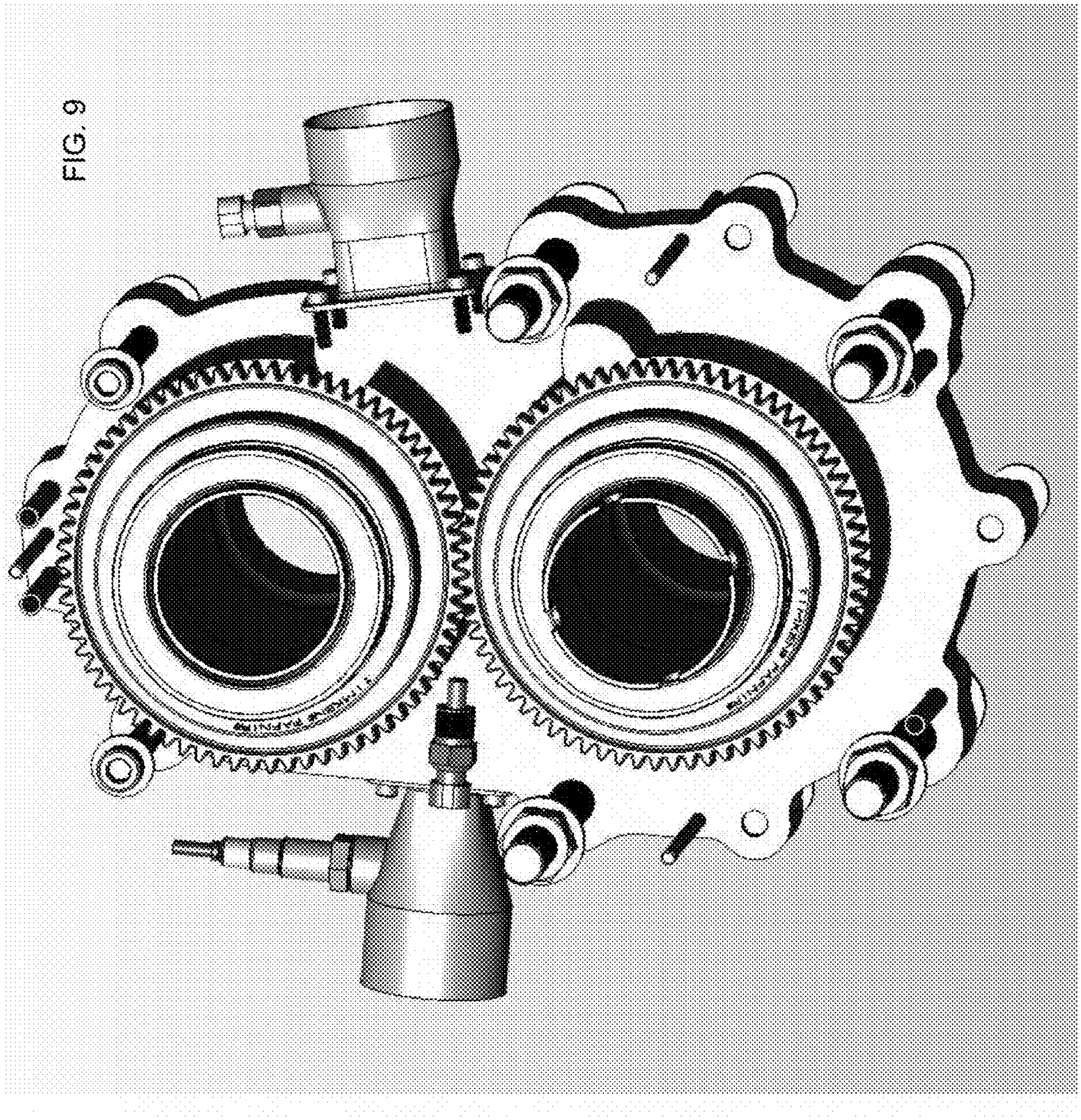
FIG. 9 shows a left side view of the engine of FIG. 8 with the combustion assembly housing removed.
Figure 10:
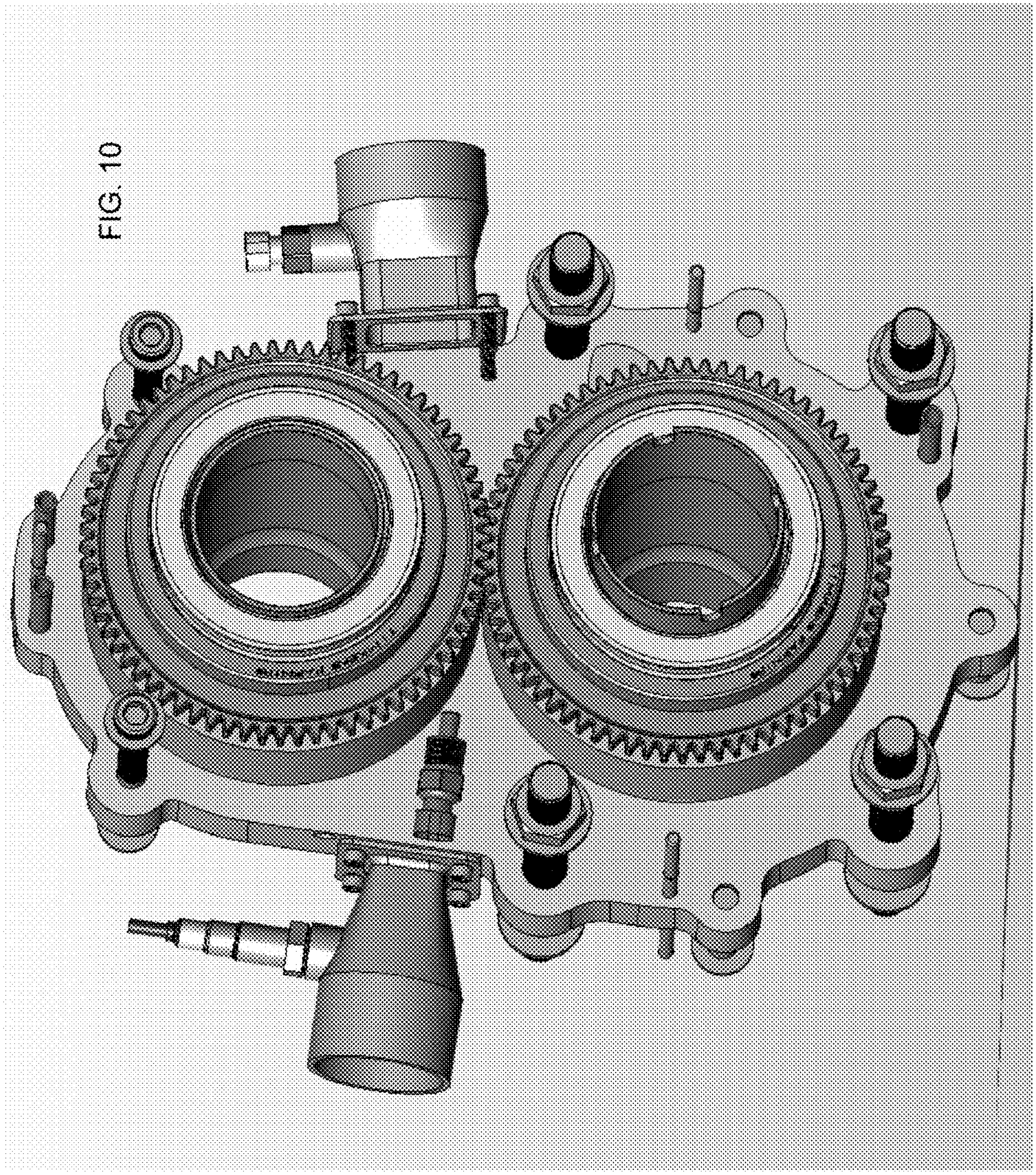
FIG. 10 shows another left side view of the engine of FIG. 8 with the combustion assembly housing removed.
Figure 11:
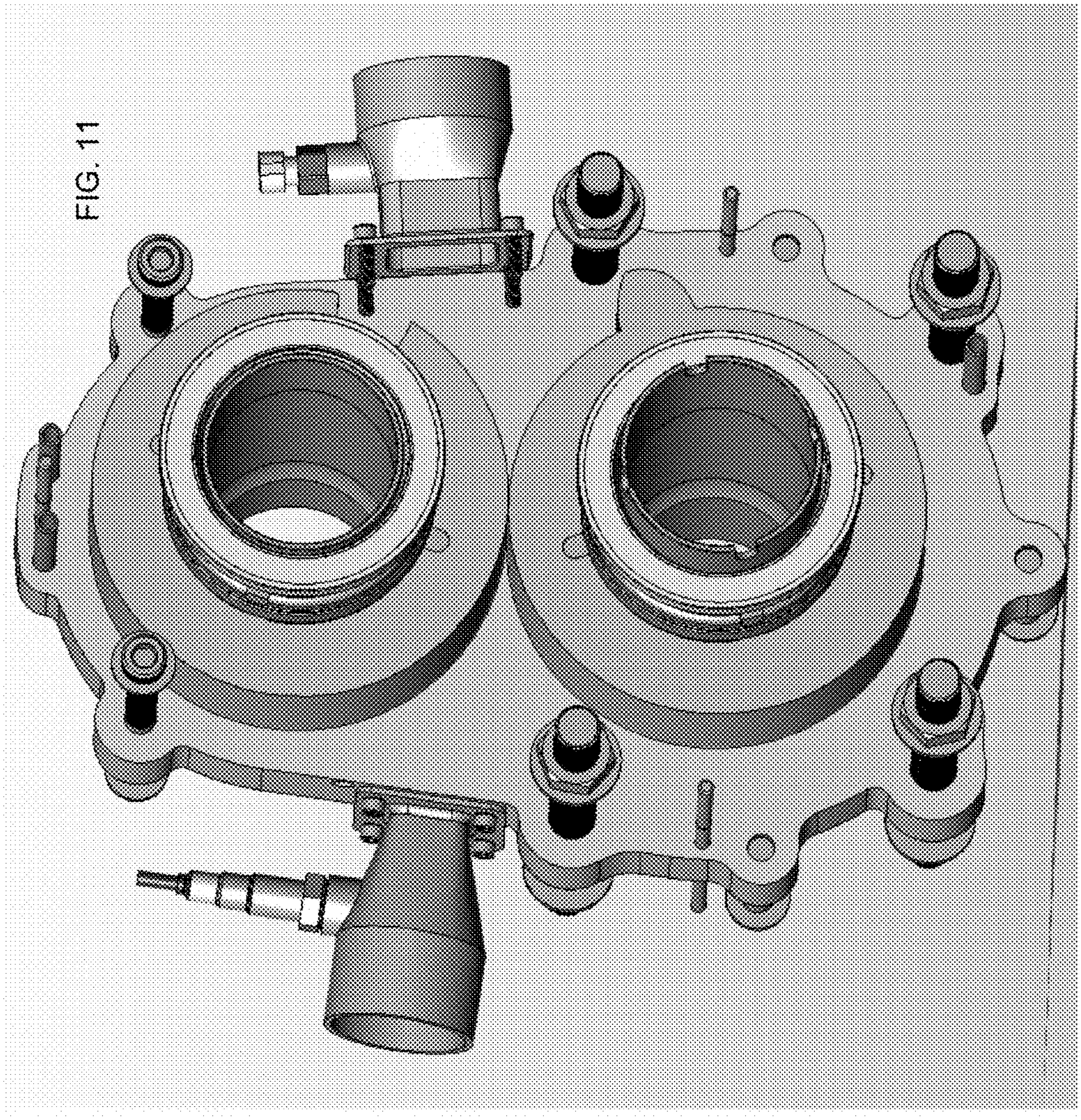
FIG. 11 shows another left side view of the engine of FIG. 8 with other parts removed to better show the compression isolator and power rotors.
Figure 12:
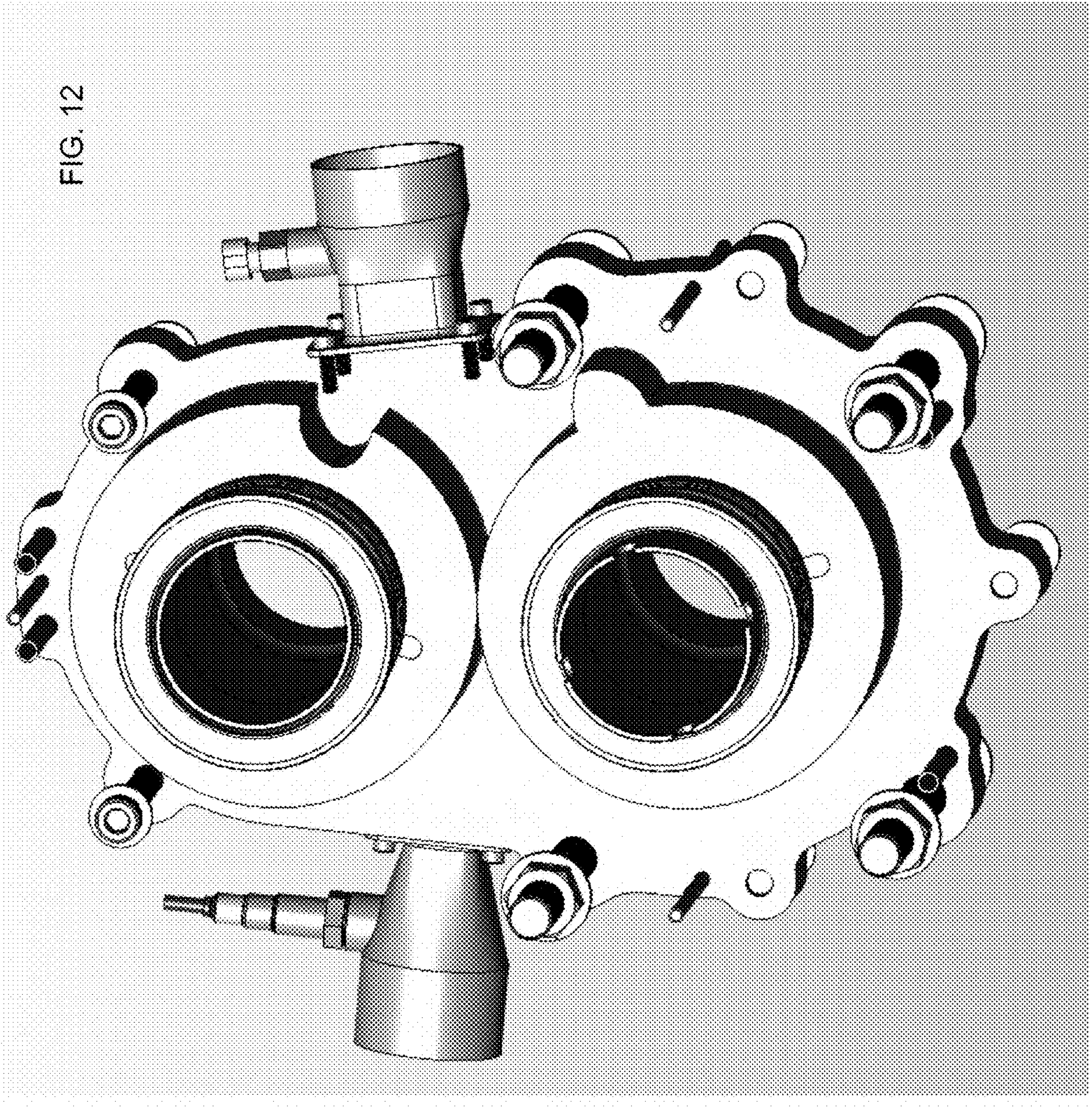
FIG. 12 shows another left side perspective view of the engine and the compression rotors.
Figure 13:
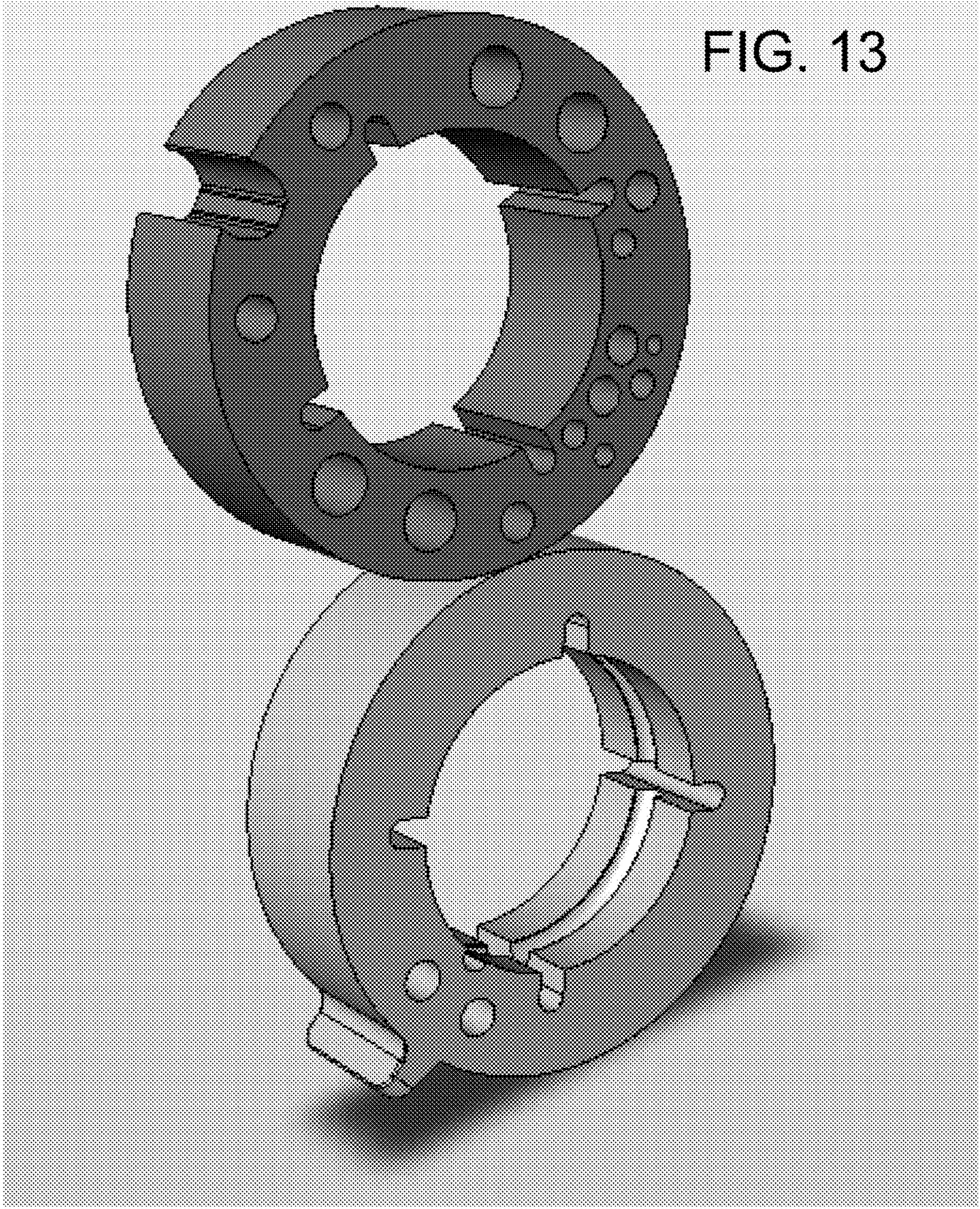
FIG. 13 shows a right side perspective view (as viewed from FIG. 1) of the combustion rotors.
Figure 14:
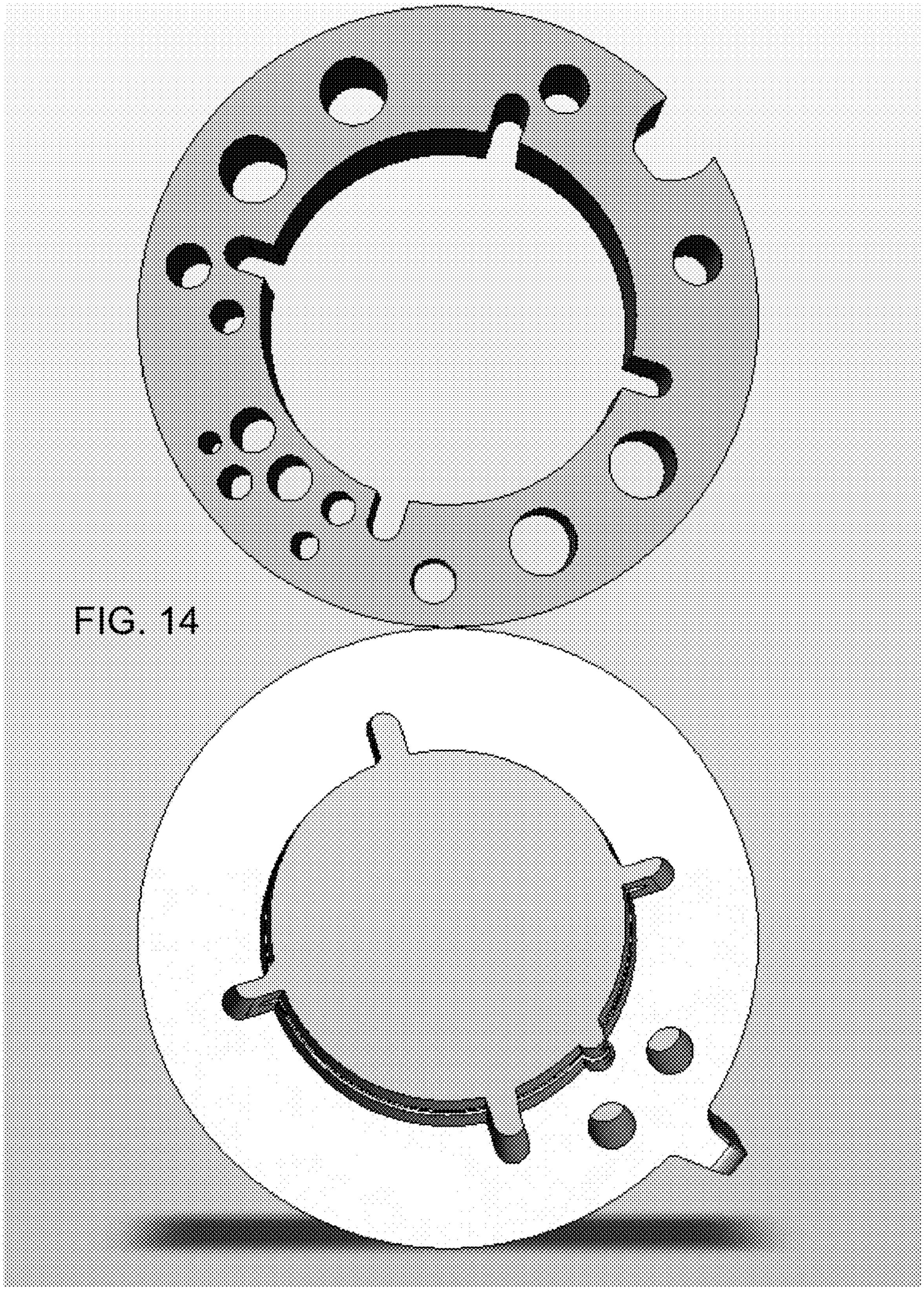
FIG. 14 shows a light side view (as viewed from FIG. 1) of the compression rotors.
Figure 15:
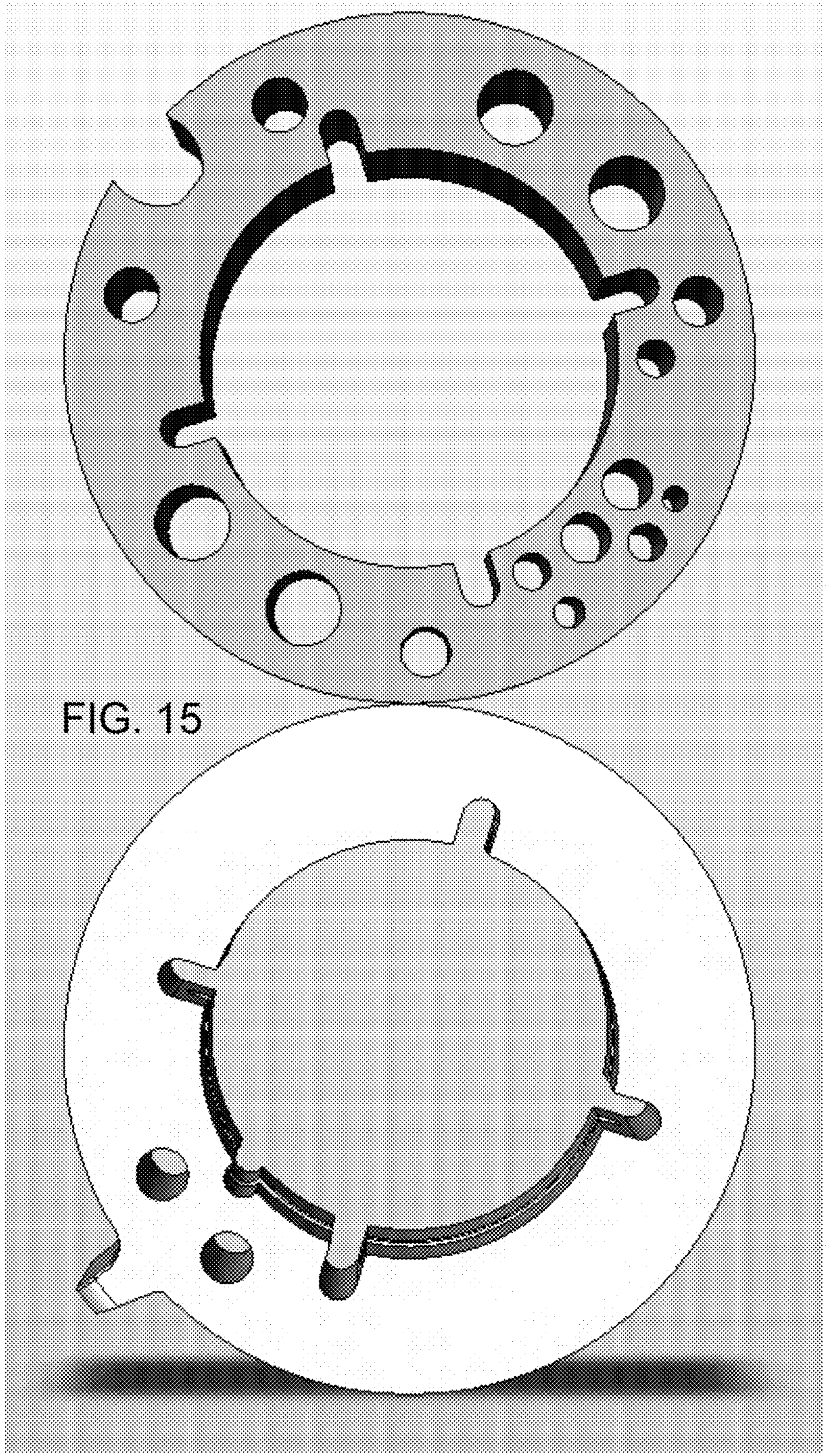
FIG. 15 shows a right side view (as viewed from FIG. 1) of the combustion rotors.
Figure 16:
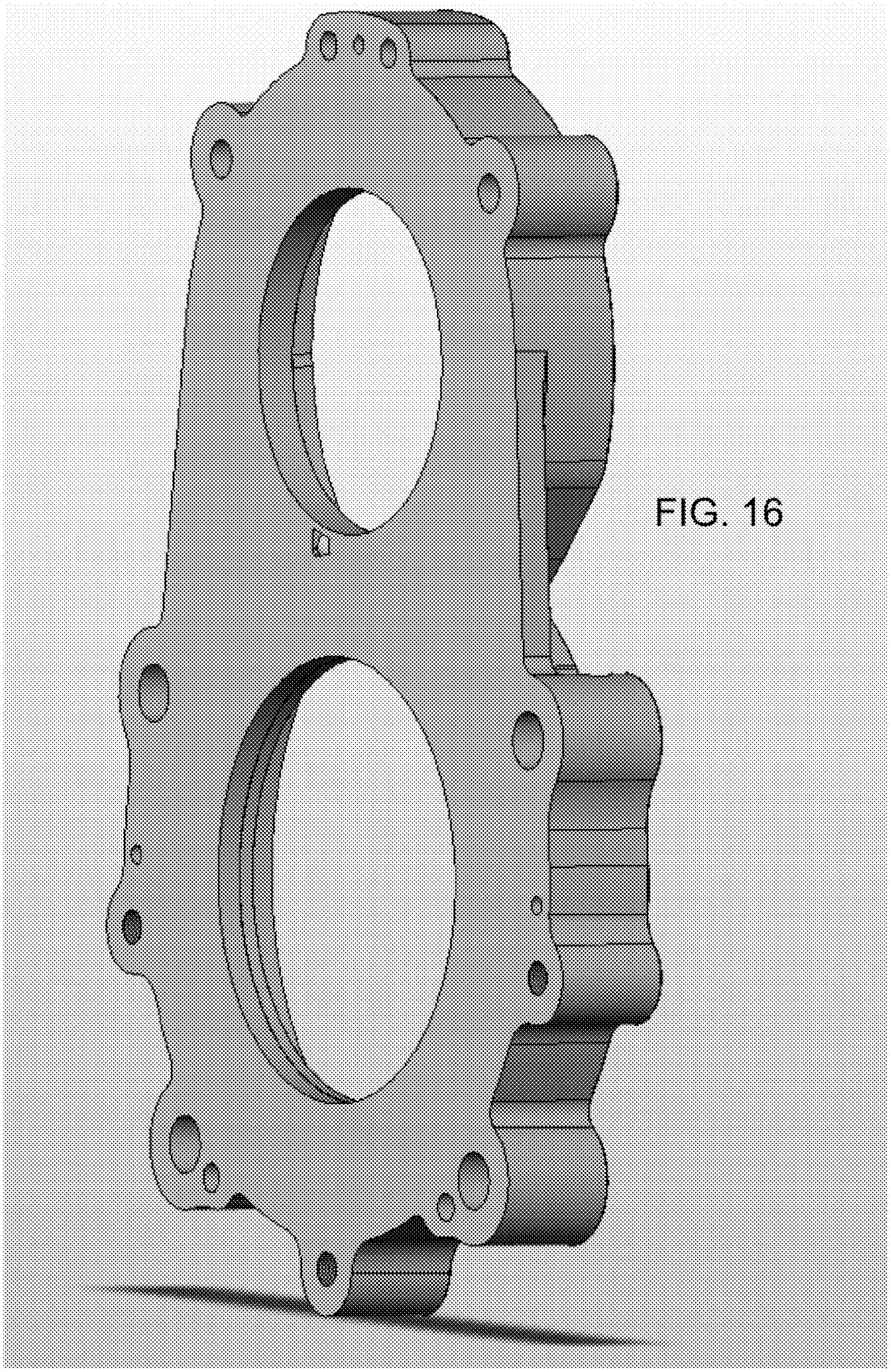
FIG. 16 shows a left side perspective view (as viewed from FIG. 1) of the light gray section of the combustion assembly housing. An opening for the transition channel to receive the compressed fluid from the compression assembly can be seen in FIG. 16.
Figure 17:
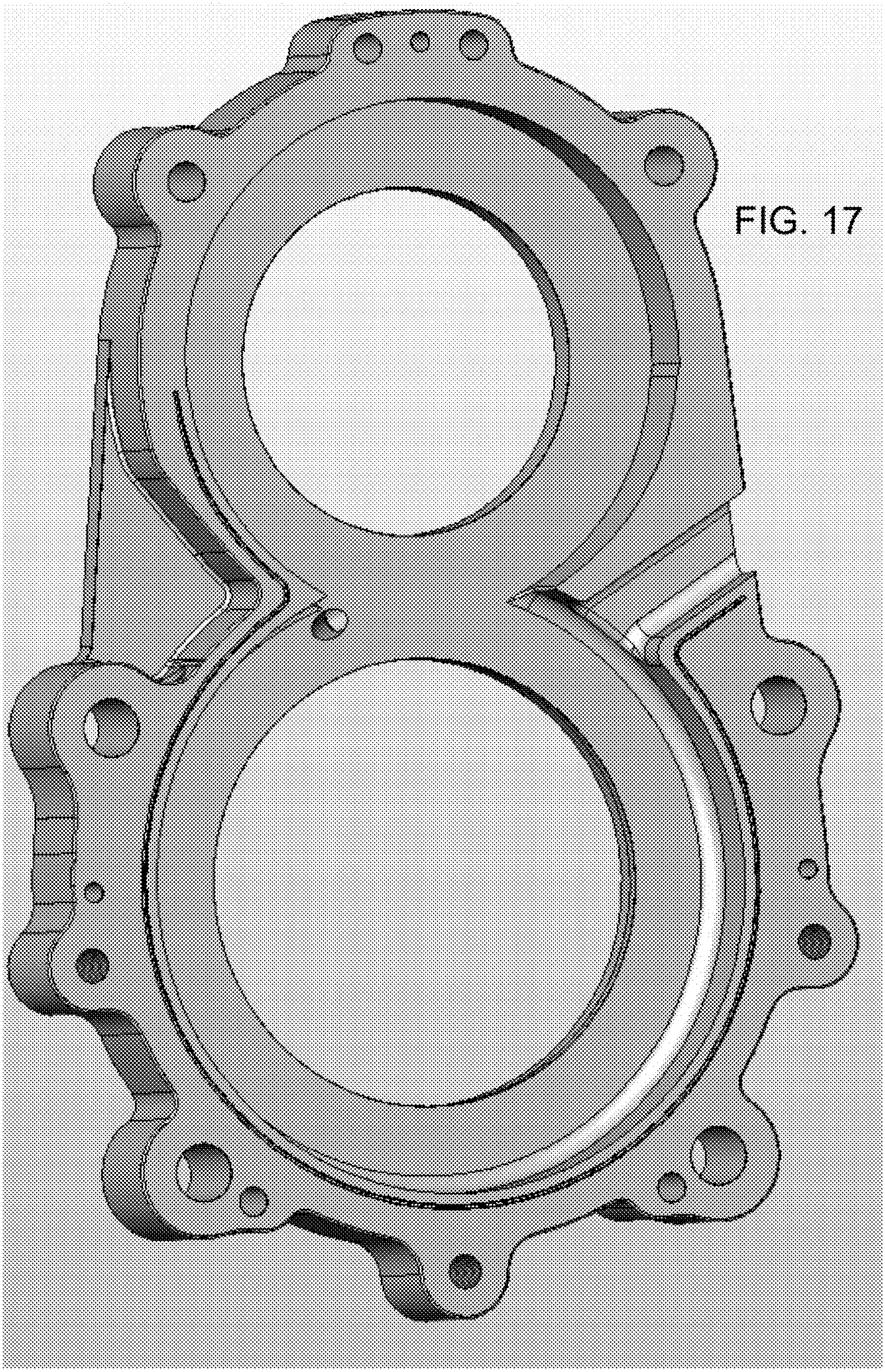
FIG. 17 shows a right side view (as viewed from FIG. 1) of the light gray section of the combustion assembly housing.
Figure 18:
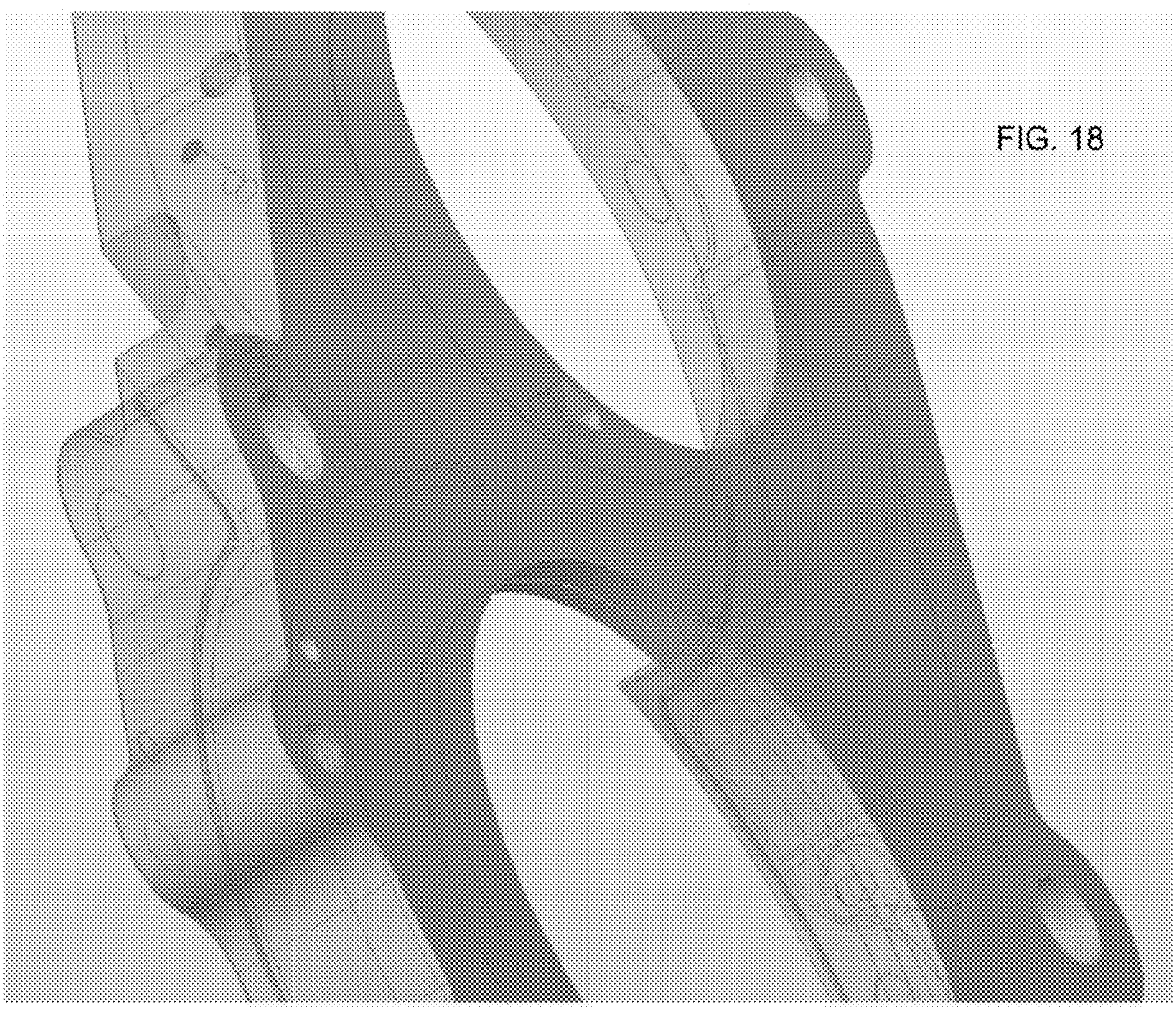
FIG. 18 is a partial transparent perspective view of the left side view (as viewed from FIG. 1) of the light gray section of the combustion assembly housing showing details of the transition channel.
Figure 19:
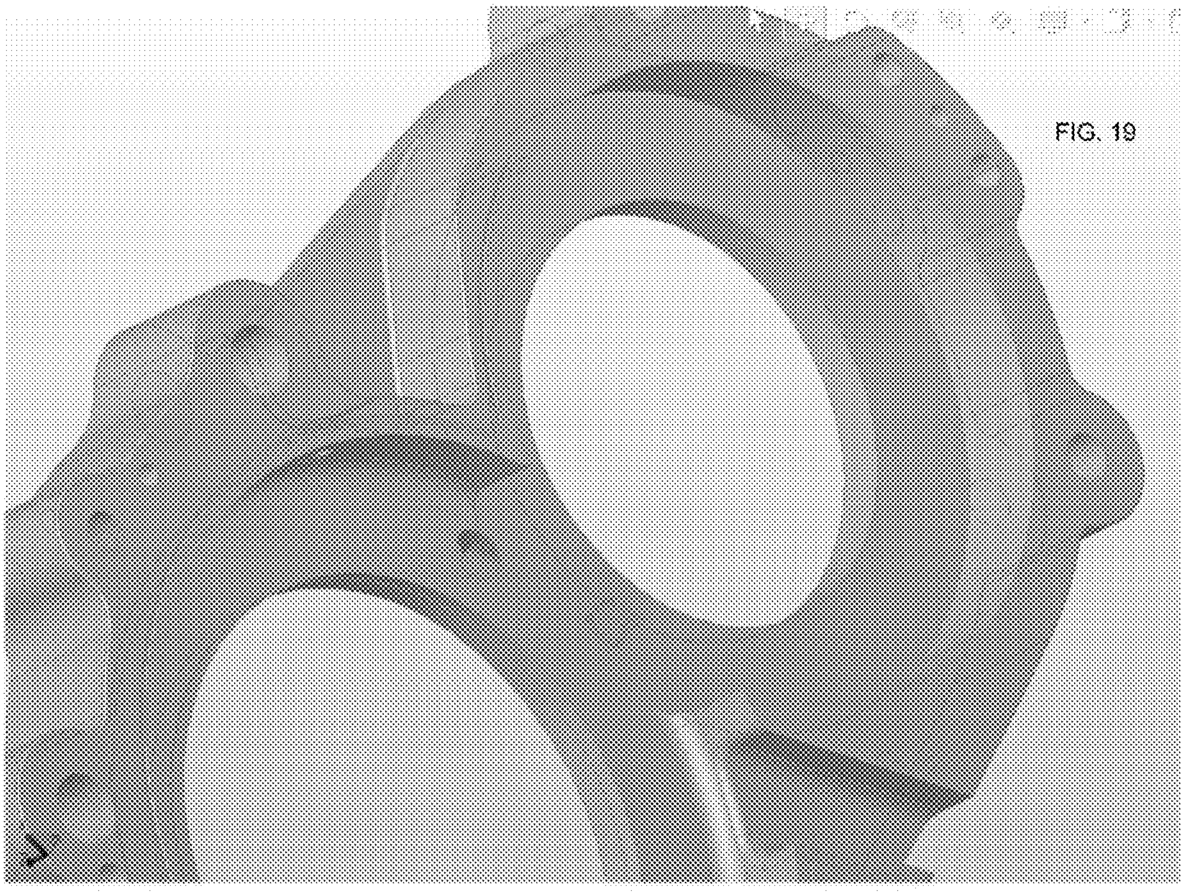
FIG. 19 is a partial transparent right side perspective view (as viewed from FIG. 1) of the light gray section of the combustion assembly housing showing details of the transition channel.
Figure 20:
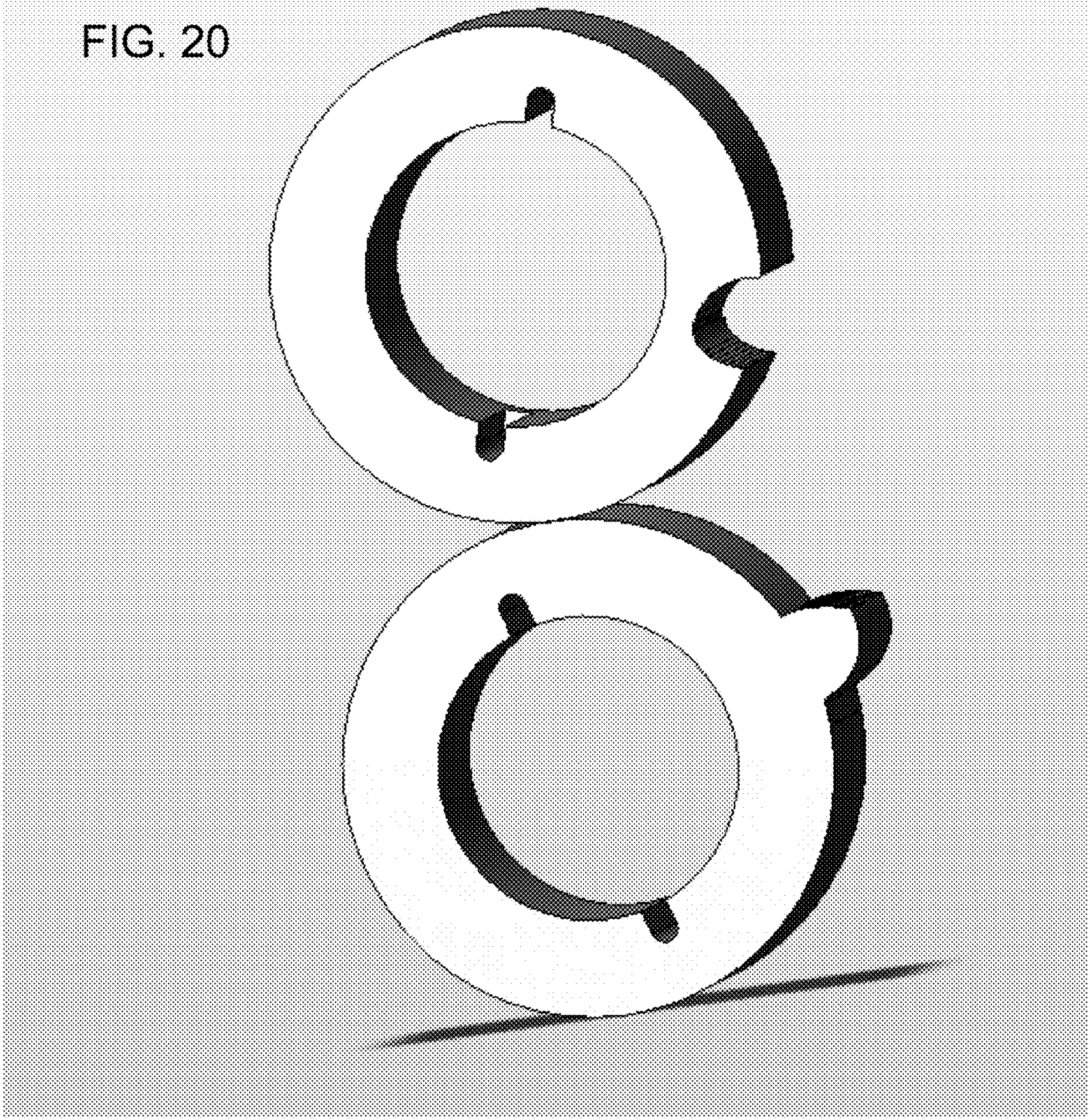
FIG. 20 is a left side perspective view (as viewed from FIG. 1) of the compression rotors.
Figure 21:
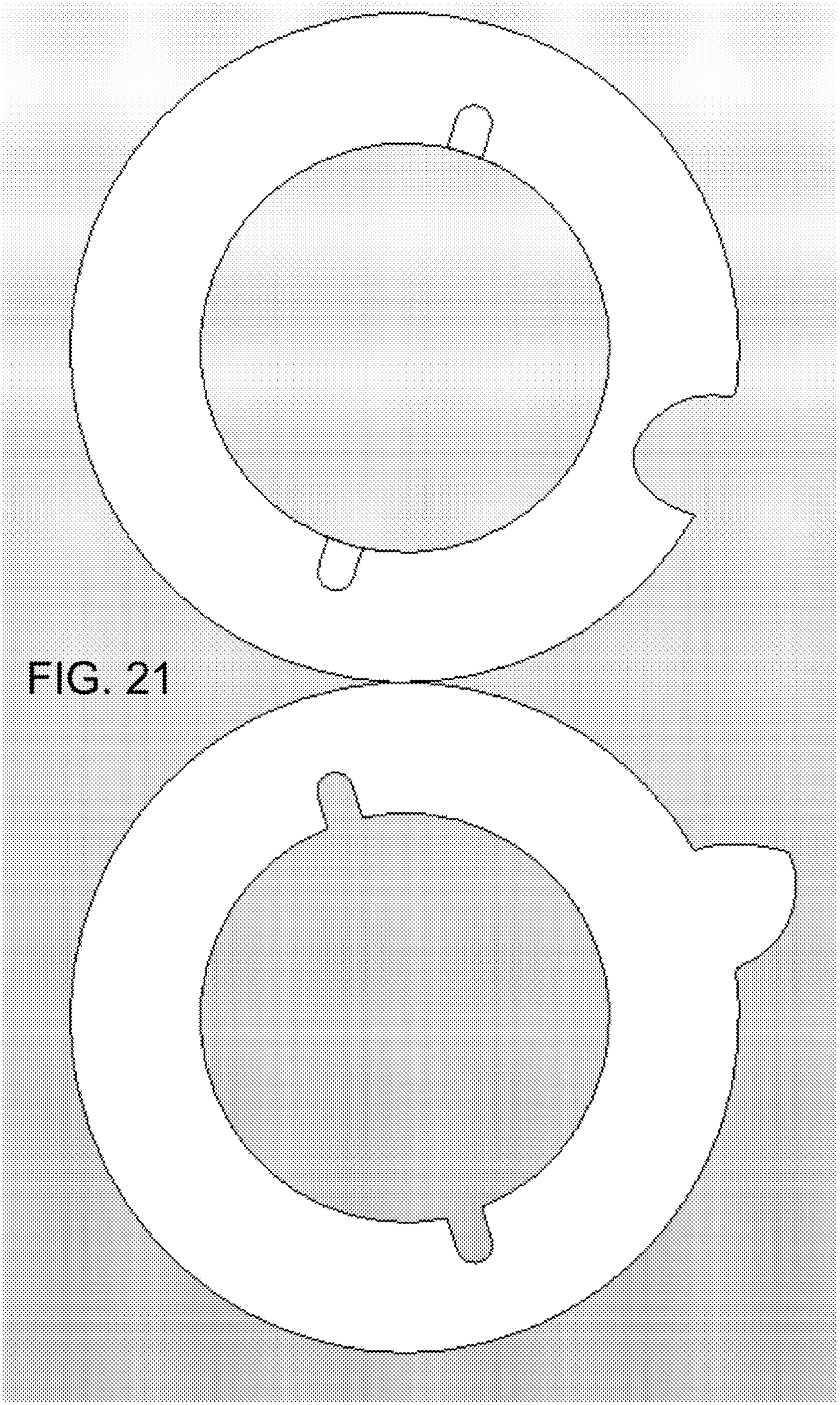
FIG. 21 is a left side view (as viewed from FIG. 1) of the compression rotors.
Figure 22:
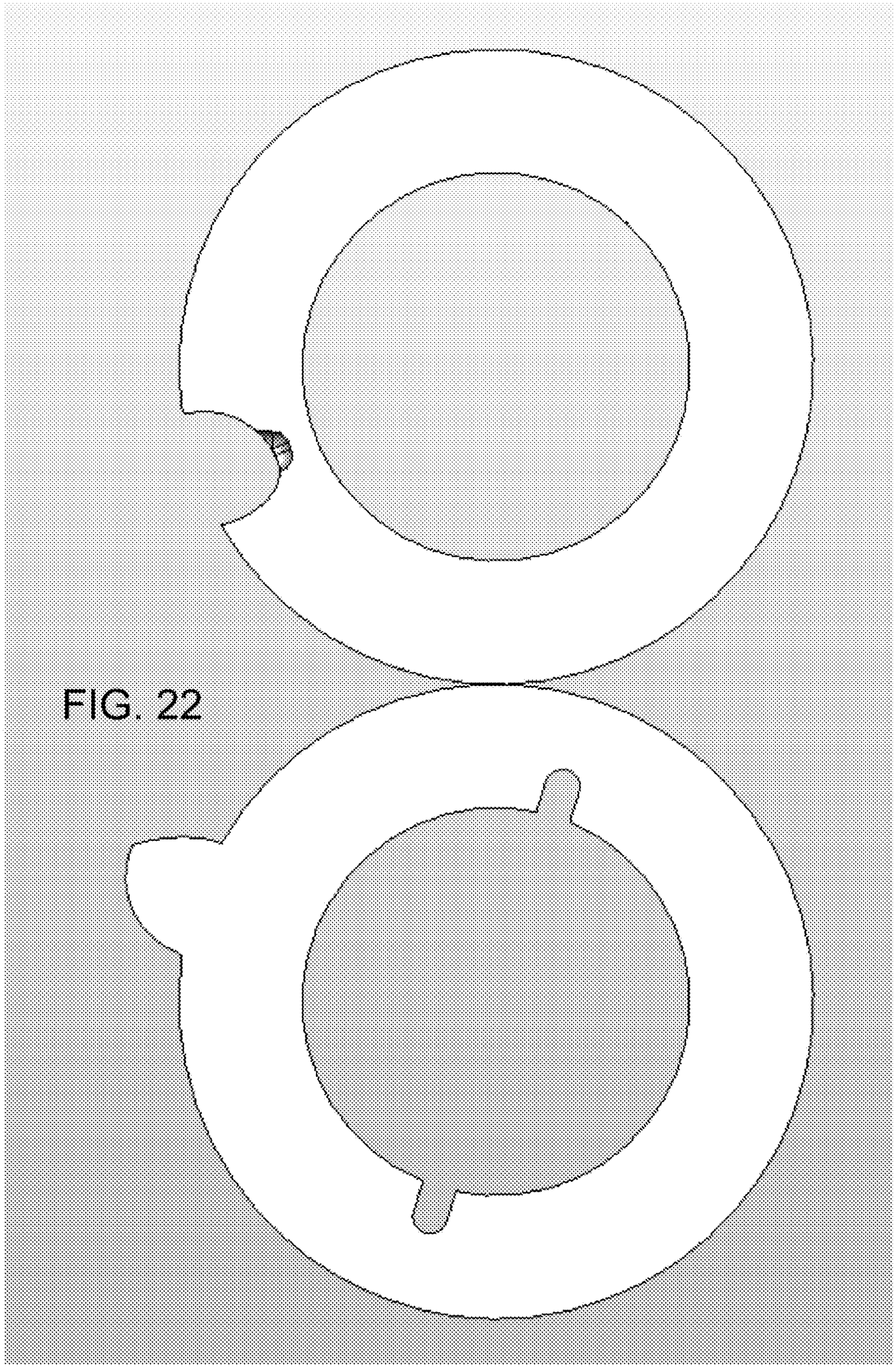
FIG. 22 is a right side view (as viewed from FIG. 1) of the compression rotors.
Figure 23:
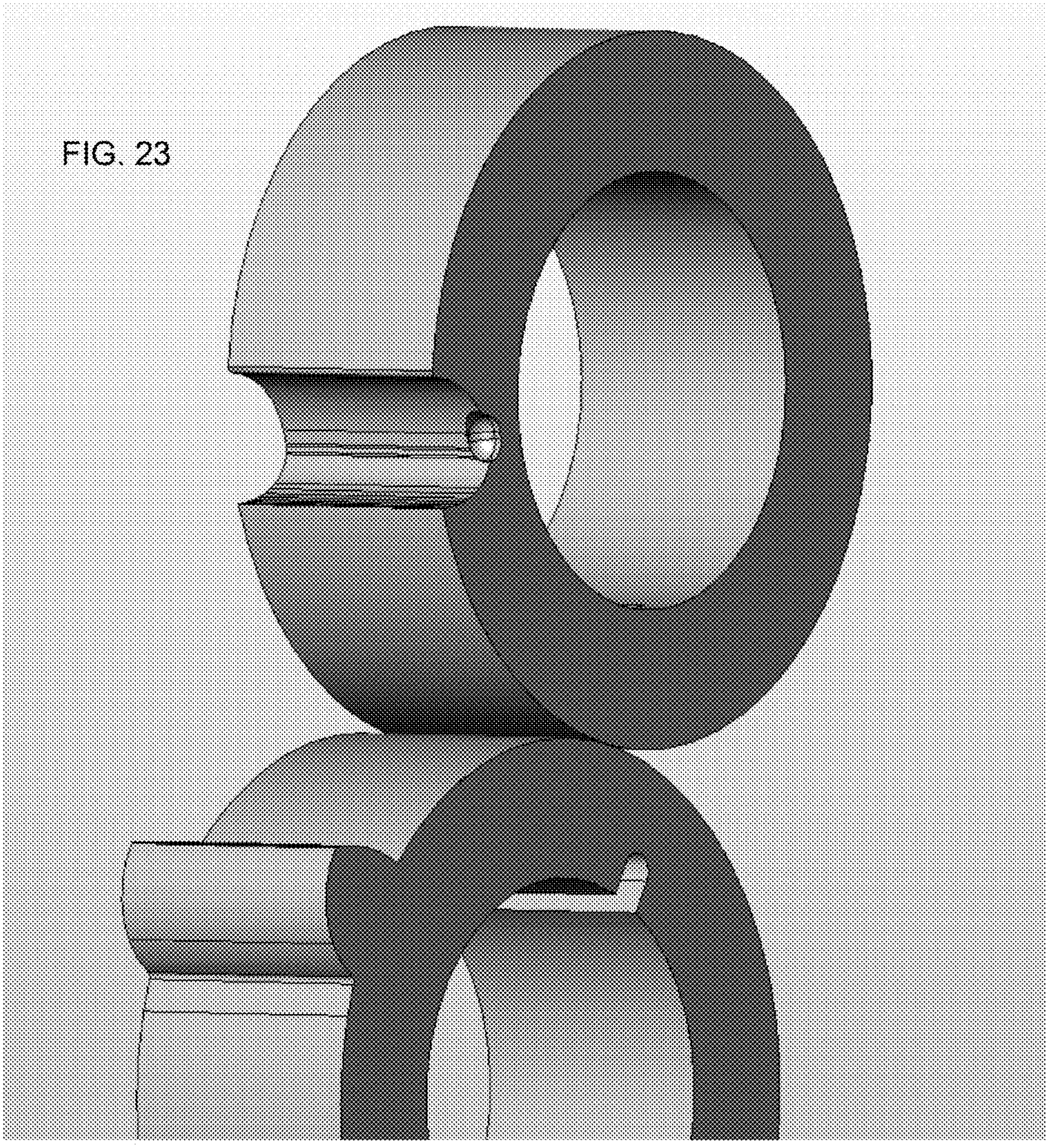
FIG. 23 is a partial perspective view of the compression rotors showing details of the notch in the isolator rotor.
Figure 24:
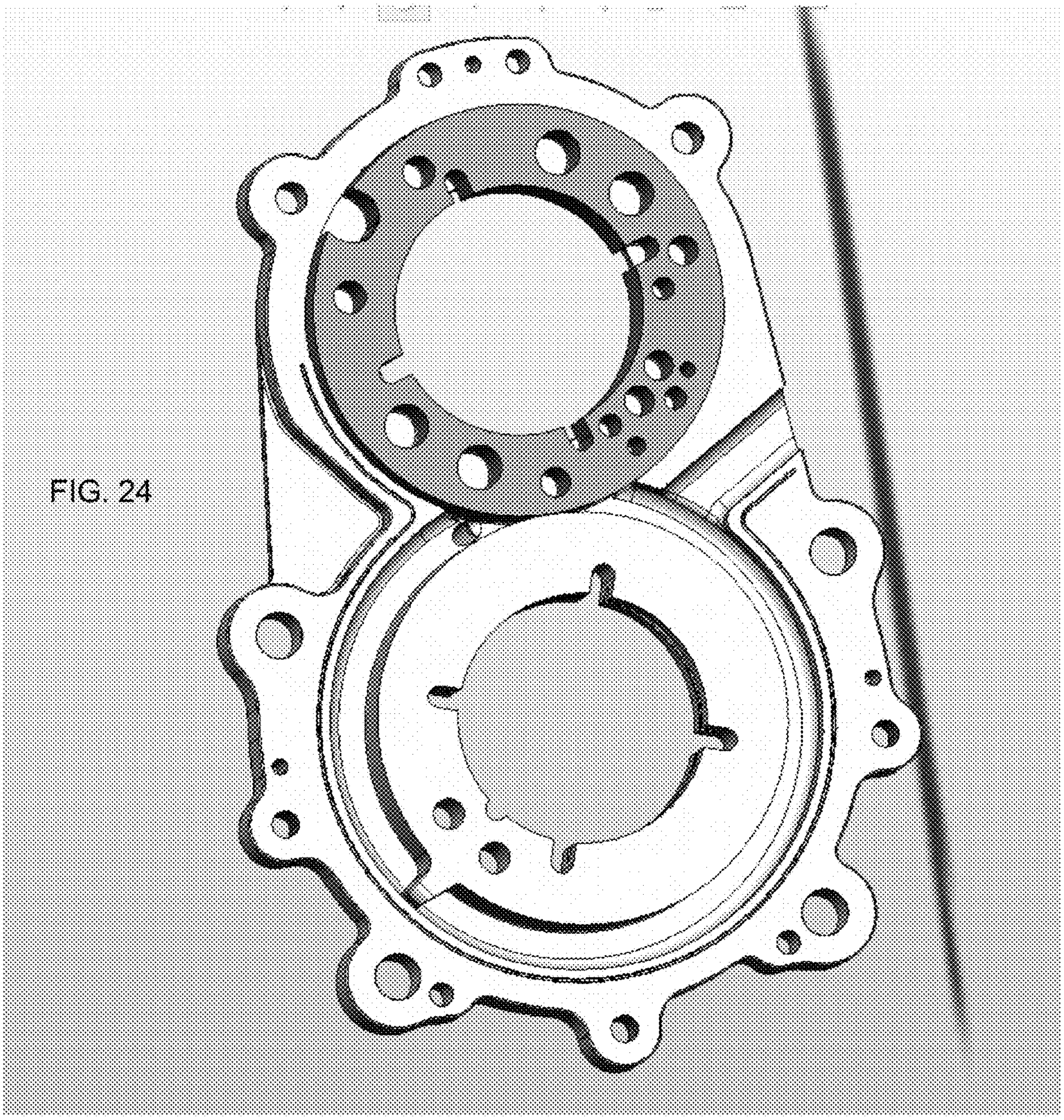
FIG. 24 is a right side view of the engine with the right side of the combustion housing removed.
Figure 25:
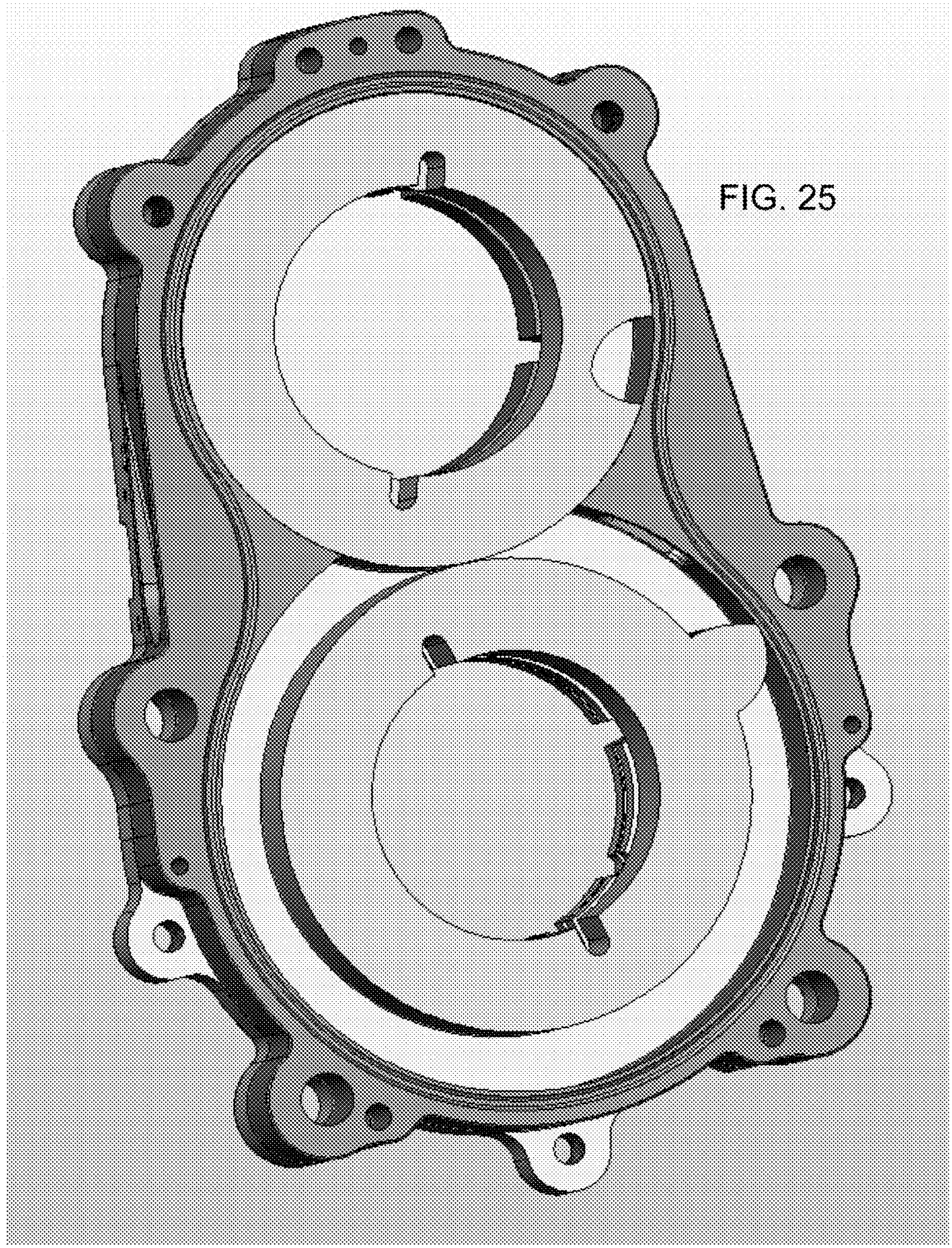
FIG. 25 is a left side view of the engine with the left side of the compression assembly housing removed.
Figure 26:
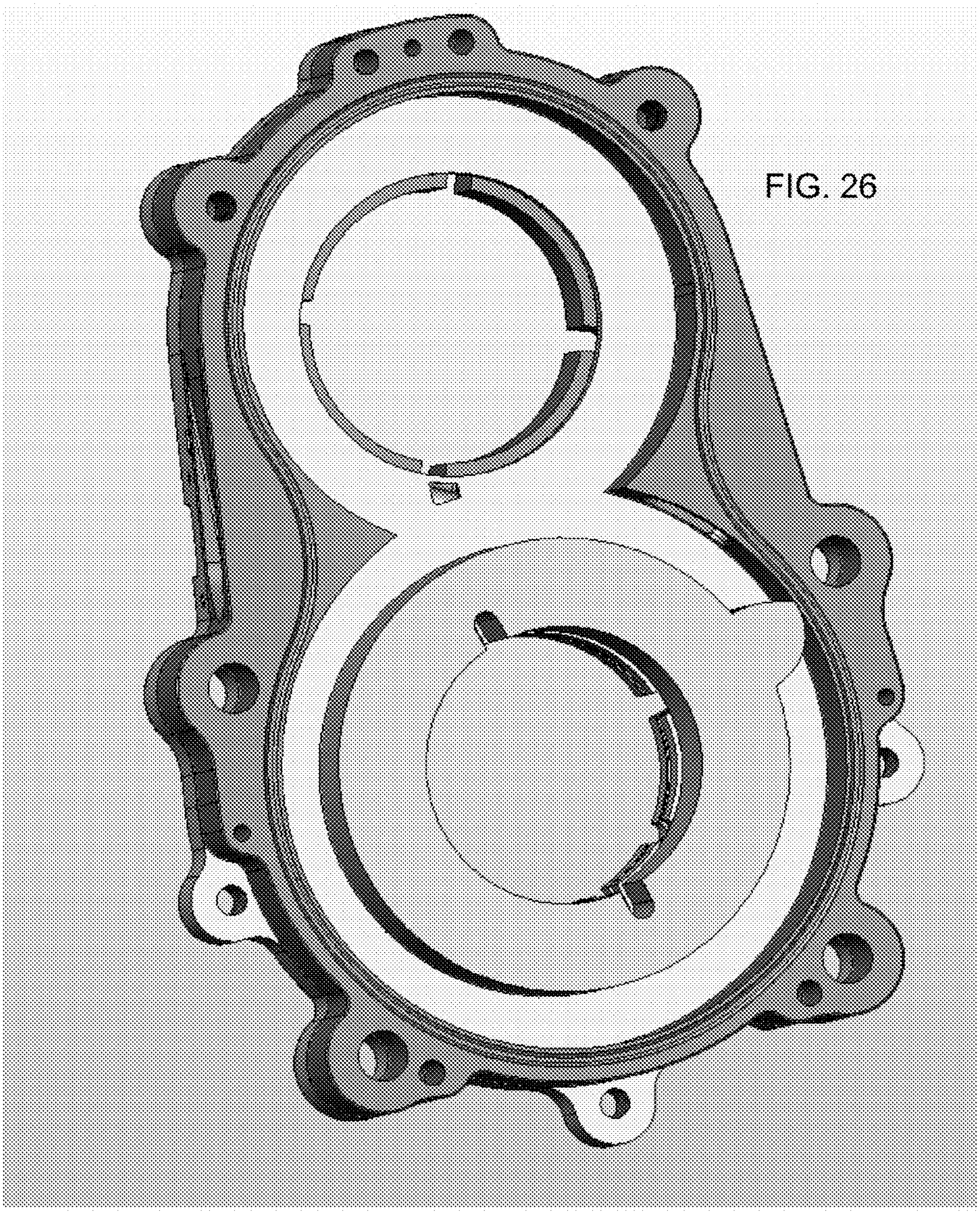
FIG. 26 is a left side view of the engine with the left side of the compression assembly housing removed, and the isolator rotor removed to show the port on the compression side of the combustion assembly housing to receive the compressed fluid into the transition channel.

FIG. 6 shows a right side perspective view of the engine of FIG. 1 with the red section portion of the combustion assembly housing removed. FIGS. 5 and 6 show an opening of a transition channel that extends through the light gray section of the combustion assembly housing into the compression assembly housing. The transition channel allow fluid to flow from the compression assembly to the combustion assembly. Fluid enters the combustion assembly housing through the tear-drop shaped port shown in FIGS. 5 and 6. In operation, the power rotor of the combustion assembly rotates counter-clockwise (as shown in FIGS. 5 and 6), and the isolator rotor of the combustion assembly rotates clockwise. When the male blade of the power rotor reaches top dead center it engages with the female receptacle of the isolator rotor. After the male blade rotates past the tear-drop shaped port in the combustion assembly housing, compressed air and/or fuel is allowed to flow into the combustion chamber behind the blade. The charge is then ignited to start the power stroke. The expansion of the charge during the power stroke pushes the blade past the exhaust port (shown on the right of FIGS. 5 and 6), and the gases are exhausted before the next power cycle begins. In some embodiments, fuel is injected into the combustion chamber housing, behind the male blade of the combustion power rotor right as the blade begins to engage with the receptacle of the isolator rotor. In some embodiments, fuel is injected at various locations in the rotation of the male blade after the blade has engaged with and/or continued forward and disengaged with the receptable. It will be appreciated that in various embodiments fuel is added various different locations, including within the compression assembly, within the transition channel and within the combustion assembly, so long as the fuel is added behind the male blade as discussed above. The fuel/charge is ignited via spark or other ignition source as discussed herein and/or as further discussed in the Astron Engine Technology.

Figure 27:
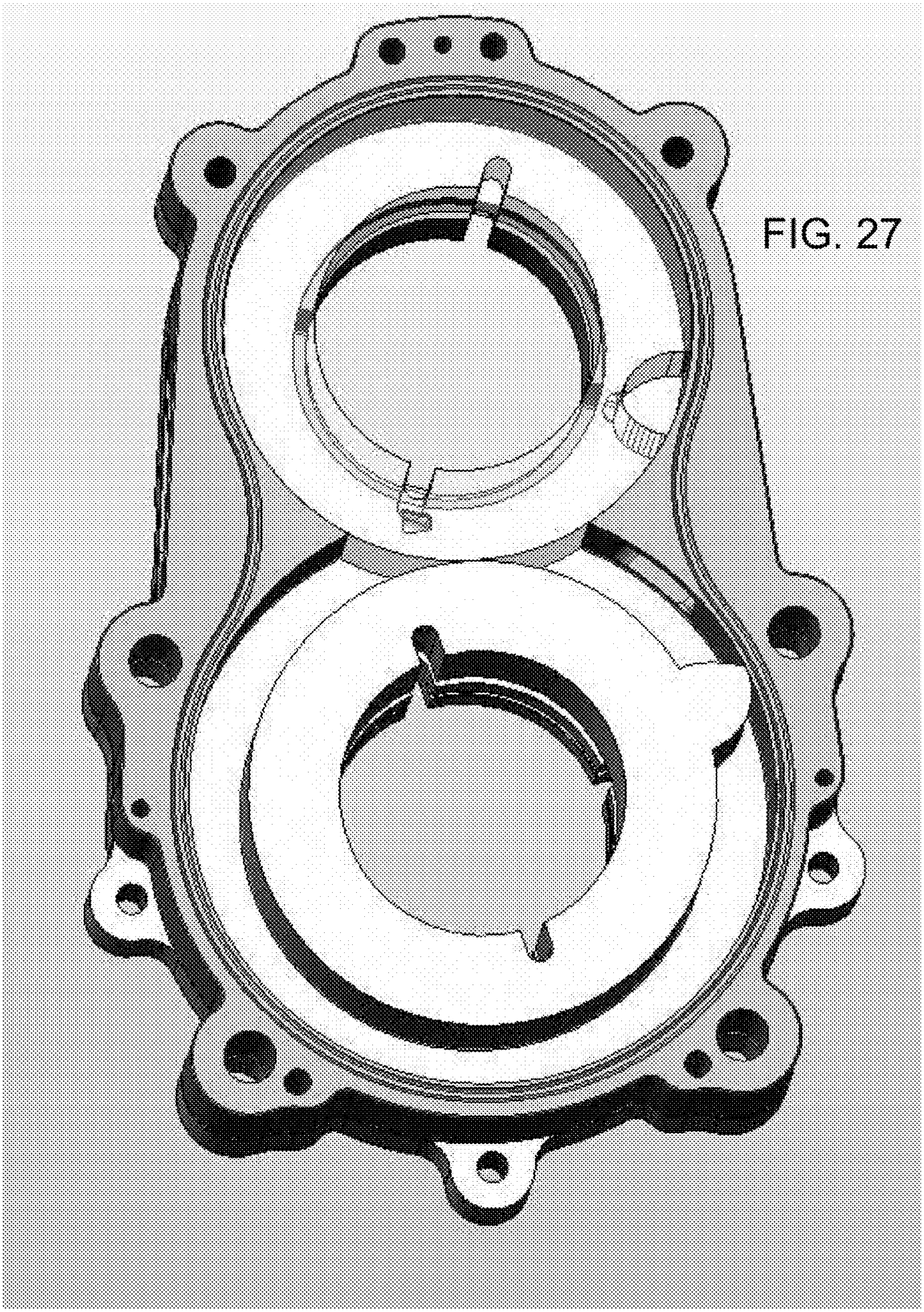
FIG. 27 is a left side view of the engine with the left side of the compression assembly housing removed, and the isolator rotor shown as transparent to show the port to the transition channel.
Figure 28:
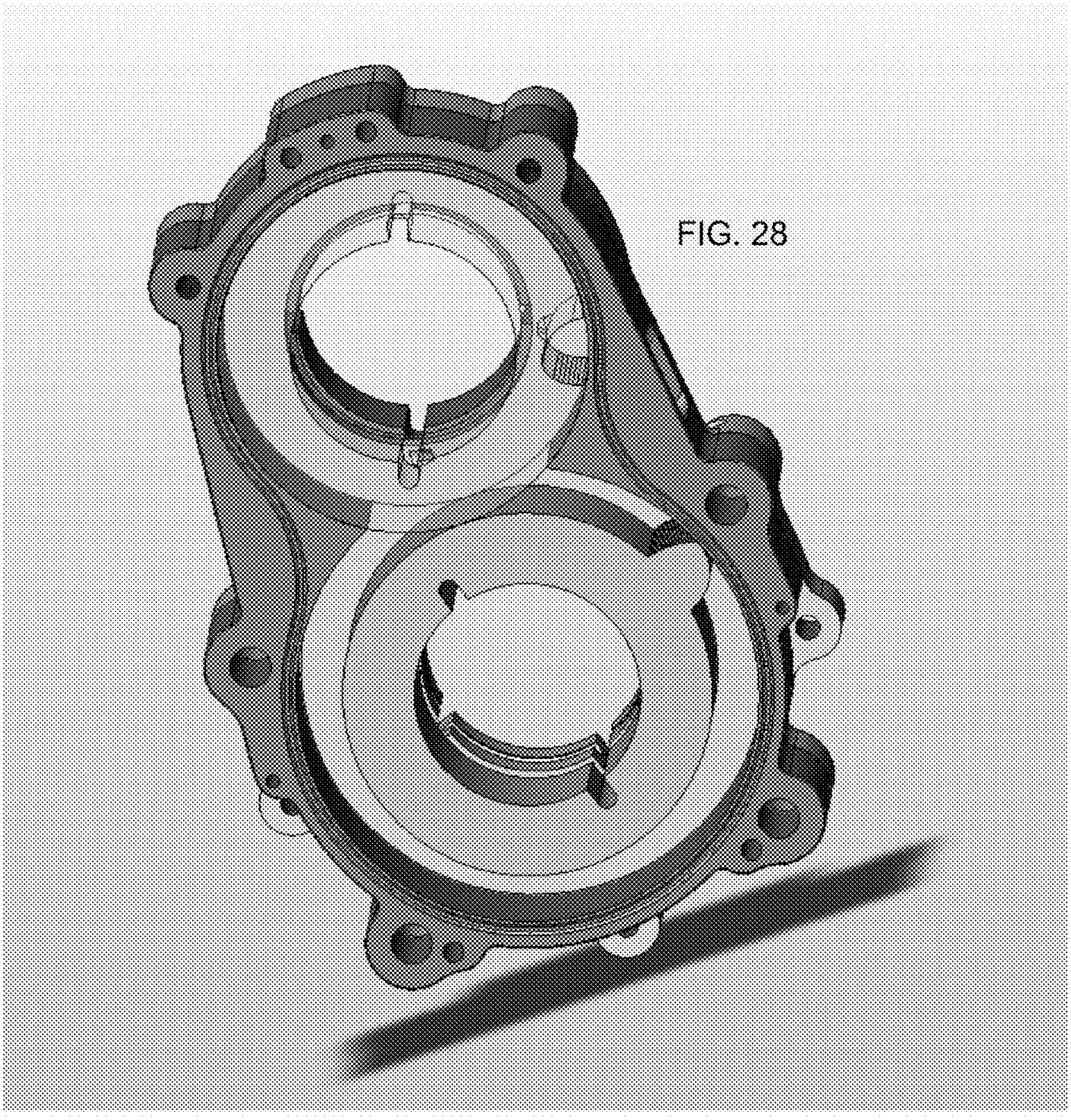
FIG. 28 is left side perspective view of the engine with the left side of the compression assembly housing removed and the isolator rotor shown transparent.
Figure 29:
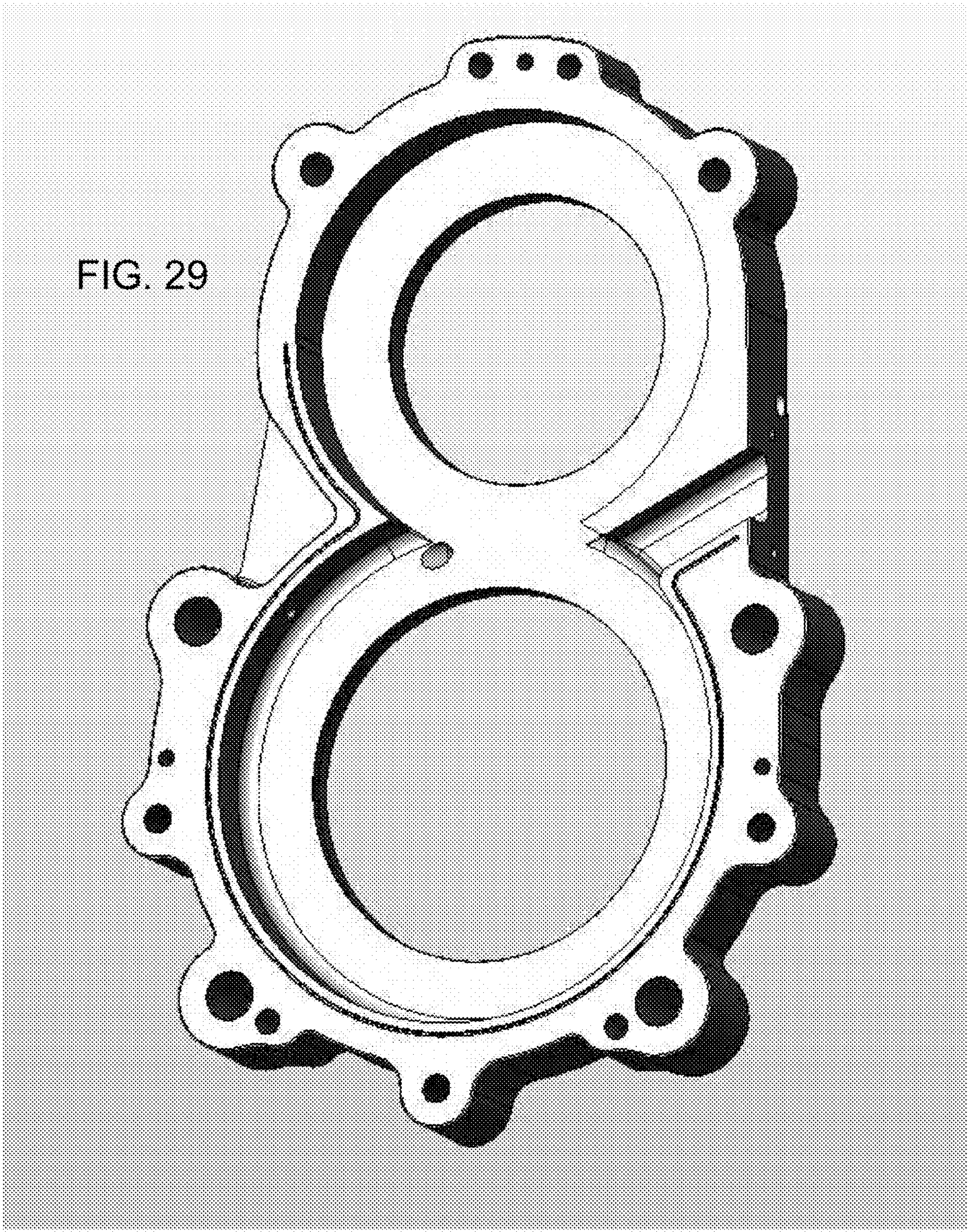
FIG. 29 is a right side perspective view of the light gray section of the combustion assembly housing.

FIG. 27 shows a left side view of the engine with the left side of the compression assembly housing removed, and the isolator rotor shown as transparent to show the port to the transition channel. Referring to FIG. 27, the power rotor of the compression assembly moves clockwise and the isolator rotor moves counter-clockwise. The male blade of the power rotor mates with the female receptacle of the isolator rotor when the male blade is at top dead center and the receptacle is at bottom dead center. The blade pushes air (intake fluid) from the intake port to the right side shown in FIG. 27, and compresses the intake fluid against the isolator rotor as the rotors rotate. As the receptable of the isolator rotor exposes the opening of the transition channel, the compressed intake fluid enters the transition channel and is allowed into the compression assembly the rotors of which are times in coordination with the compression assembly rotors. As the rotors continue to rotate the compression isolator rotor closes off the port into the transition channel to prevent the expanding gases from the combustion chamber from being forced back into the compression chamber upon ignition. As is discussed above, in alternative embodiments the isolator rotor of the combustion assembly, the power rotor of the compression assembly, and/or the power rotor of the compression assembly are utilized to close of the flow of fluid between the compression assembly and the combustion assembly.

Figure 30:
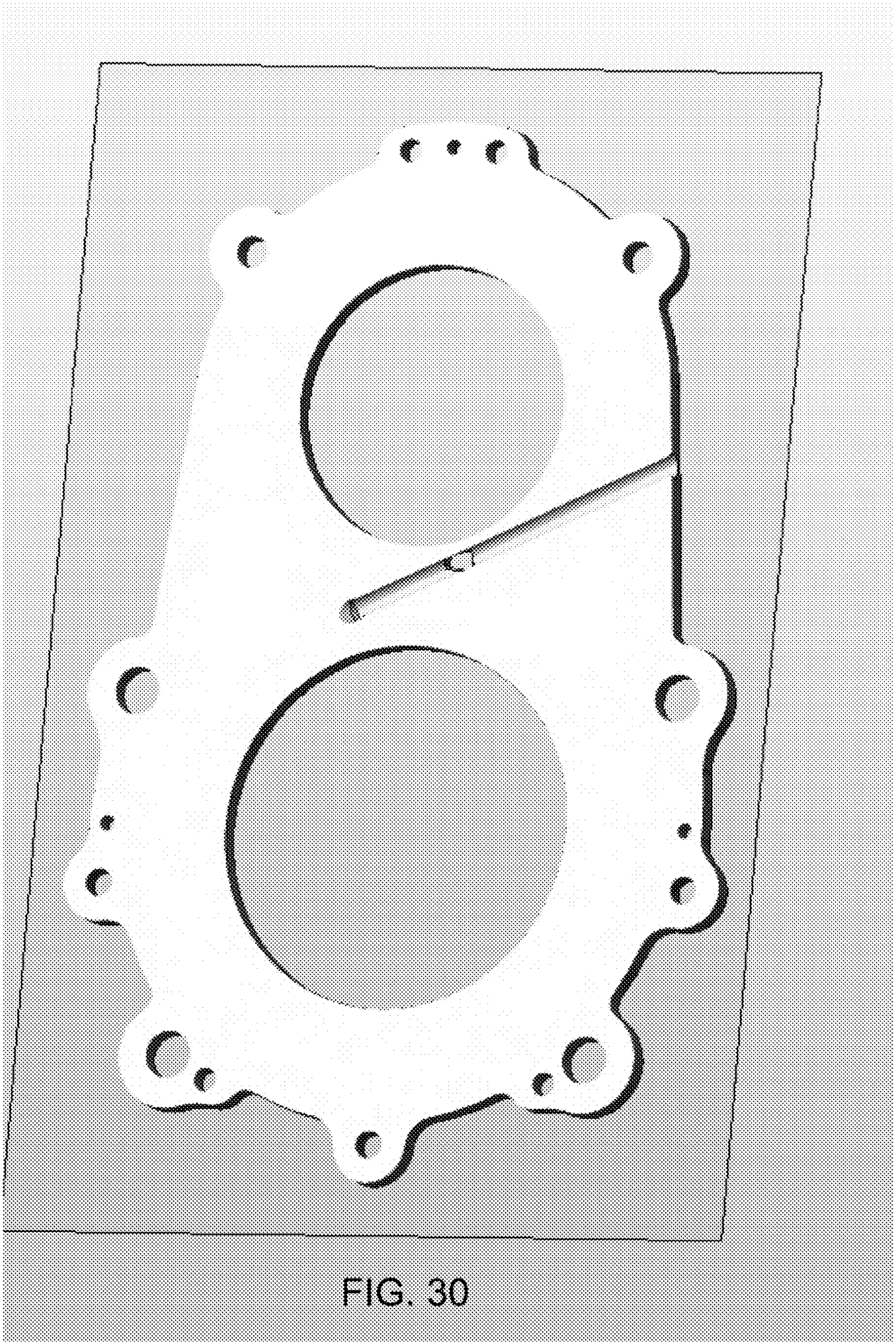
FIG. 30 is a cross section view of the combustion assembly housing as shown in FIG. 29.
Figure 31:
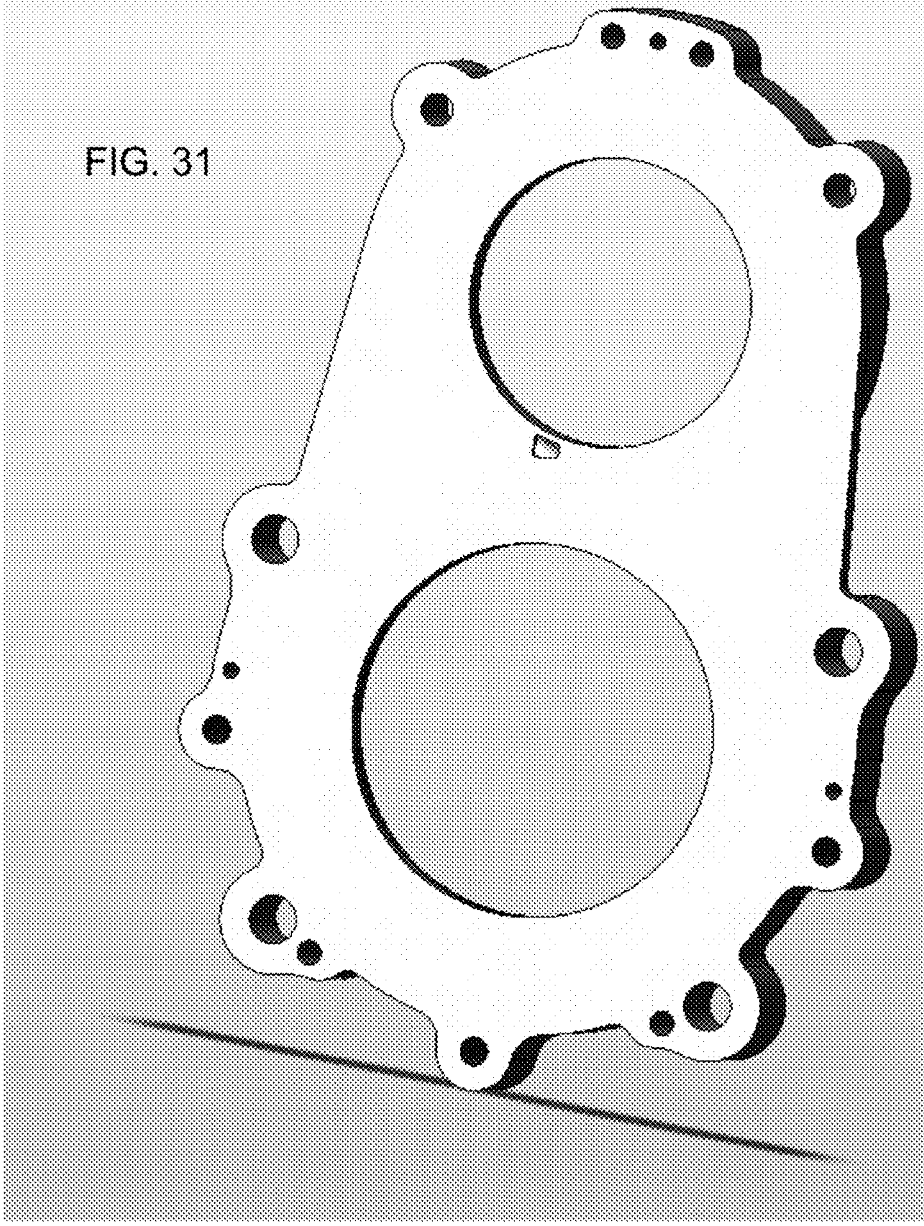
FIG. 31 is a left side perspective view of the light gray section of the combustion assembly housing.
Figure 32:
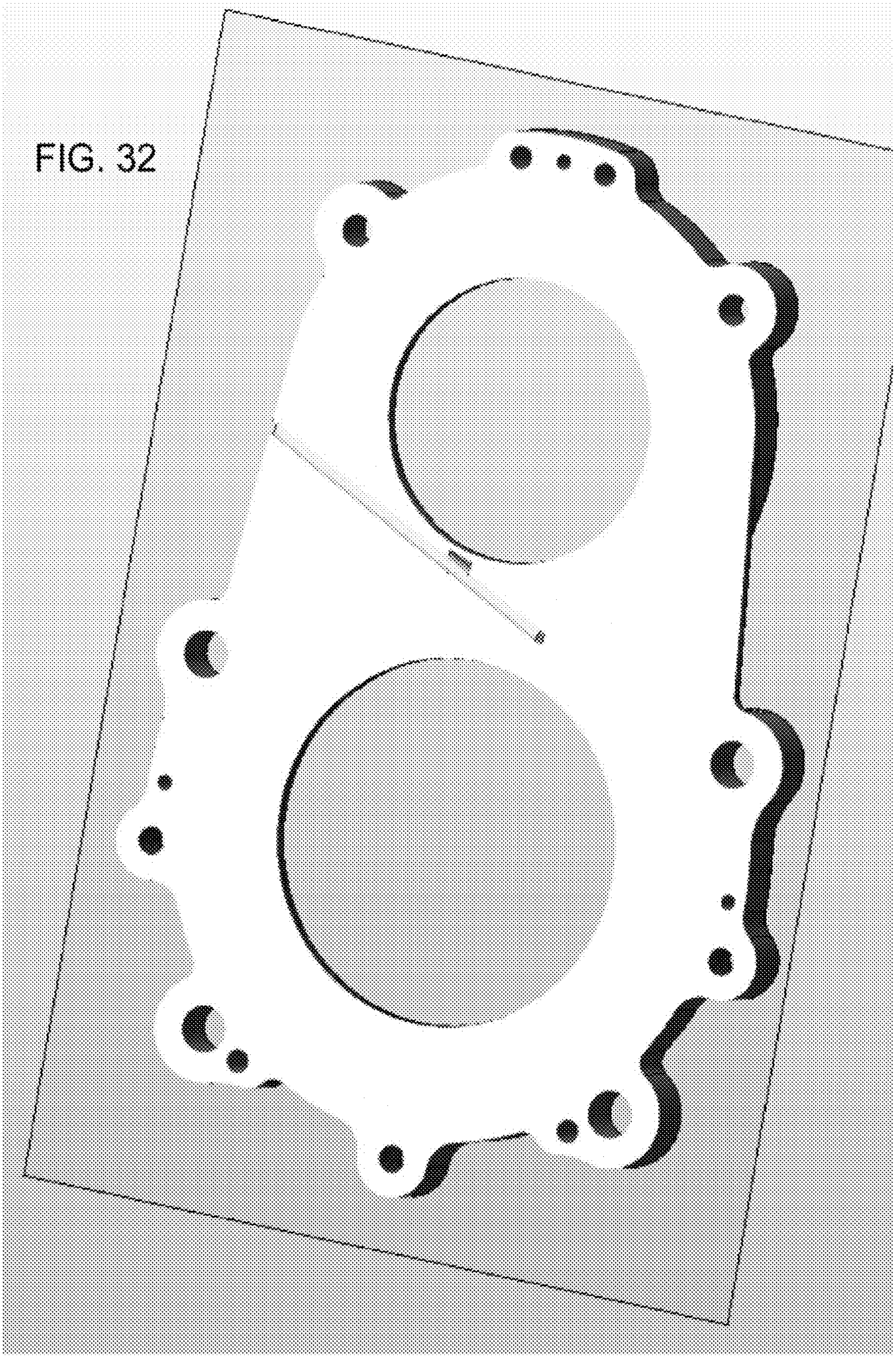
FIG. 32 is a cross section view of the combustion assembly housing as shown in FIG. 31 showing the details of the transition channel.

FIG. 30 shows a cross section view of the combustion assembly housing according to some embodiments. FIG. 30 shows details of the transition channel. For the embodiment shown in FIG. 30, the transition channel is formed by drilling a hole from the right side of the housing (as shown in FIG. 30) to the tear-drop shaped opening on the combustion side of the housing. Another hole is cut on the opposing side of the housing to open to the compression side of the housing. In some embodiments, the drilled hole is utilized to inject fuel into the transition channel. In other embodiments, the right side (as shown in FIG. 30) of the hole is plugged on the exterior of the housing to prevent fluid from existing the housing.

Figure 33:
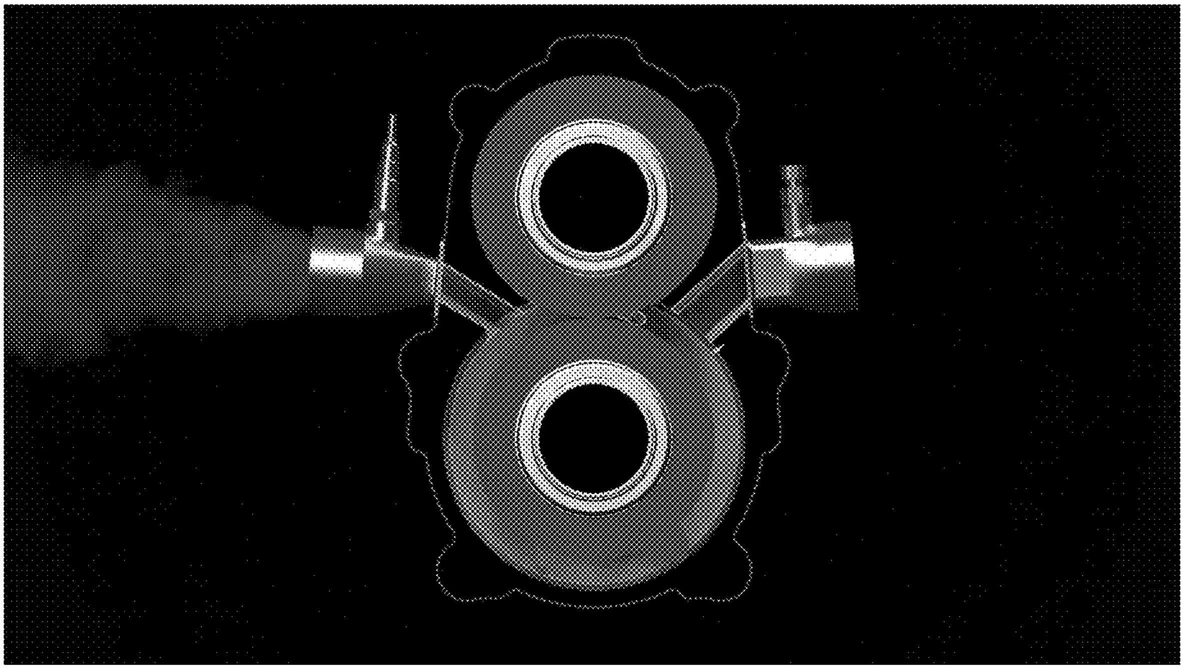
FIGS. 33-44 is a left side (as shown from FIG. 1) sectional view of the engine of FIG. 1 showing the timing of the compression rotors (shown in blue) in relation to the combustion rotors (shown in red) during several power cycles.
Figure 34:
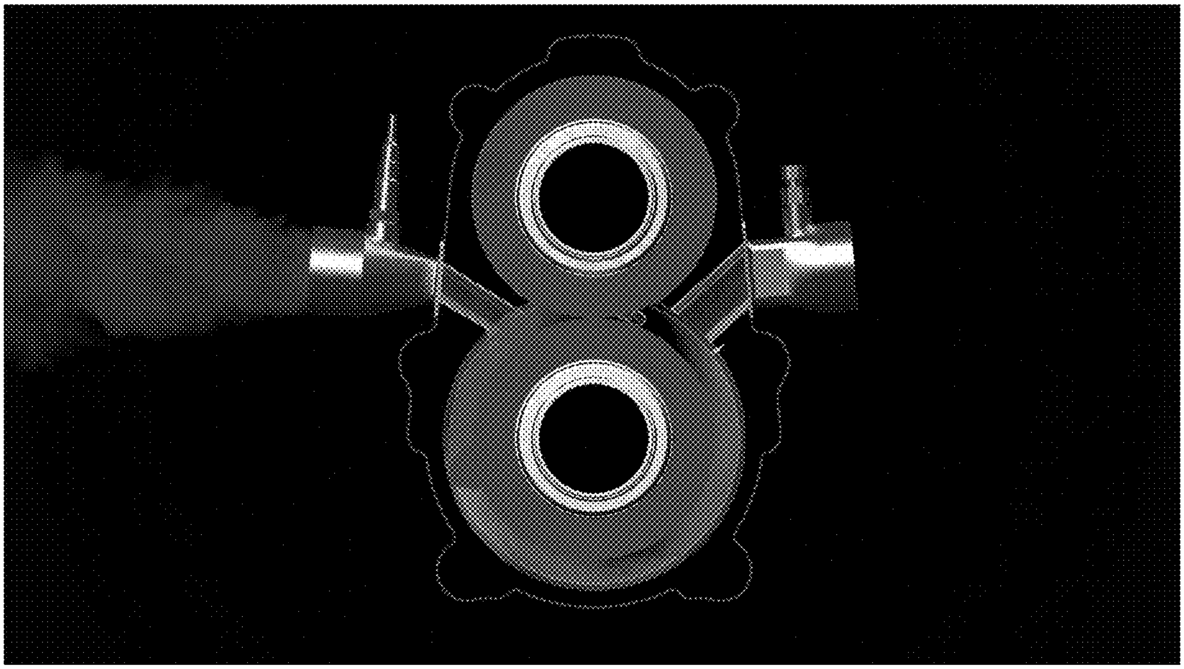
Figure 35:
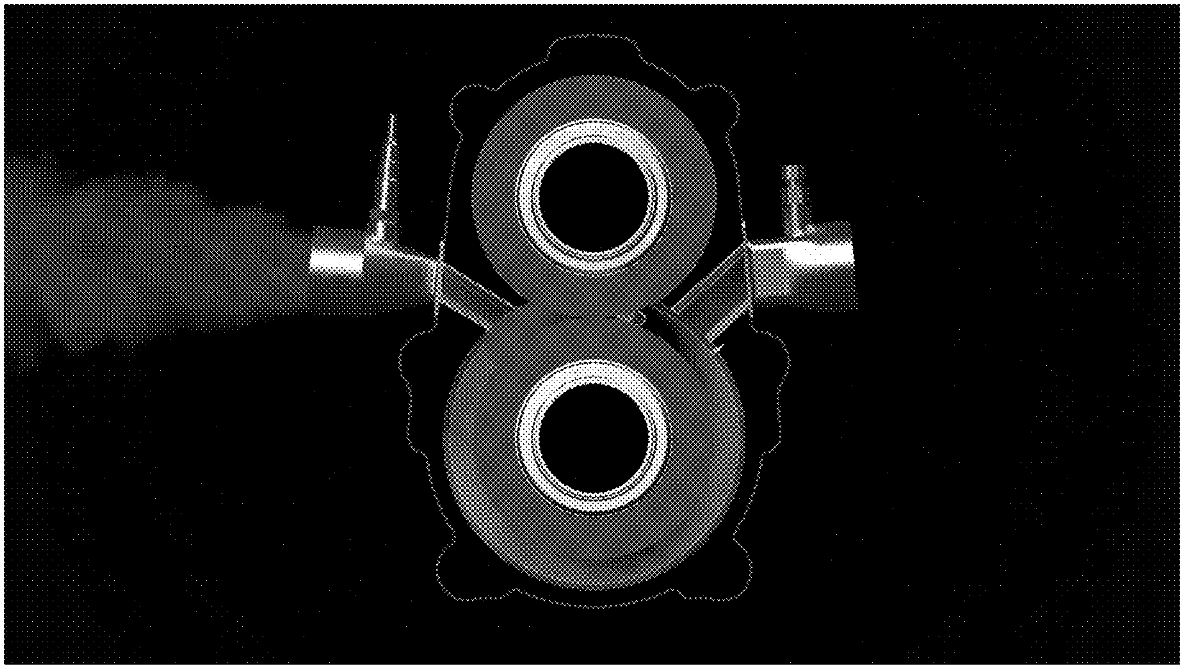
Figure 36:
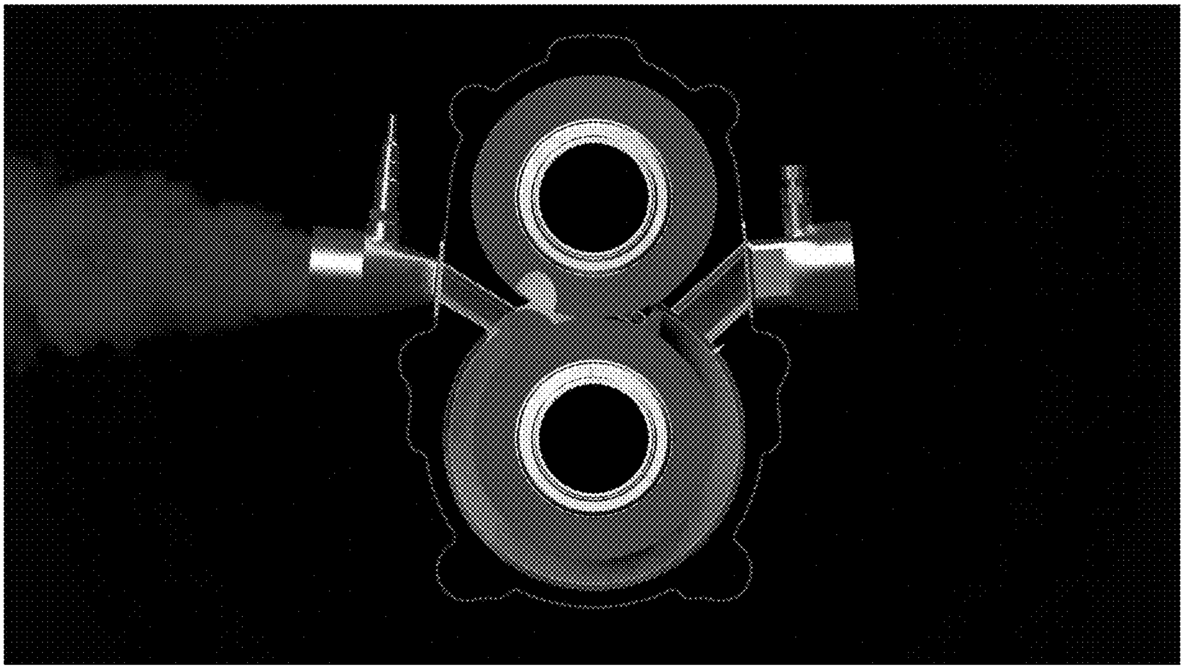
Figure 37:
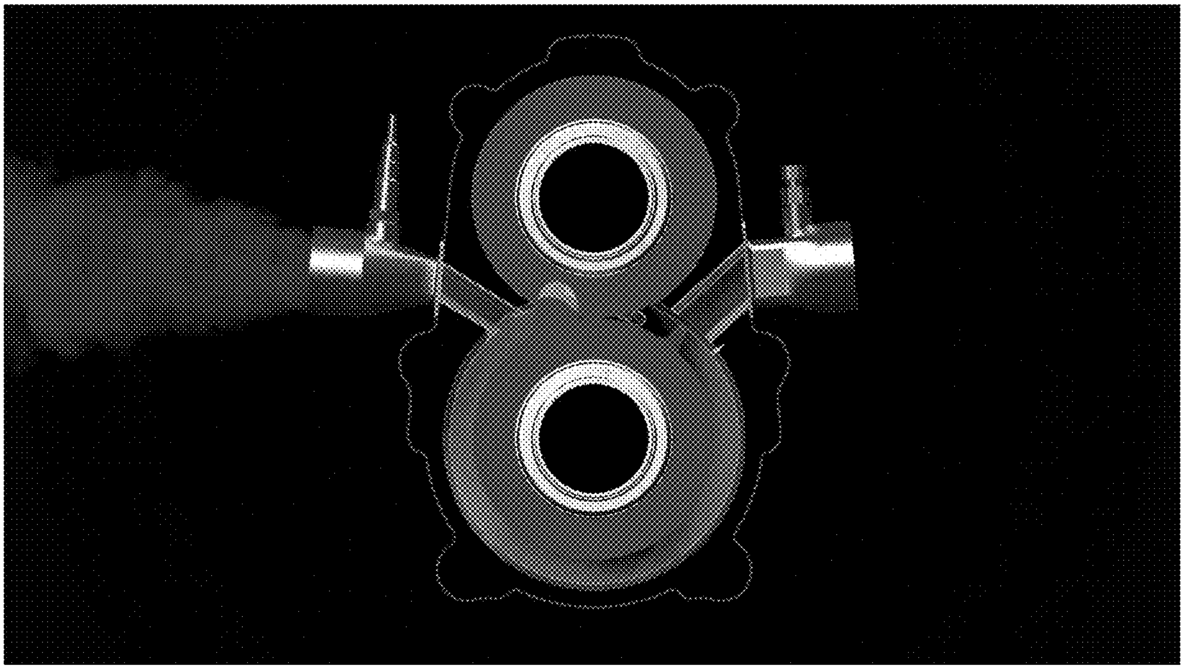
Figure 38:
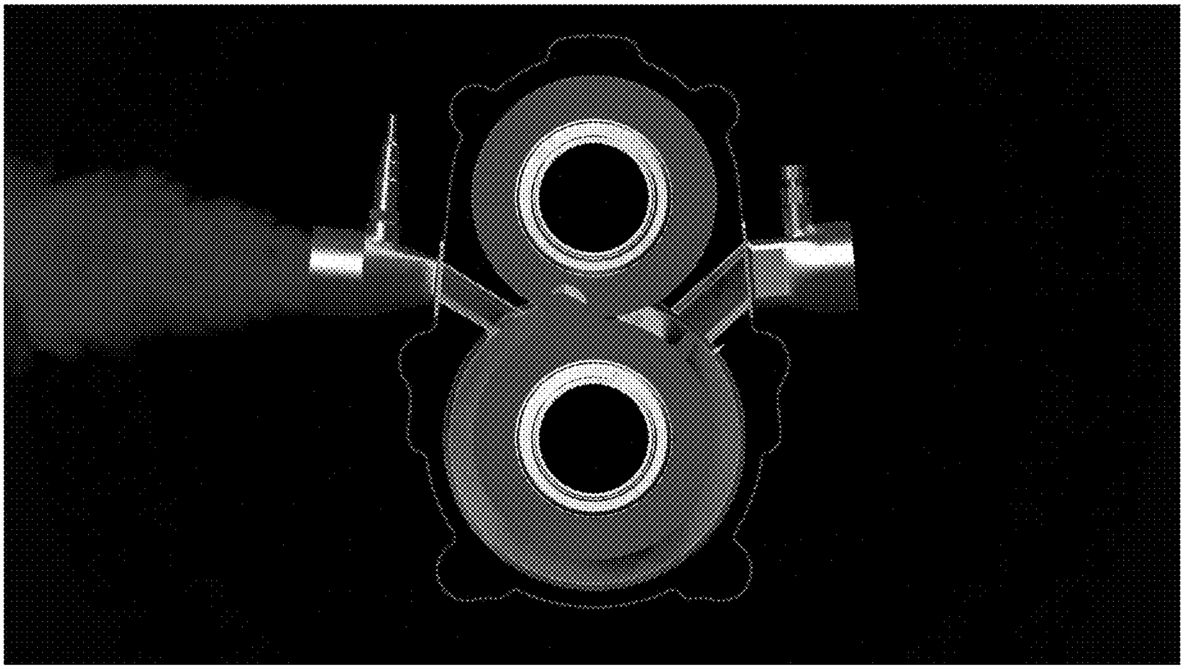
Figure 39:
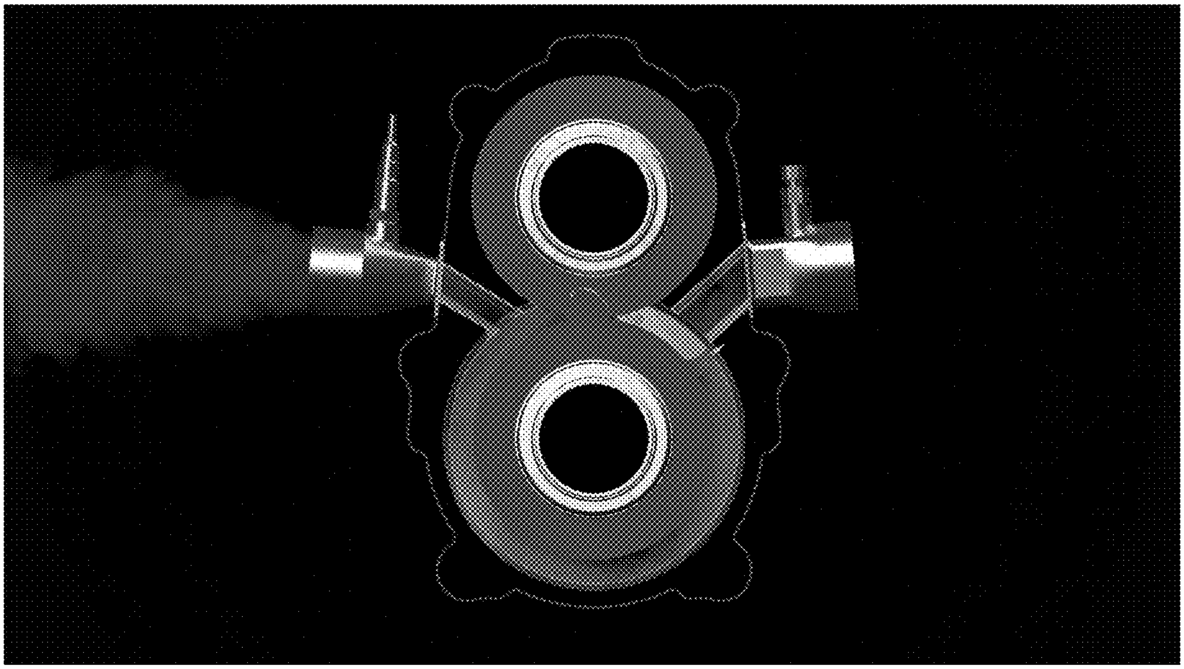
Figure 40:
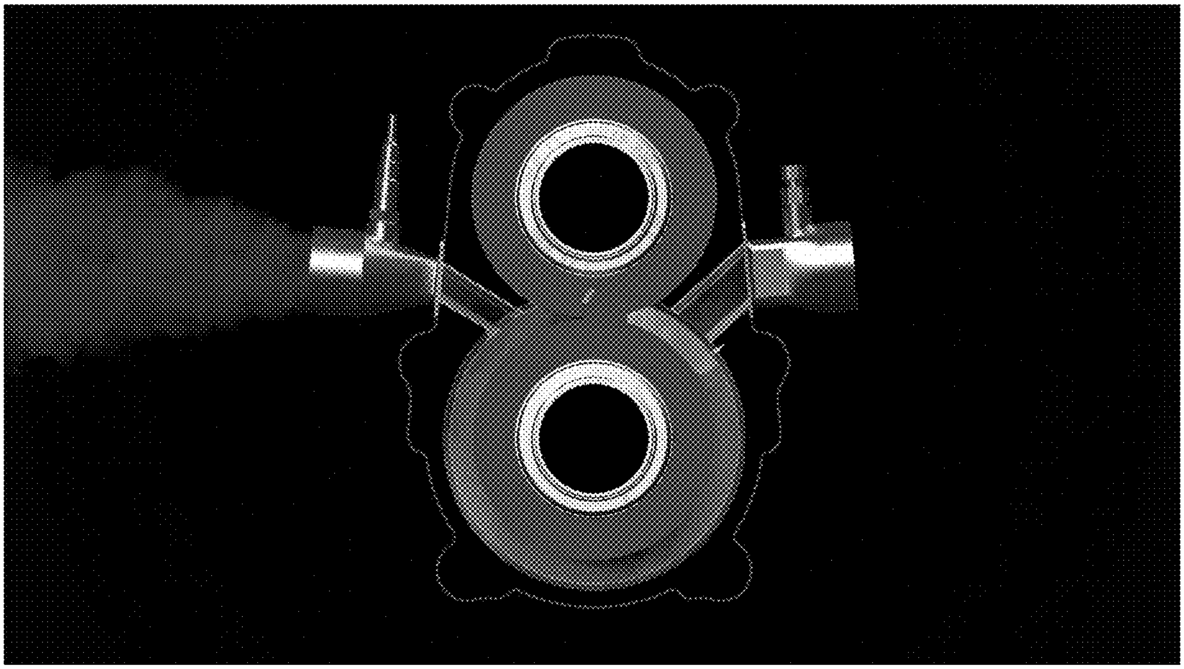
Figure 41:
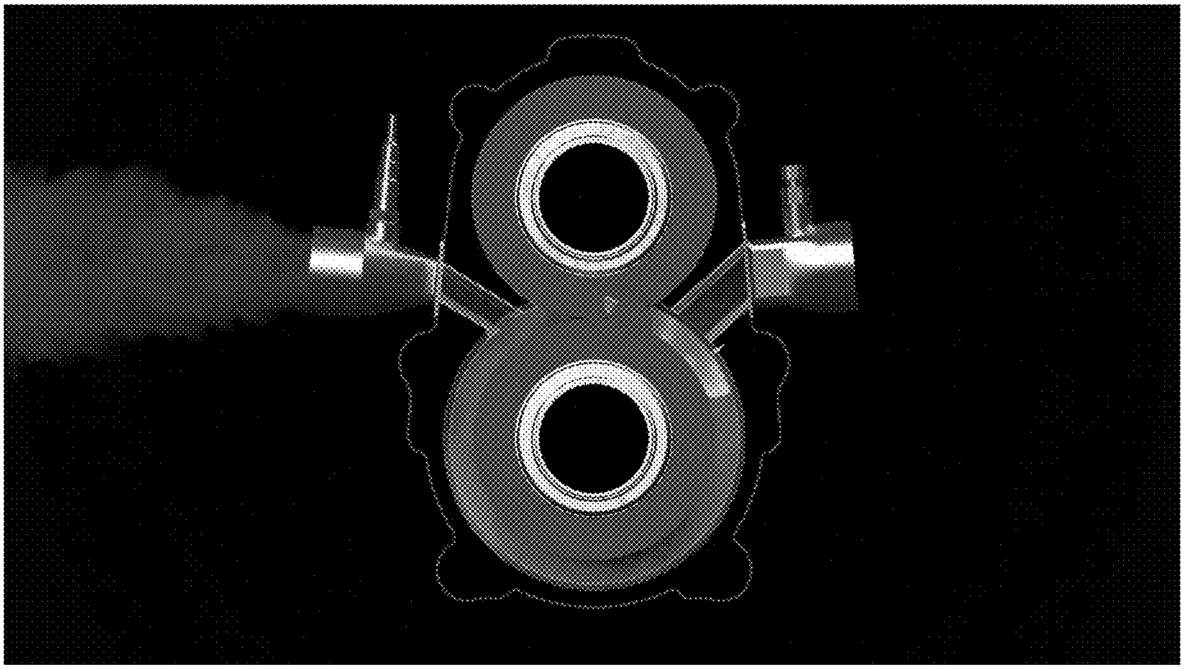
Figure 42:
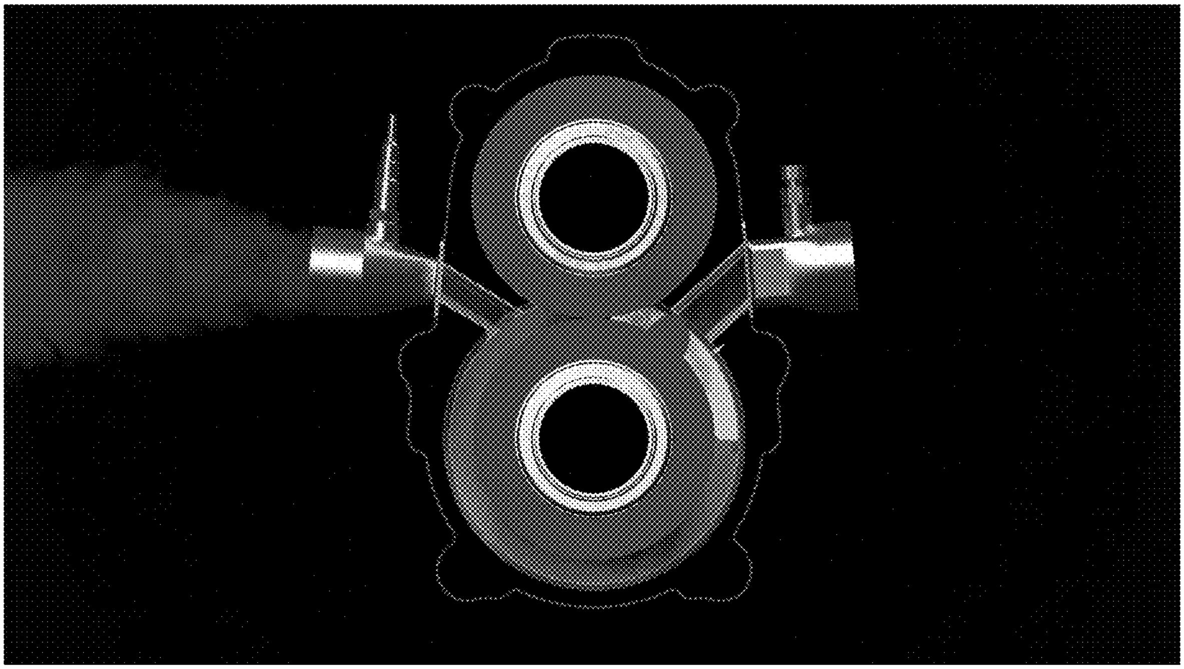
Figure 43:
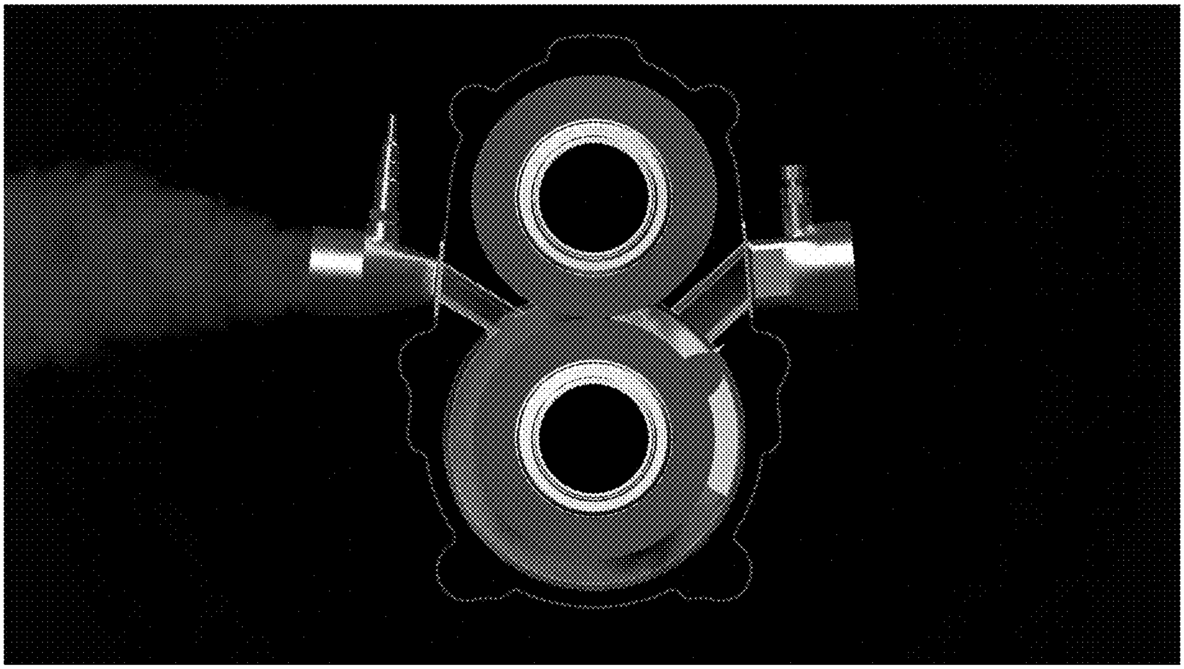
Figure 44:
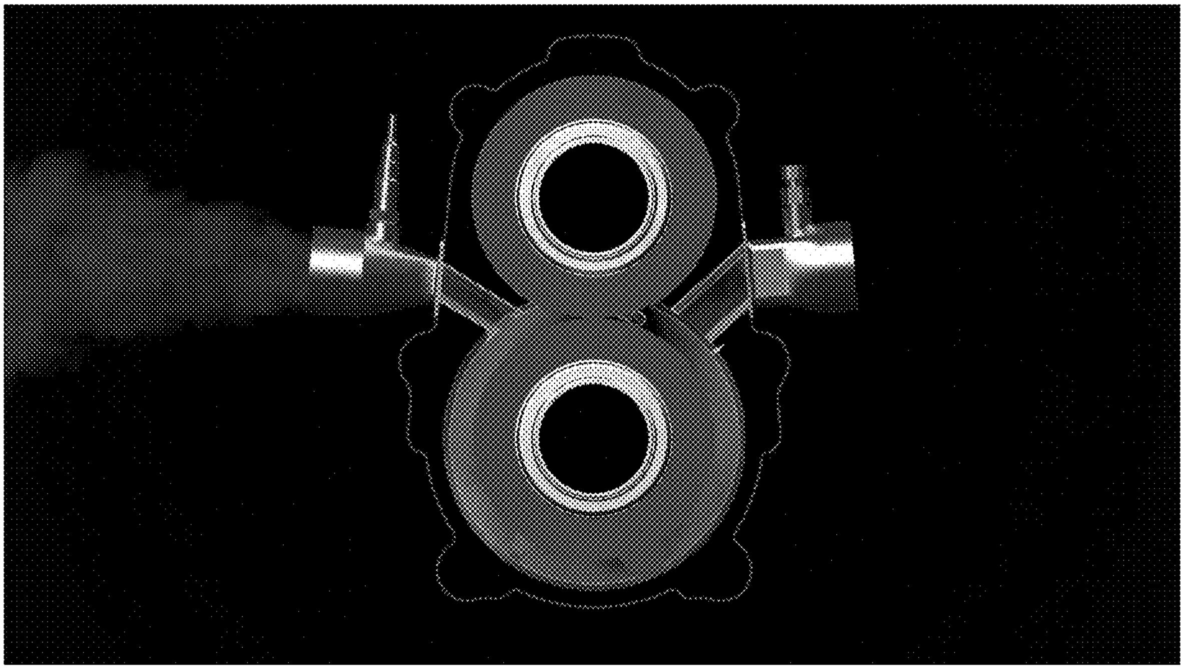
Figure 45:
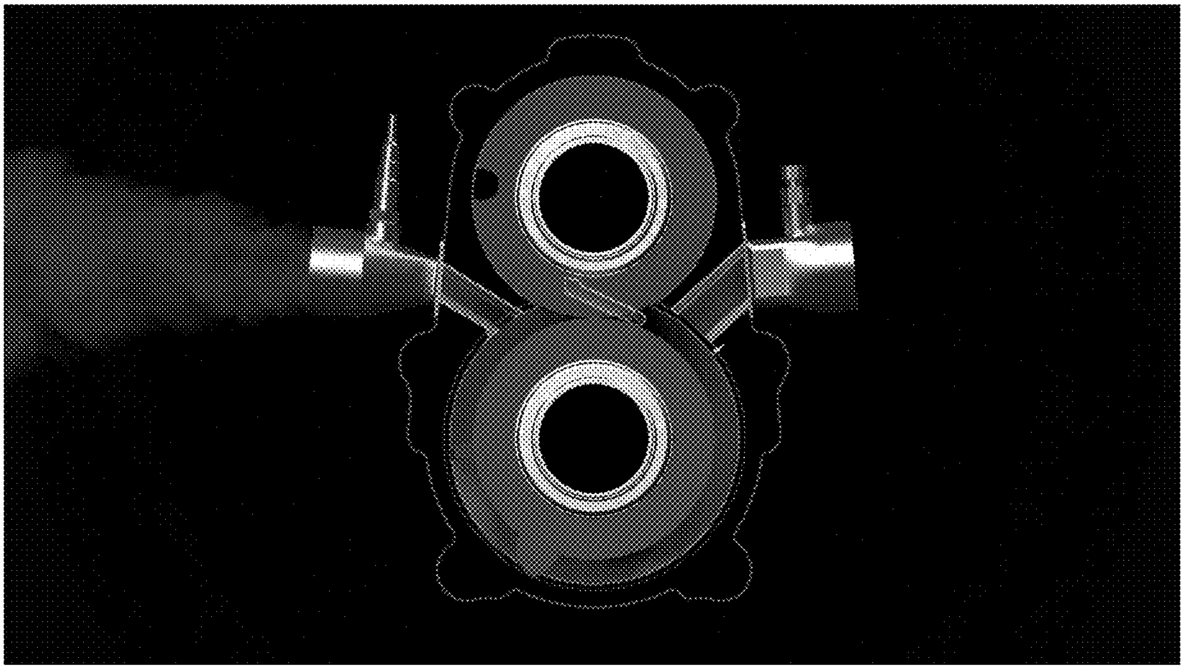
FIGS. 45-61 is a left side view (as shown from FIG. 1) sectional view of the engine of FIG. 1 showing the timing of the compression rotors in relation to the combustion rotors during several power cycles.
Figure 46:
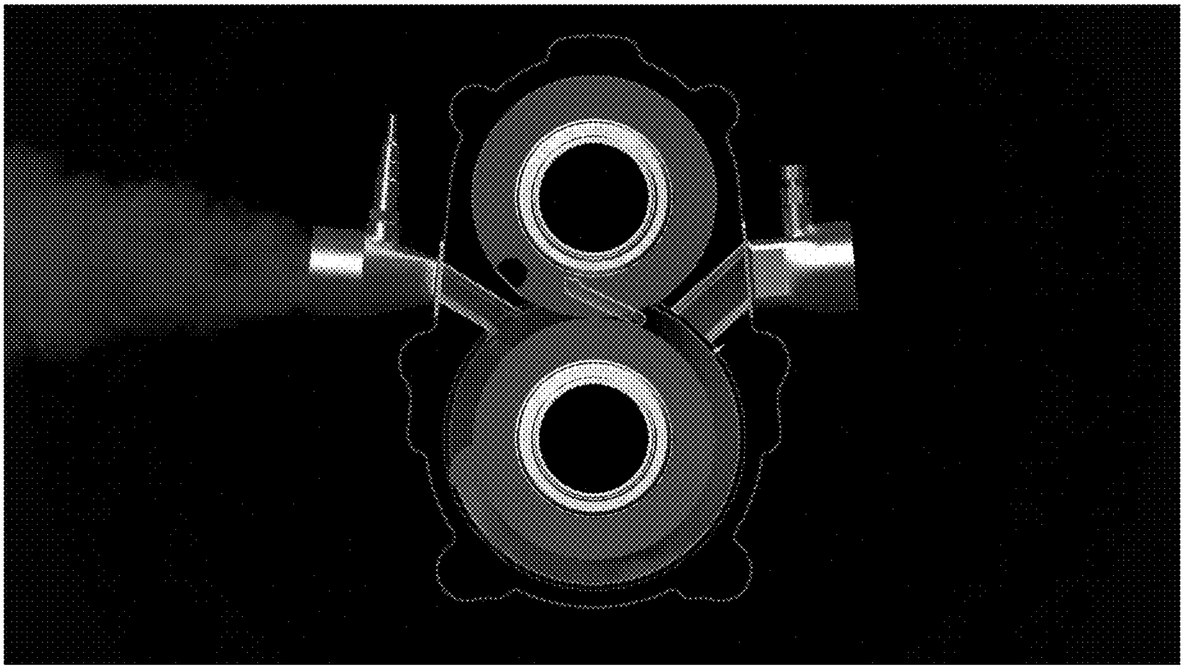
Figure 47:
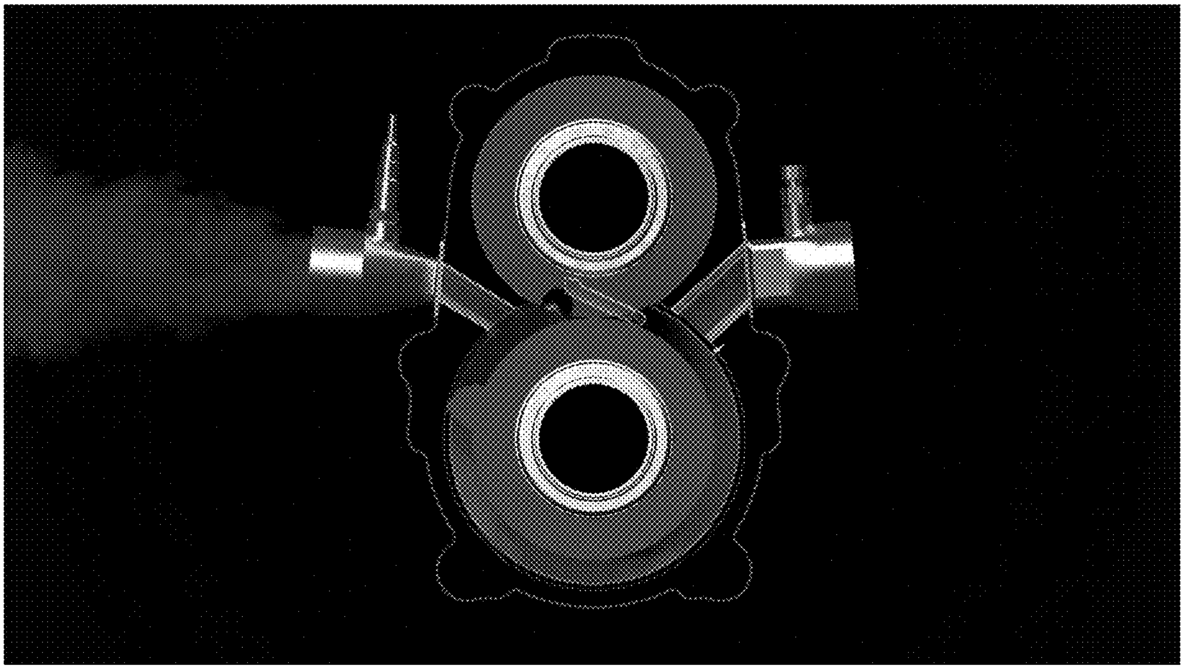
Figure 48:
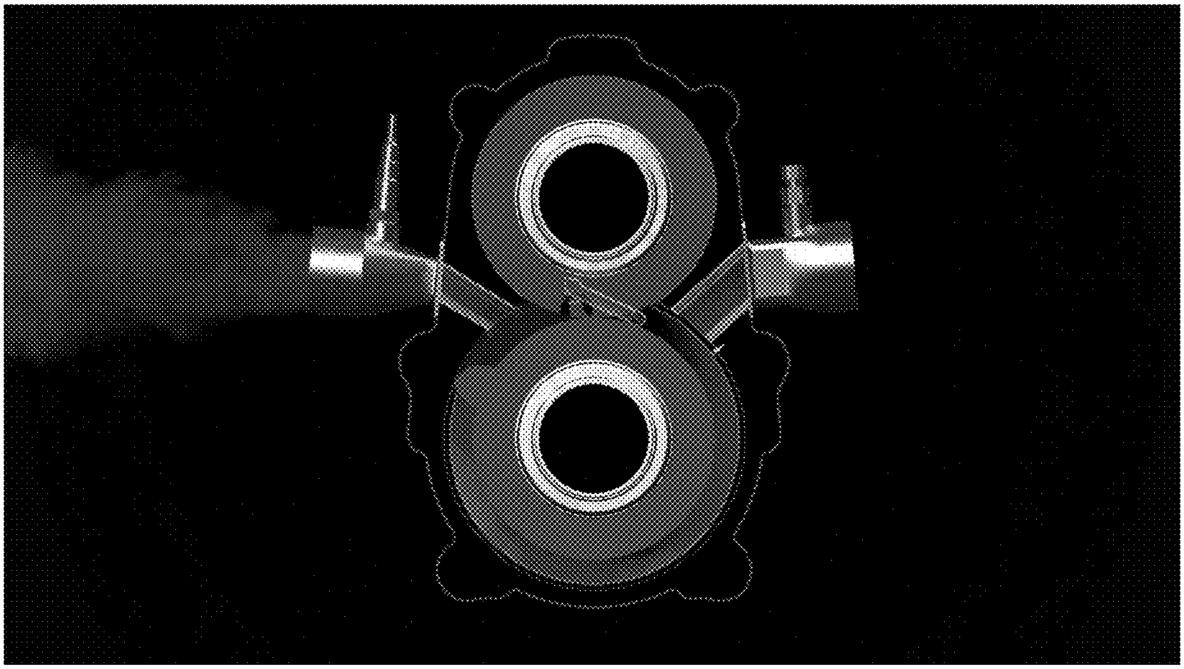
Figure 49:
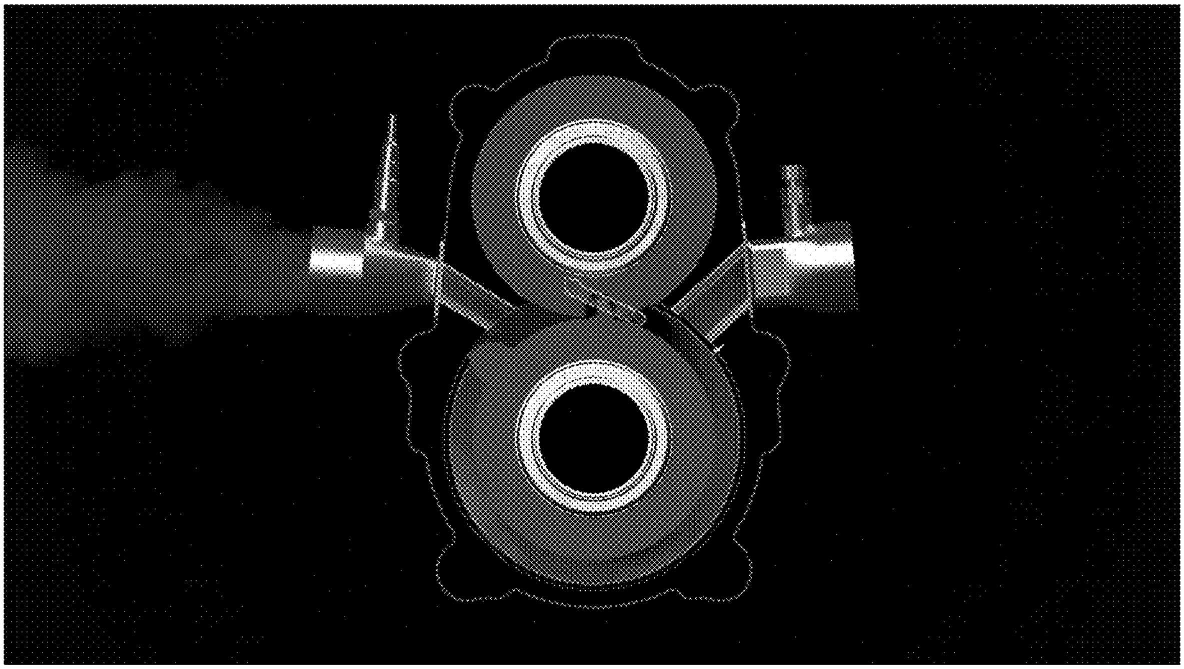
Figure 50:
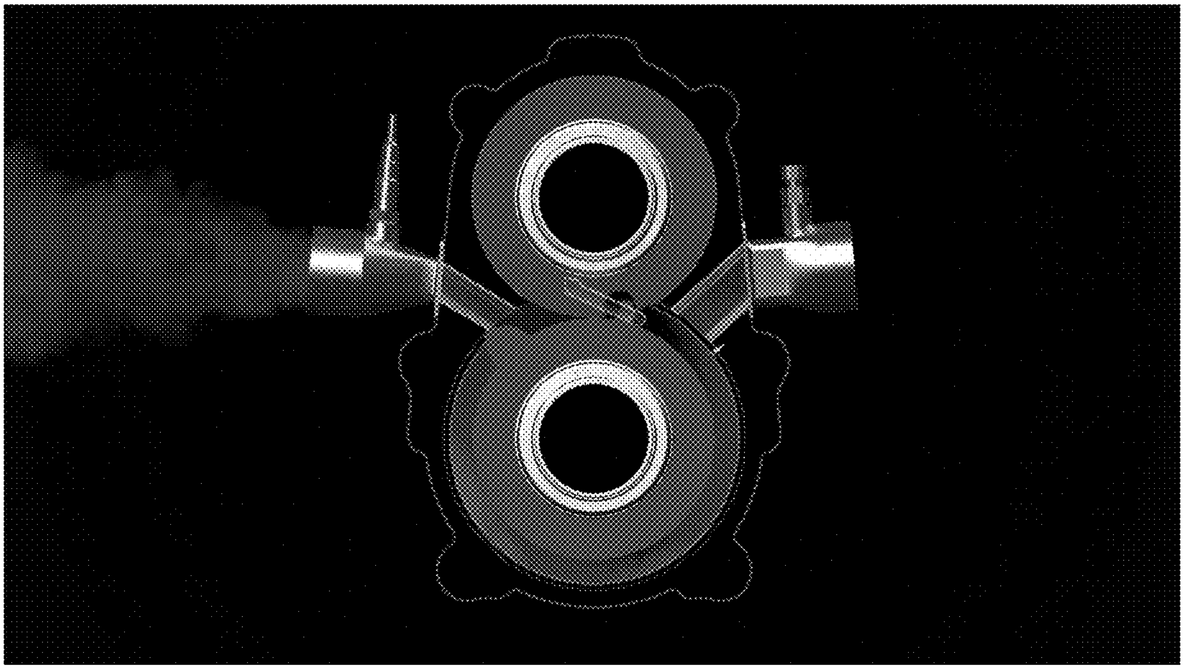
Figure 51:
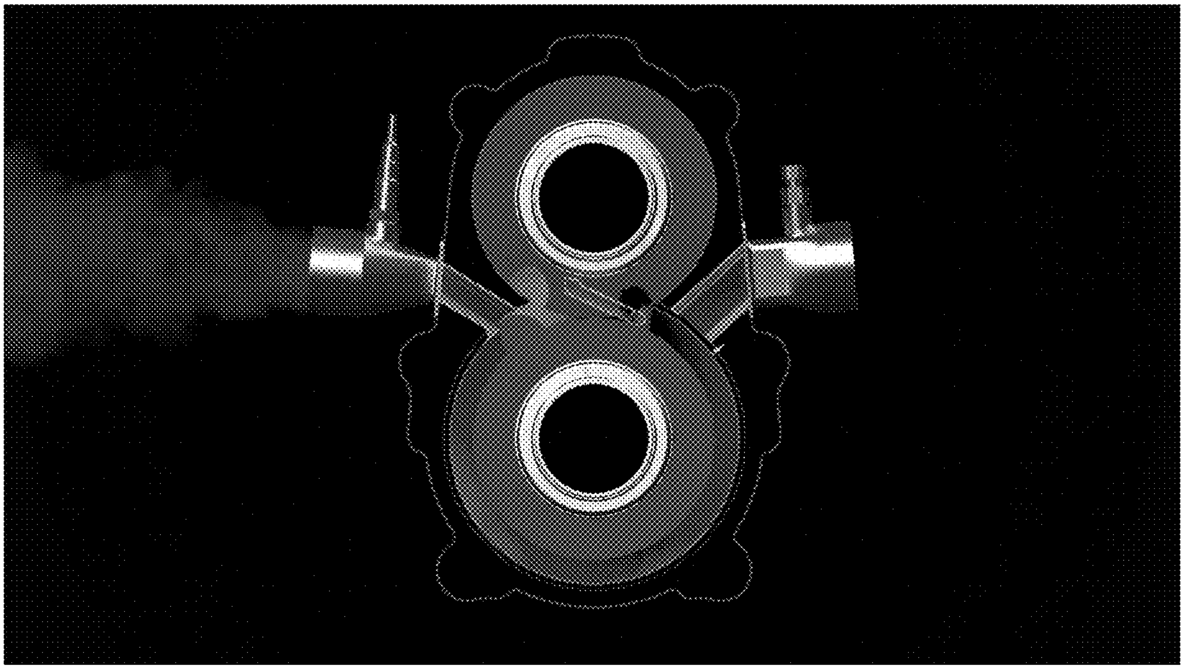
Figure 52:
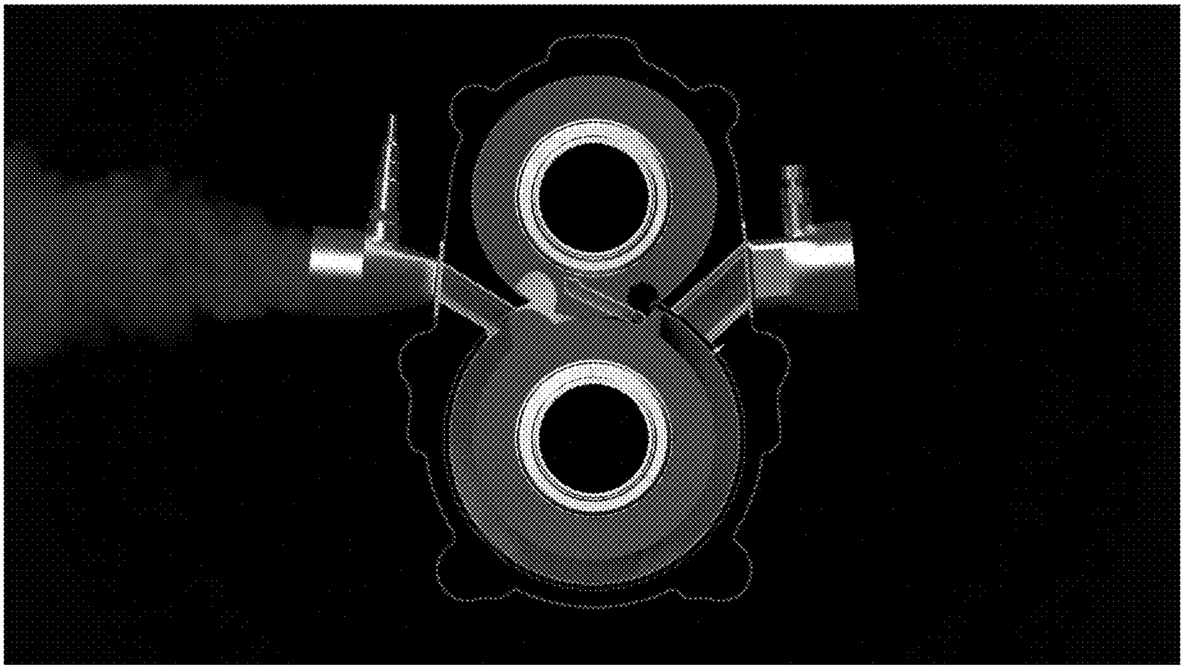
Figure 53:
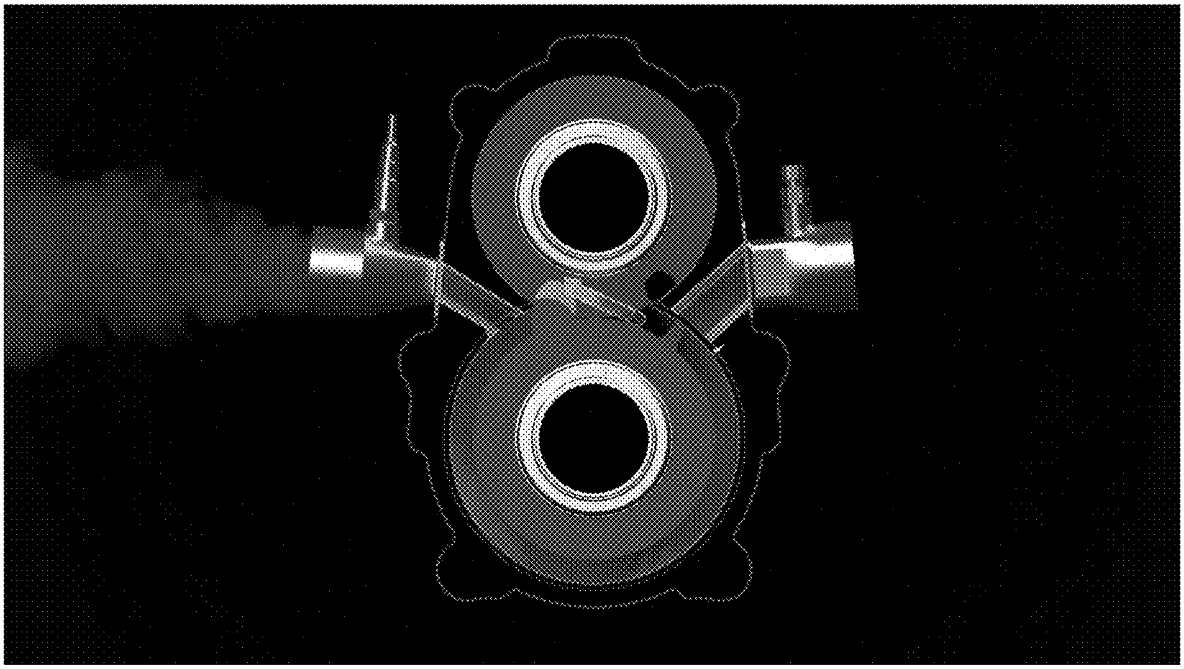
Figure 54:
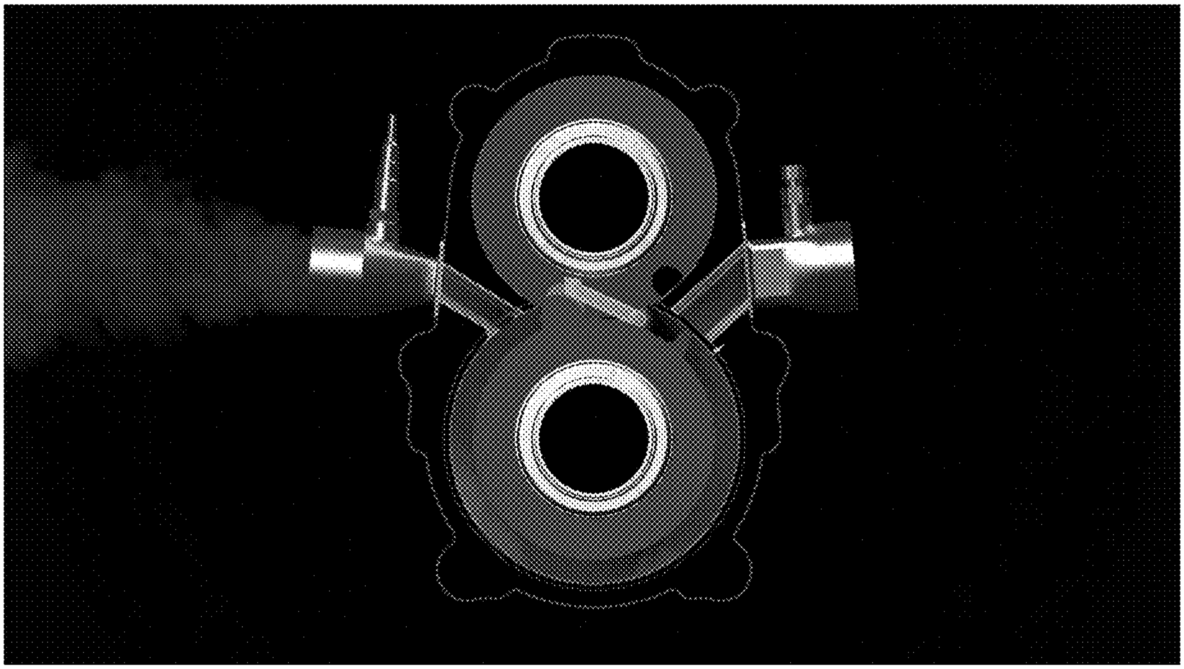
Figure 55:
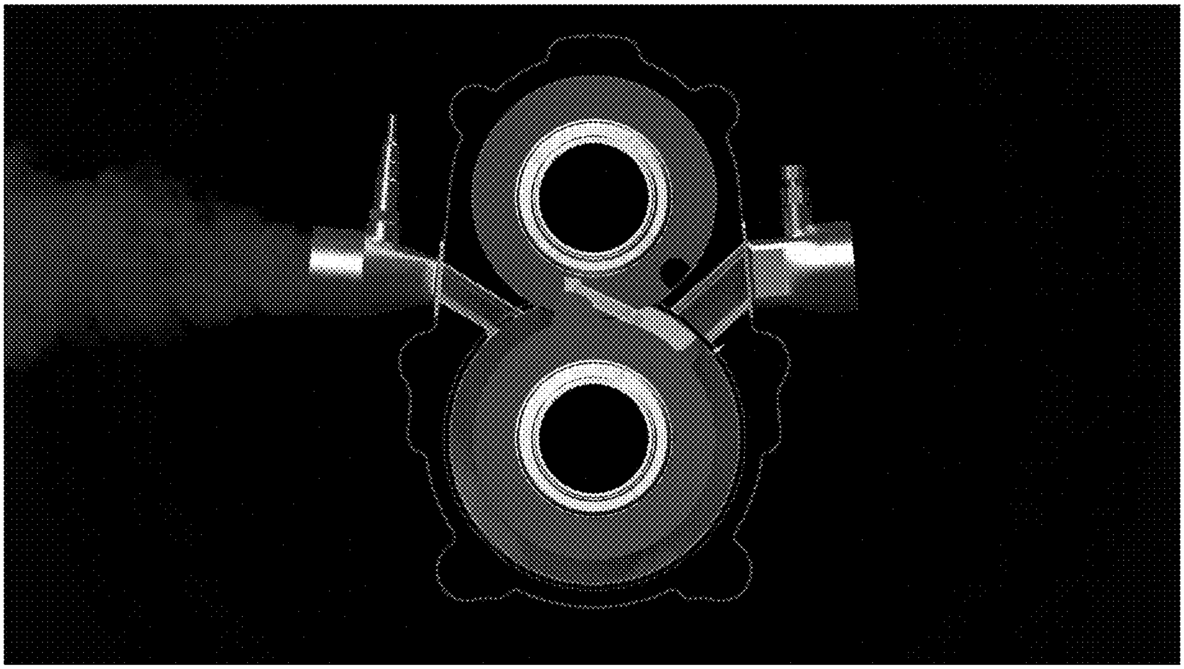
Figure 56:
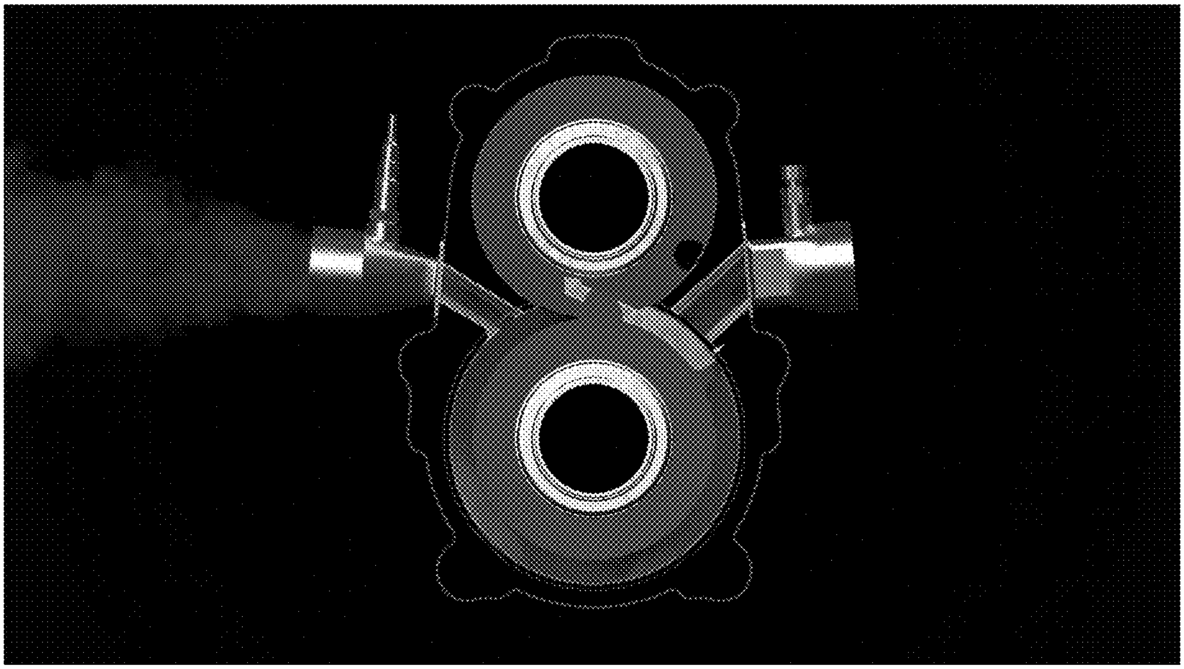
Figure 57:
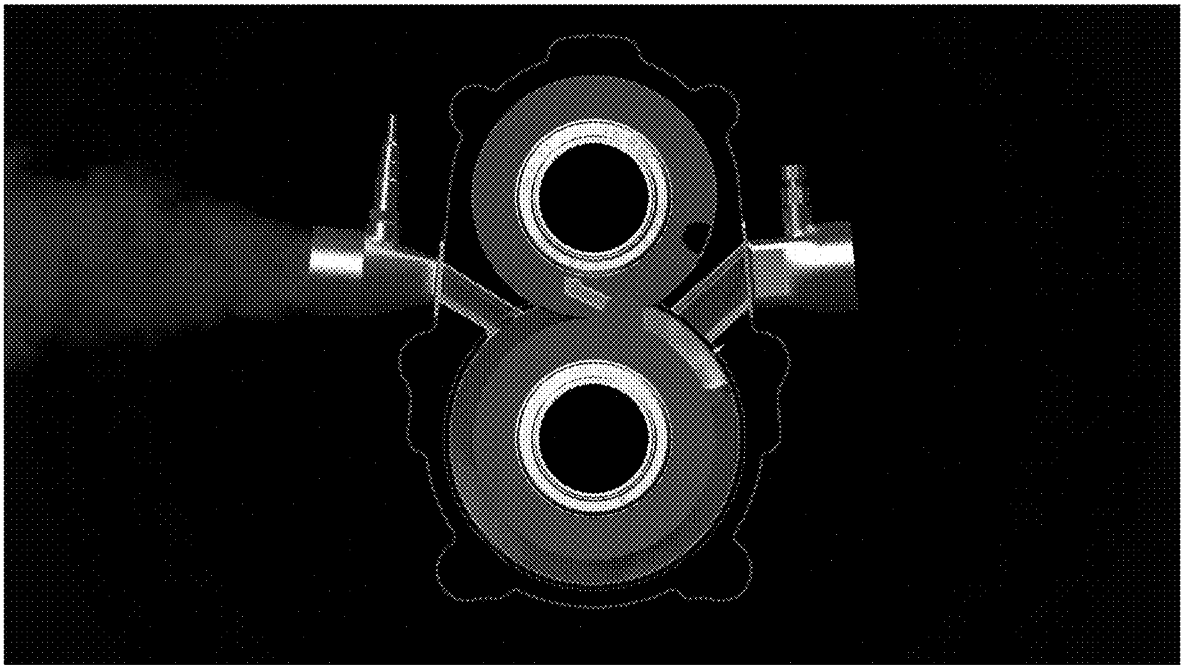
Figure 58:
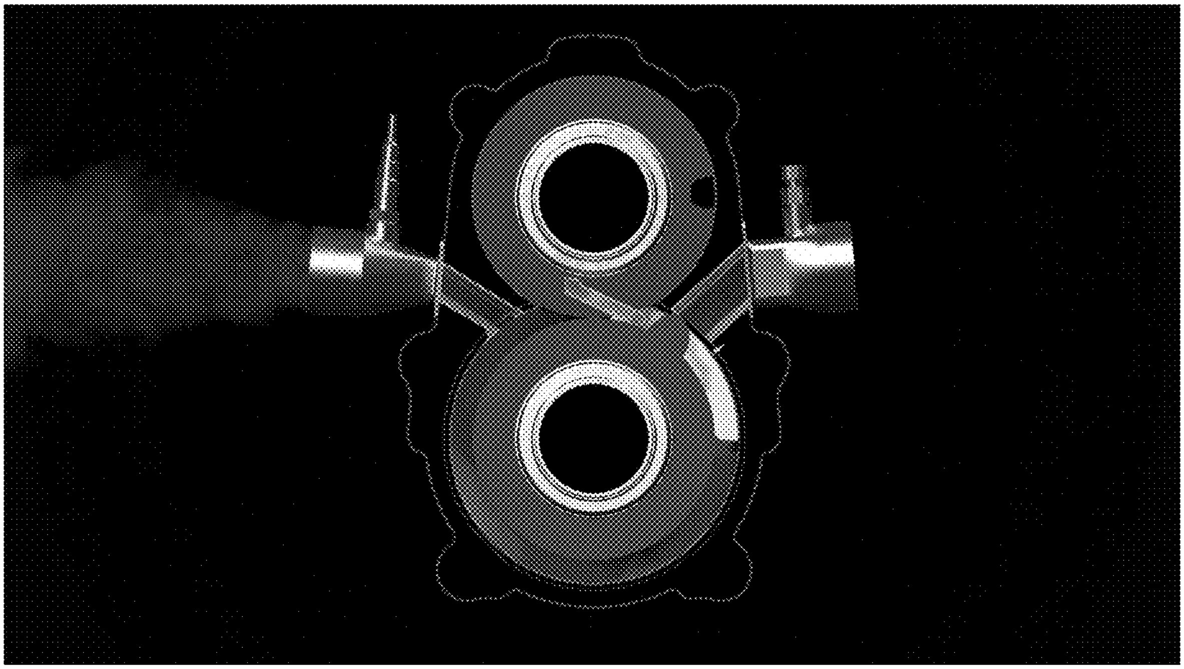
Figure 59:
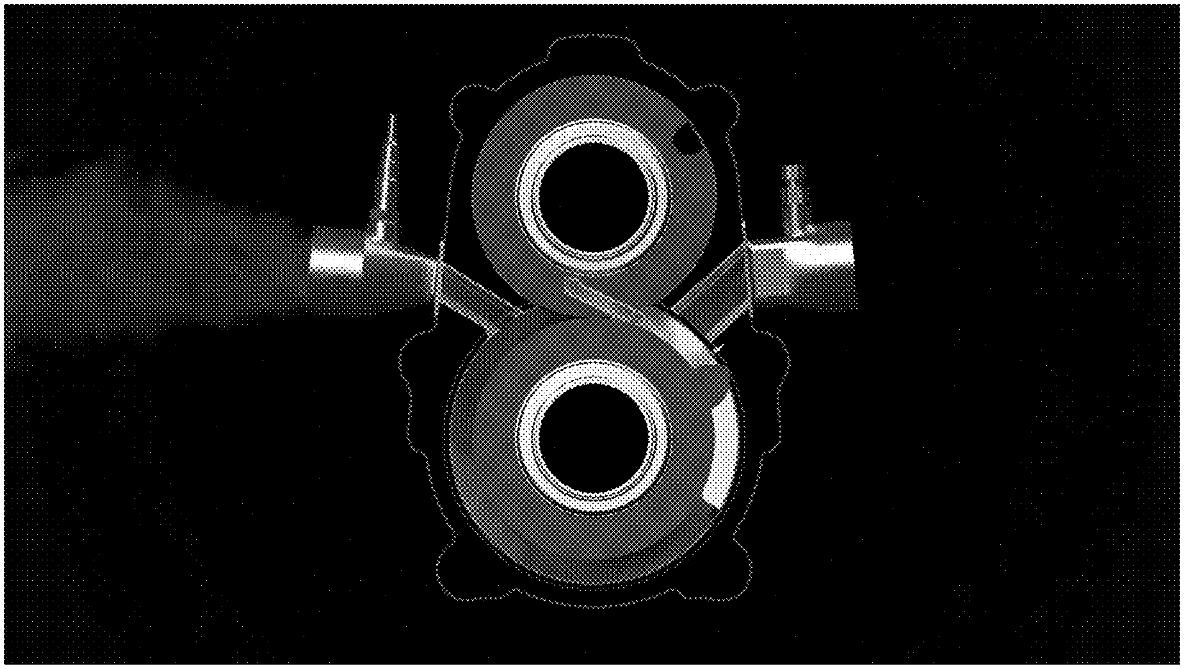
Figure 60:
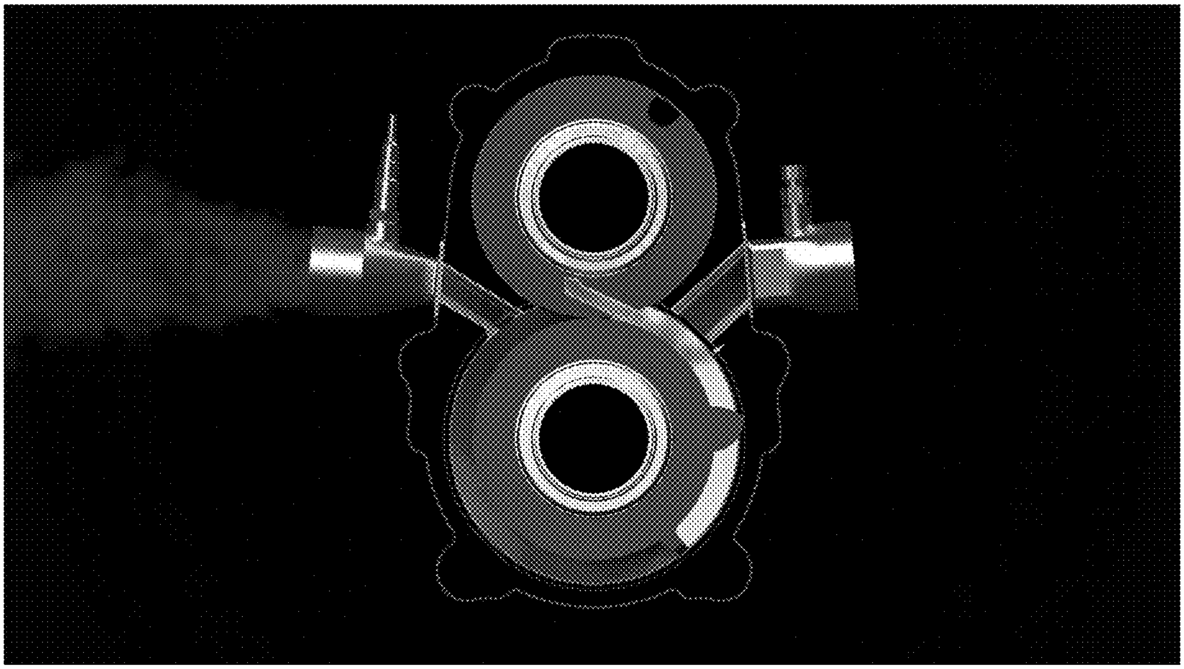

As seen in FIGS. 33-44, the light grey section of the combustion assembly is shown as transparent to better illustrate the combustion rotors). FIG. 33 shows the compression power rotor and the compression isolation rotor during a compression power cycle in which the male blade of the compression power rotor moves through the compression housing with respect to the compression power rotor. The male blade of the compression power rotor fully mates/engages with the female receptacle of the compression isolator rotor when the male blade is at top dead center and the receptacle is at bottom dead center. The blade pushes air (intake fluid) from the intake port and compresses the intake fluid against the isolator rotor as the rotors rotate. FIGS. 34-35 shows a compression power cycle as a male blade of the compression power rotor moves through the compression housing and approaches the compression isolation rotor receptacle during a compression power cycle. FIG. 36 shows compressed fluid being transitioned from the compression chamber into the compression isolation rotor receptacle. FIGS. 37-39 shows the compression power stoke where compressed fluid is transitioned from the compression assembly into the transition channel and then into combustion assembly. FIG. 40 depicts the compression assembly as the compression assembly moves from a first compression power cycle (described above) to a second compression power cycle. FIG. 40 also shows the ignition and beginning of the combustion cycle in the combustion assembly. FIGS. 41-44 shows a male blade of the compression power rotor moving through the compression housing with respect to the compression power rotor and a male blade of a combustion power rotor during a subsequent power cycle.

Figure 61:
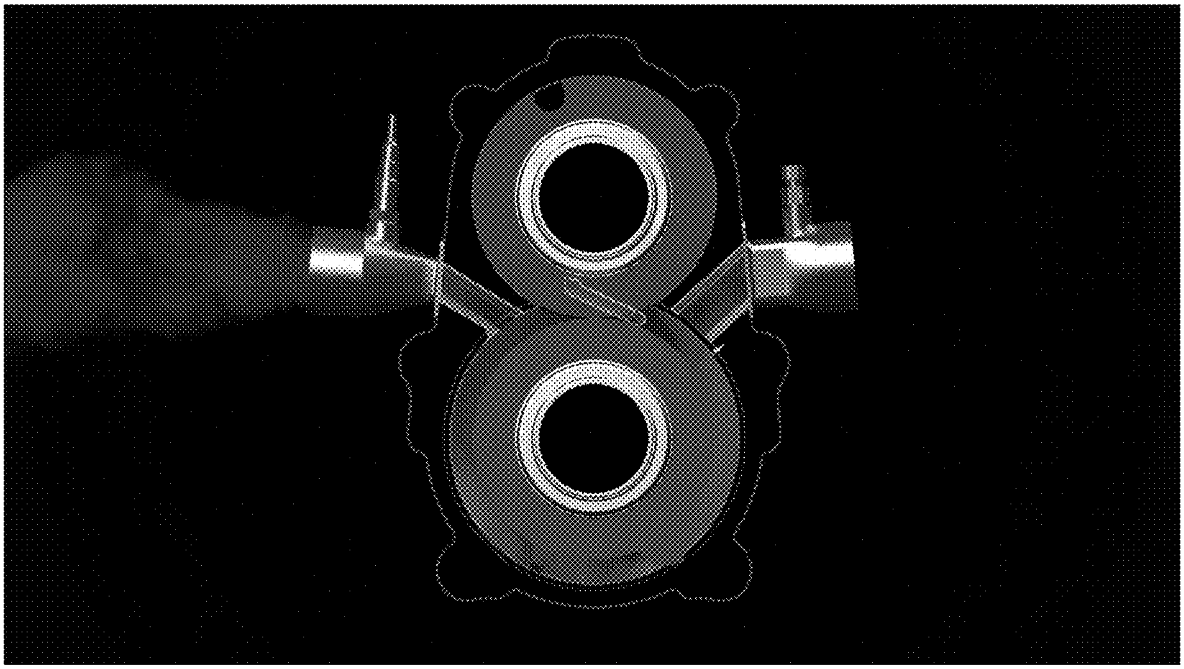

As seen in FIGS. 45-61, the compression rotors are shown in blue, and the combustion rotors are shown in red. In FIGS. 45-61 the compression isolator rotor is shown as transparent (as is the light gray section of the combustion assembly) to better illustrate the combustion rotors. FIGS. 45-50 show the male blade of the compression power rotor and the male blade of the combustion power rotor moving through their respective housing, during a power cycle of the engine. FIGS. 51-55 show compressed fluid moving from the compression housing into the transition channel and then into the combustion housing. FIGS. 55-60 show the compressed fluid and/or mixture of compressed fluid and fuel being moving from the transition channel into the combustion chamber and a male blade of the combustion power rotor moving though the combustion housing during a power stroke of the engine. FIG. 61 shows a male blade of the compression power rotor moving through the compression housing with respect to the compression power rotor and a male blade of a combustion power rotor during a subsequent power cycle.

Figure 62:
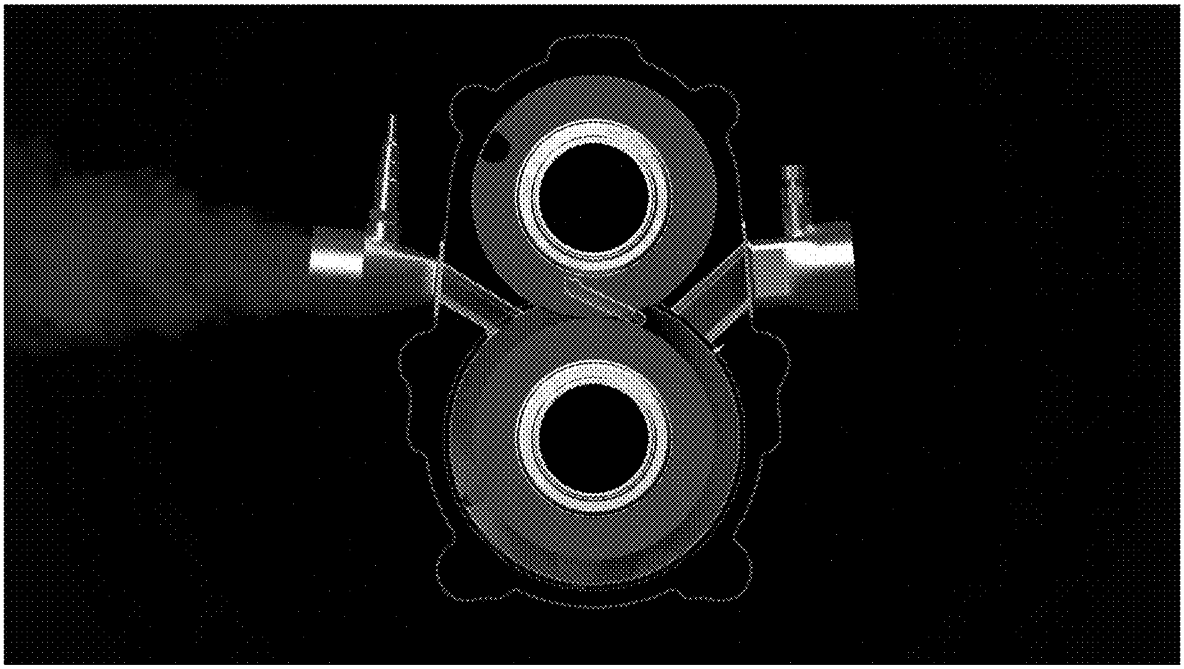
FIGS. 62-75 is a left side view (as shown from FIG. 1) sectional view of the engine of FIG. 1 showing the timing of the combustion rotors in relation to the compression rotors during several power cycles.
Figure 63:
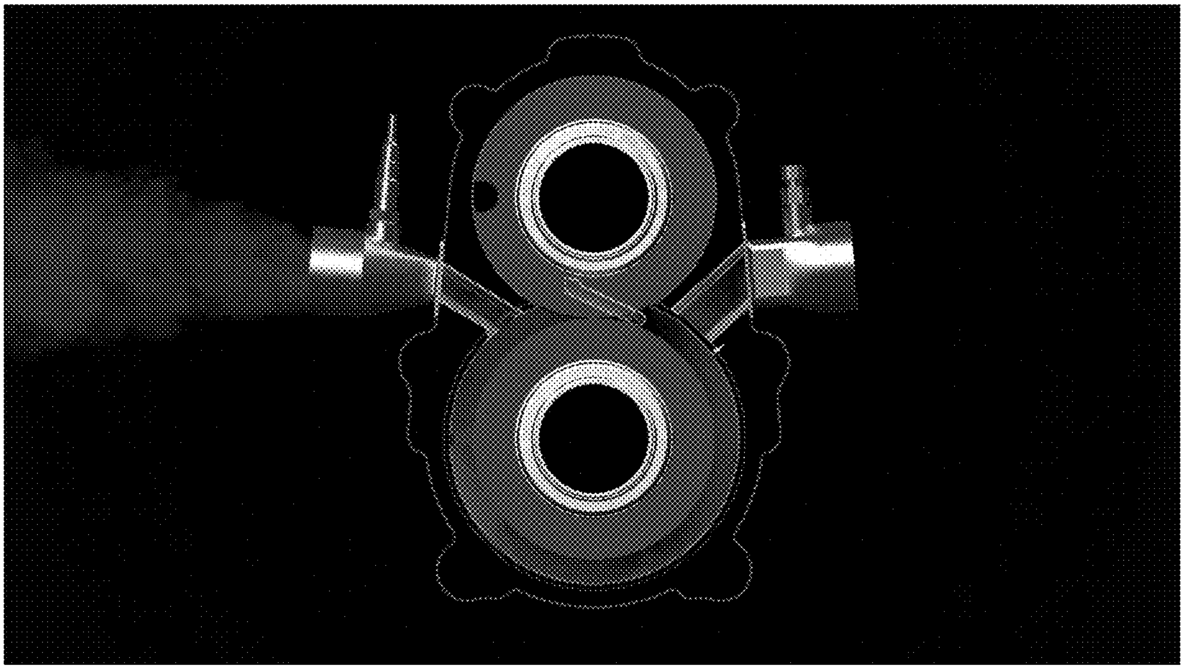
Figure 64:
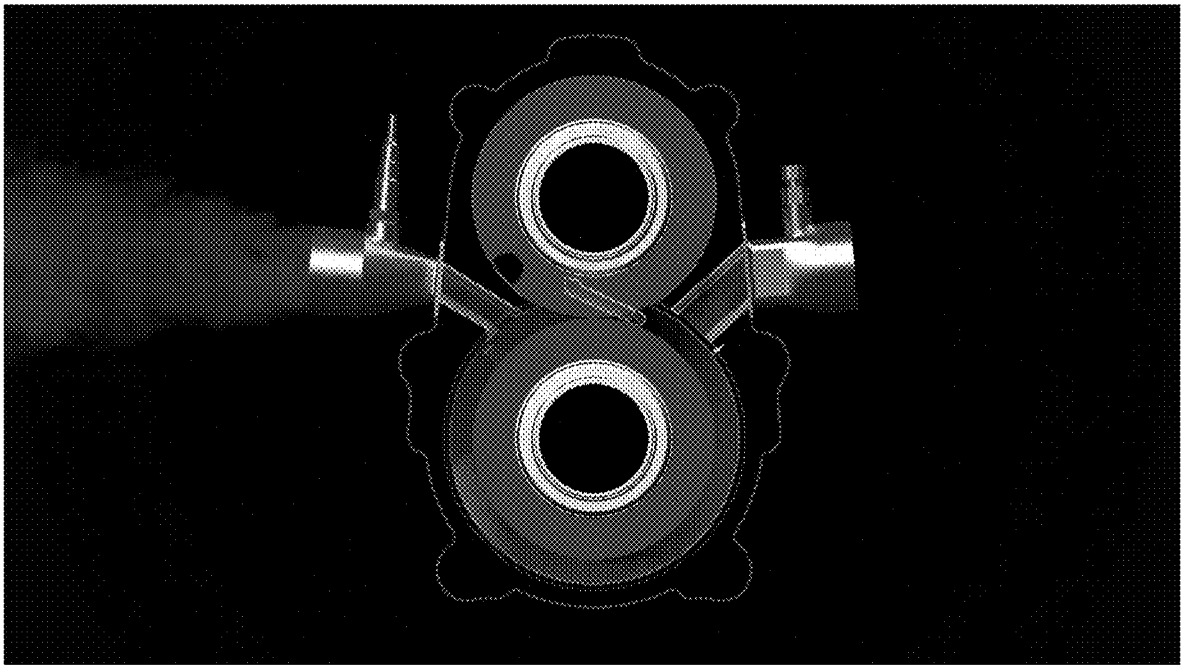
Figure 65:
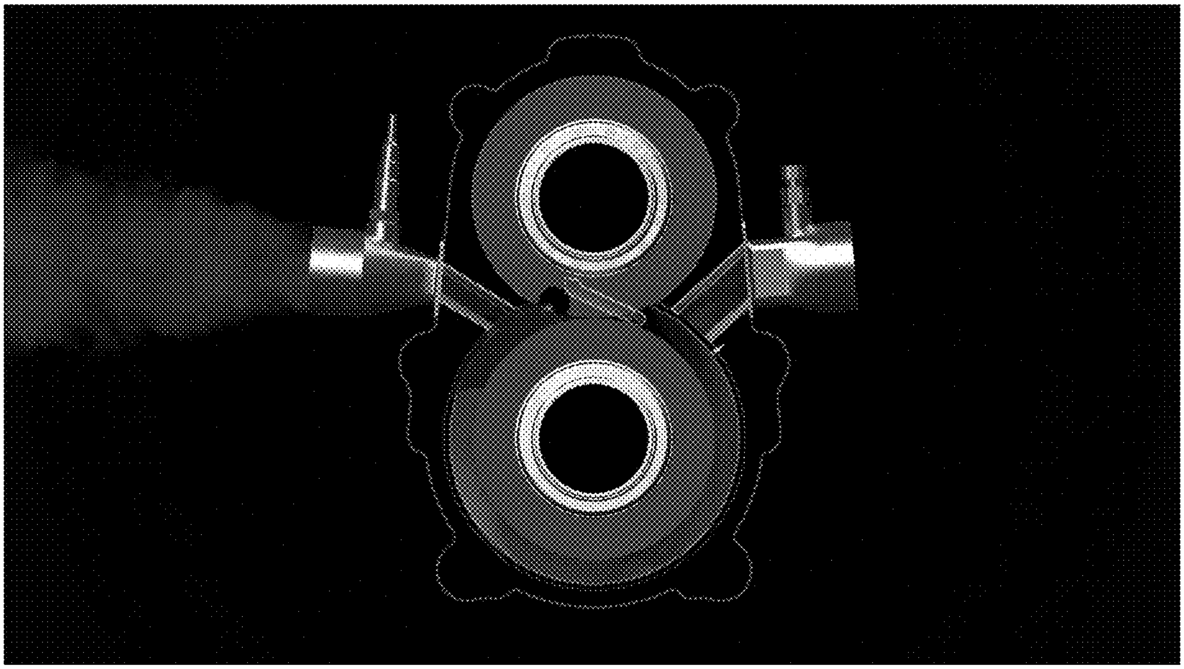
Figure 66:
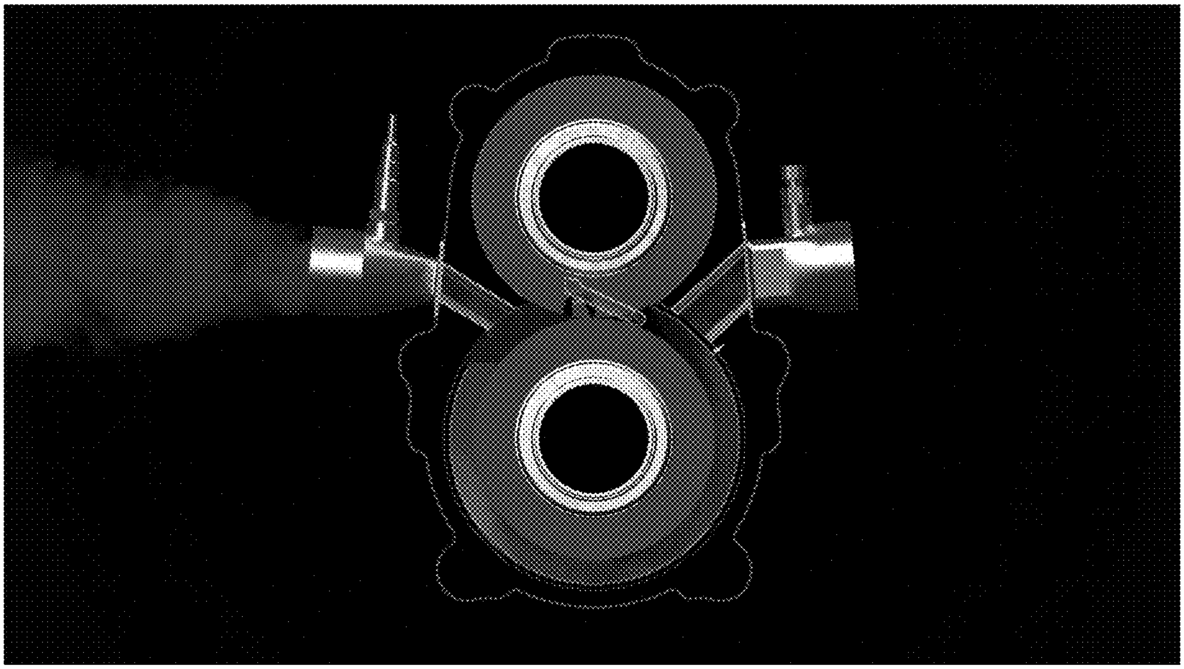
Figure 67:
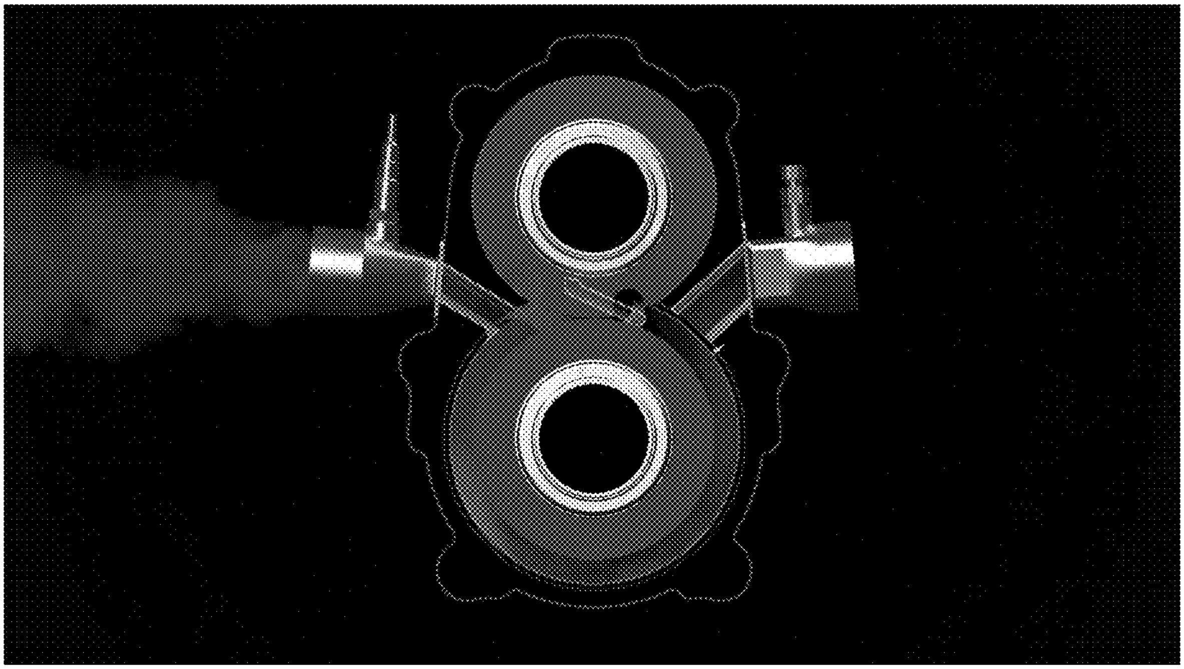
Figure 68:
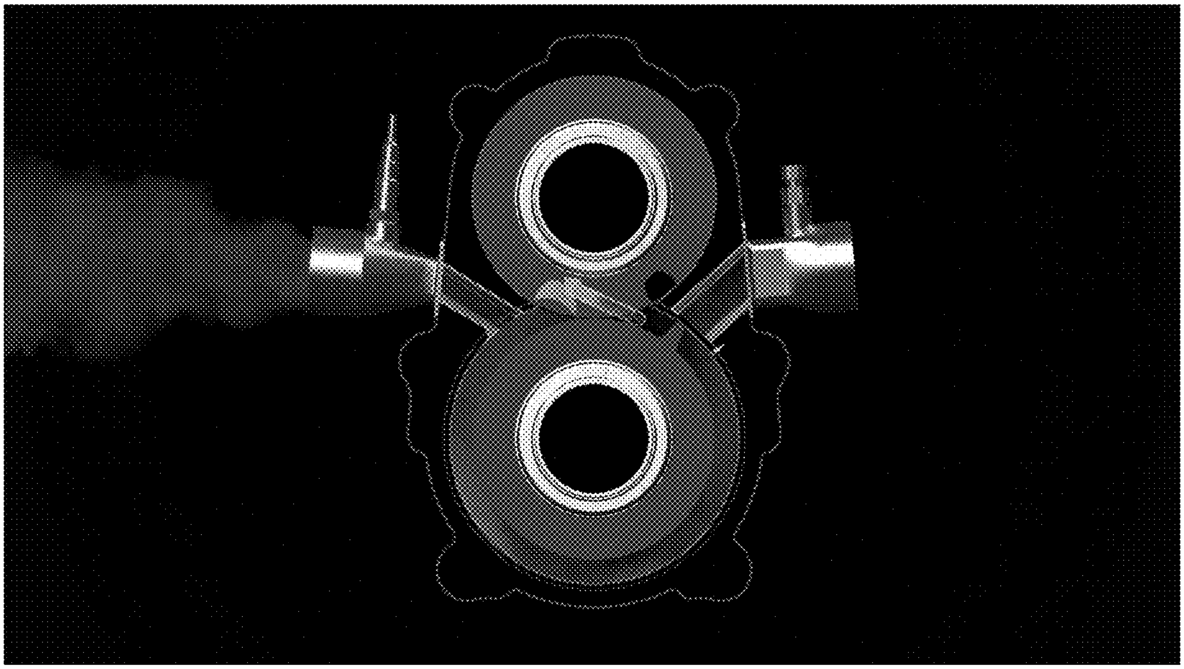
Figure 69:
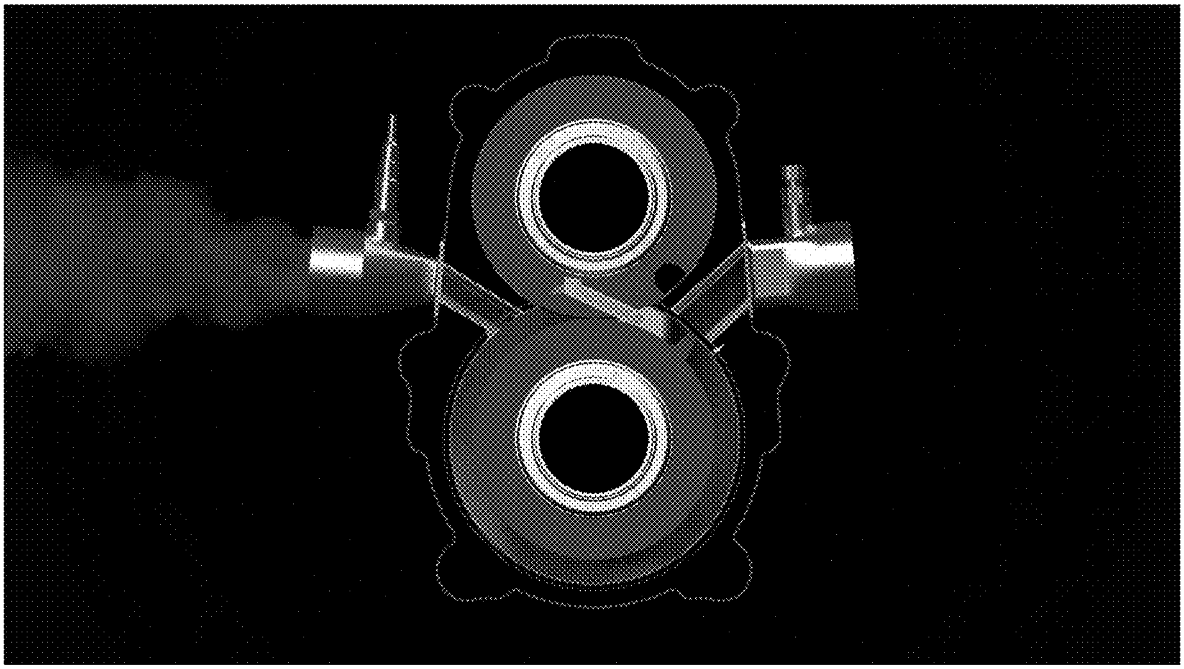
Figure 70:
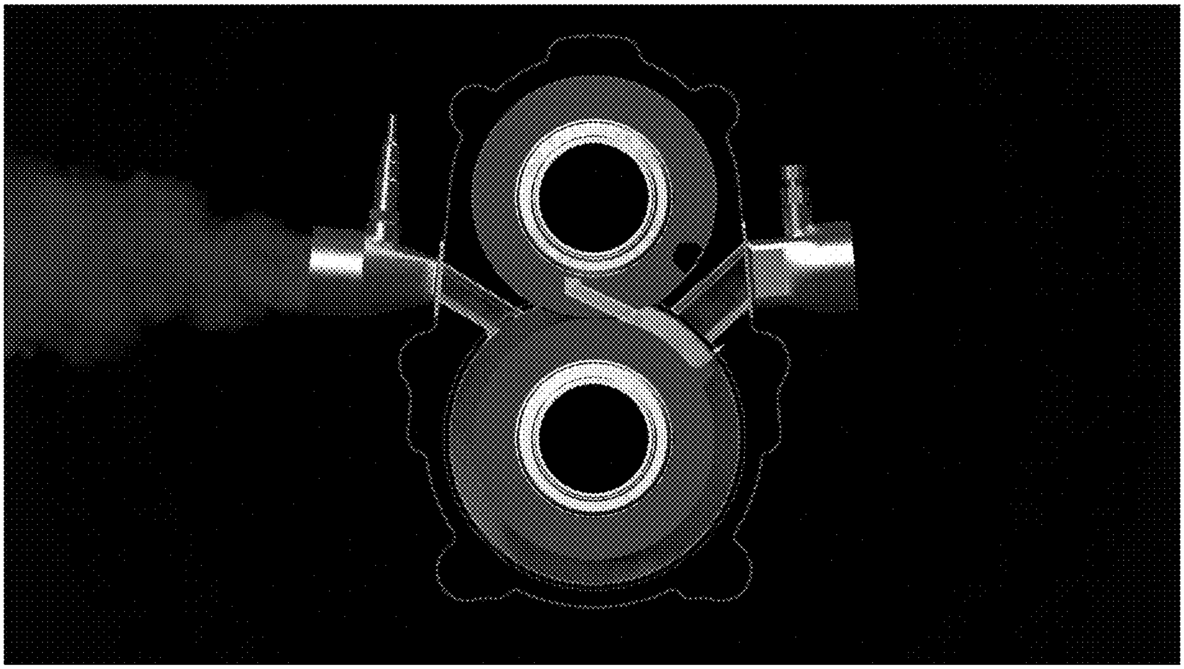
Figure 71:
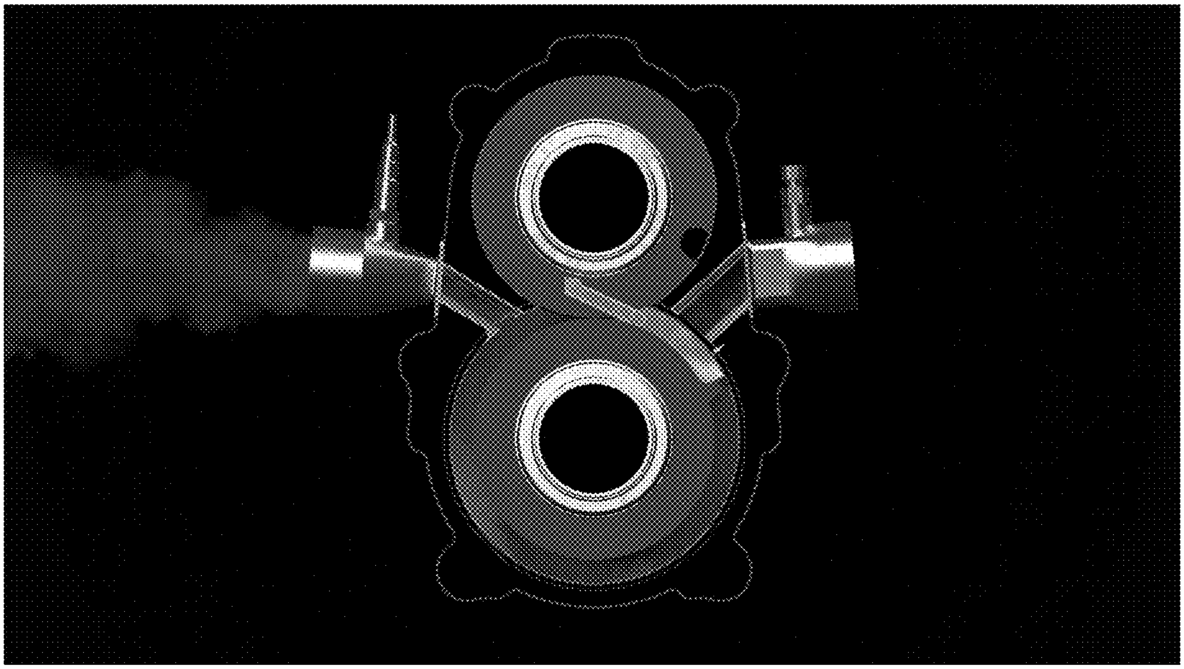
Figure 72:
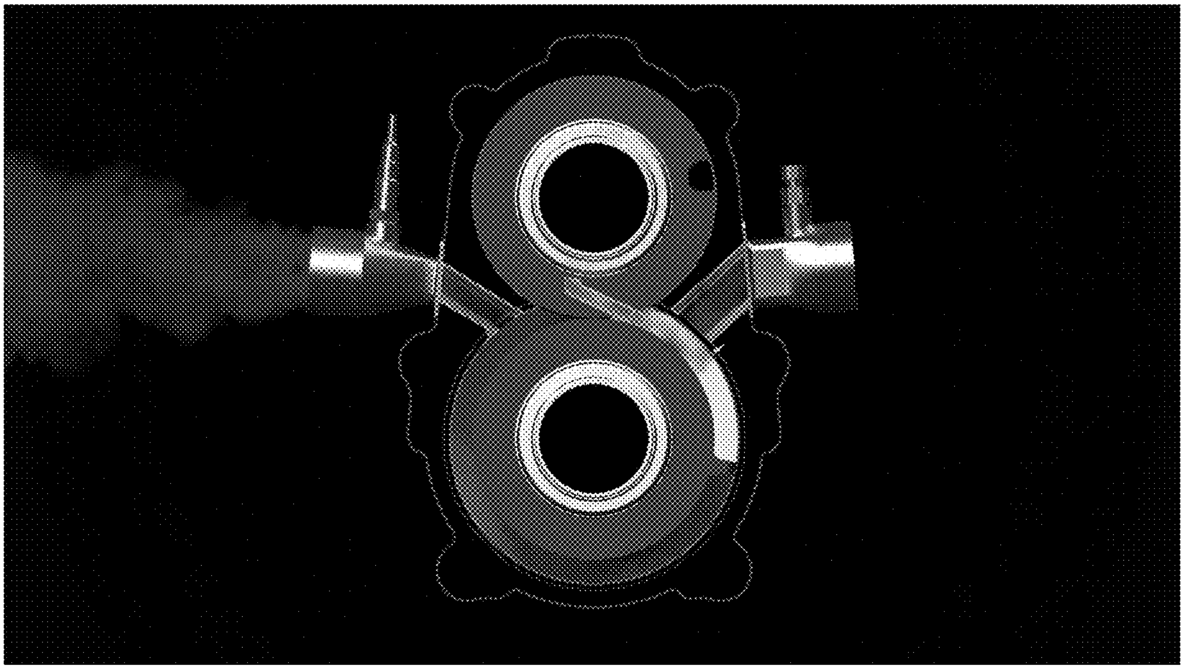
Figure 73:
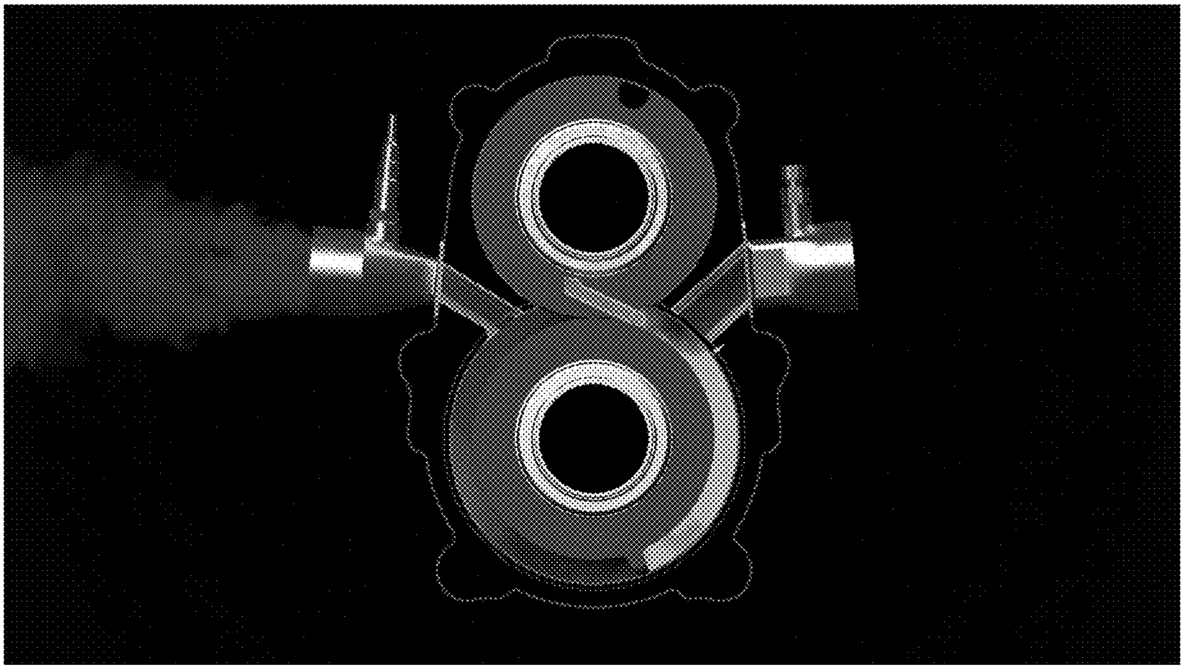
Figure 74:
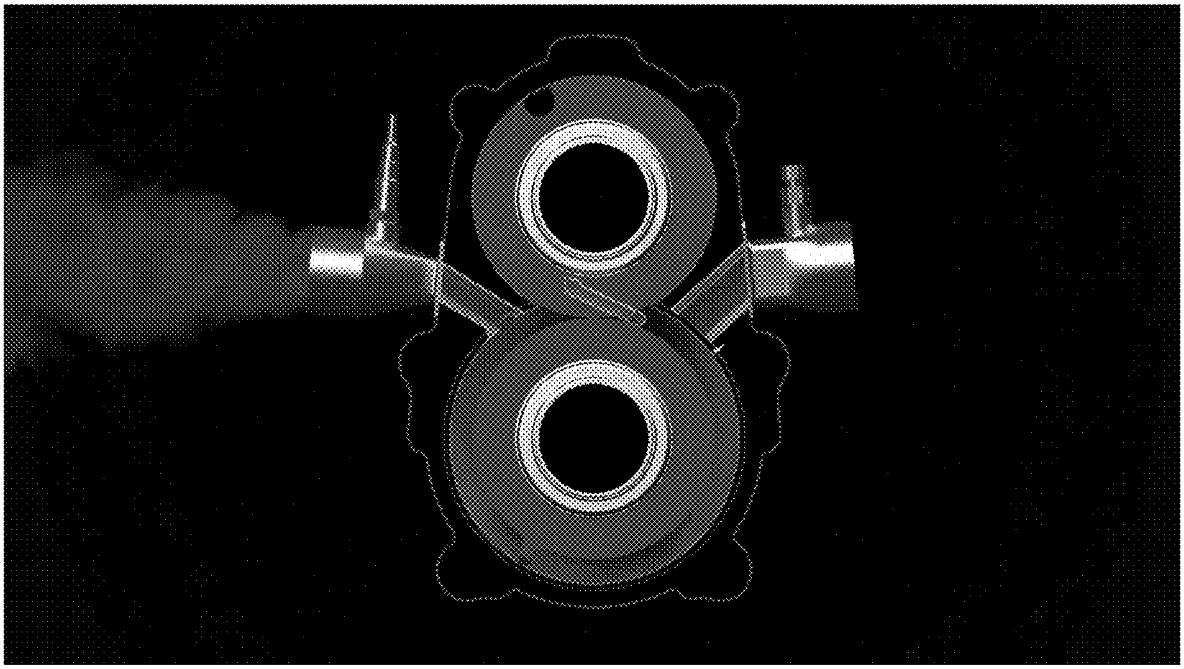
Figure 75:
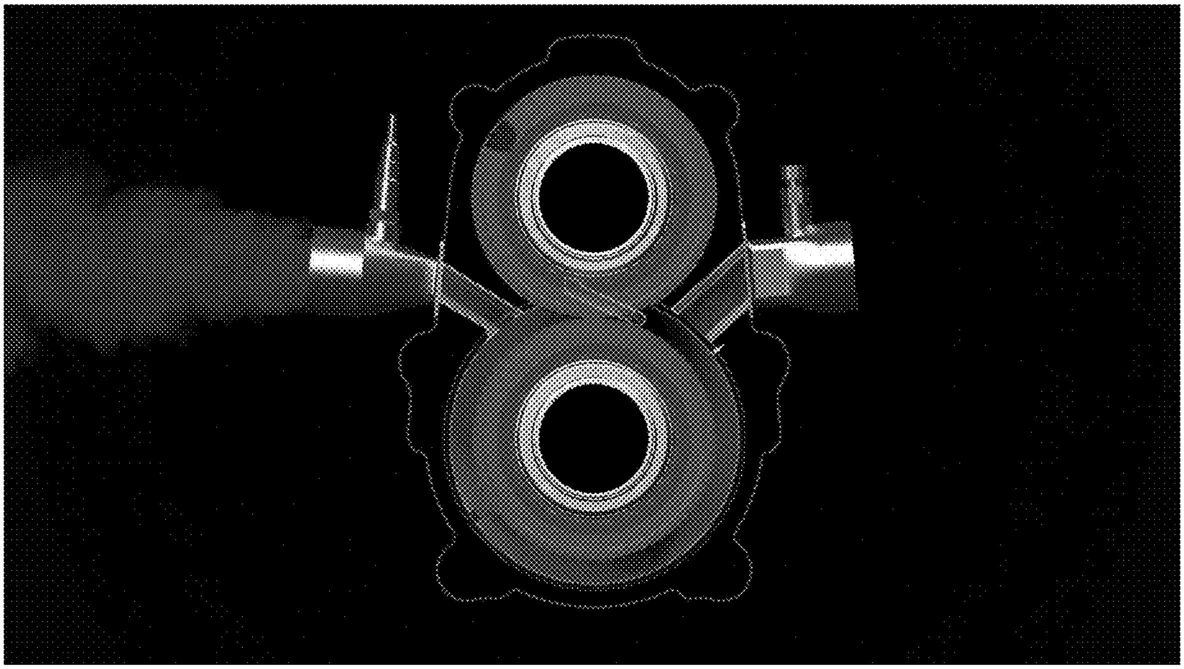
Figure 76:
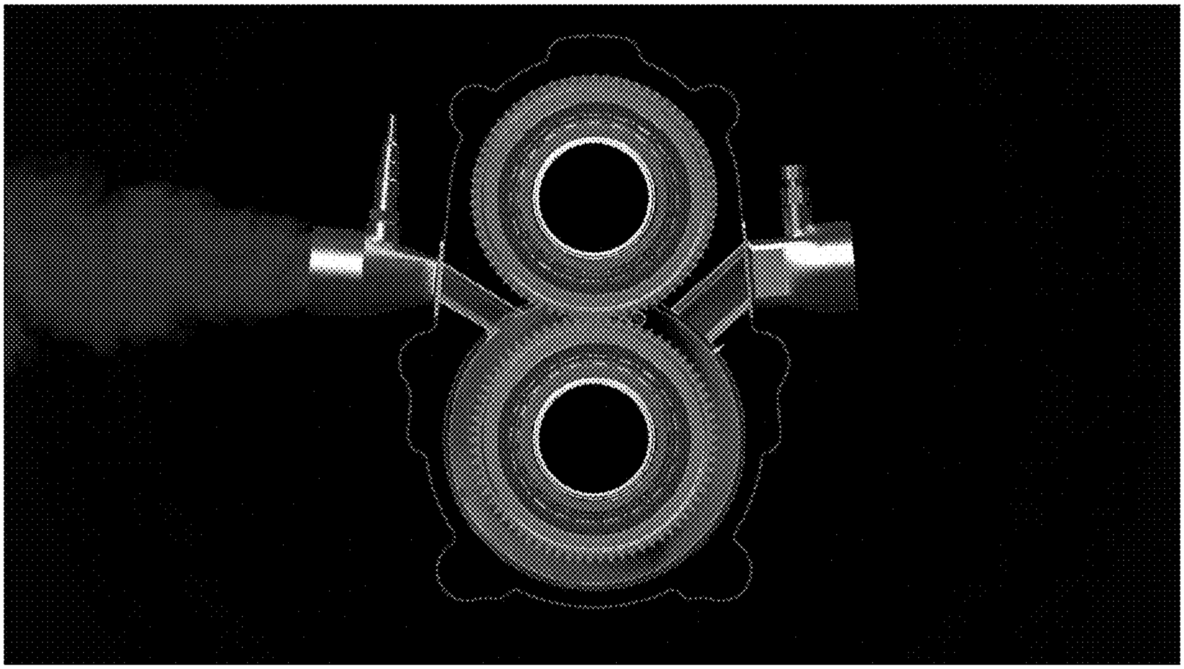
FIGS. 76-82 is a left side view (as shown from FIG. 1) sectional view of the engine of FIG. 1 showing the timing of the male blades of the compression and combustion power rotors in relation to the gear and/or bearing assembly during several power cycles.
Figure 77:
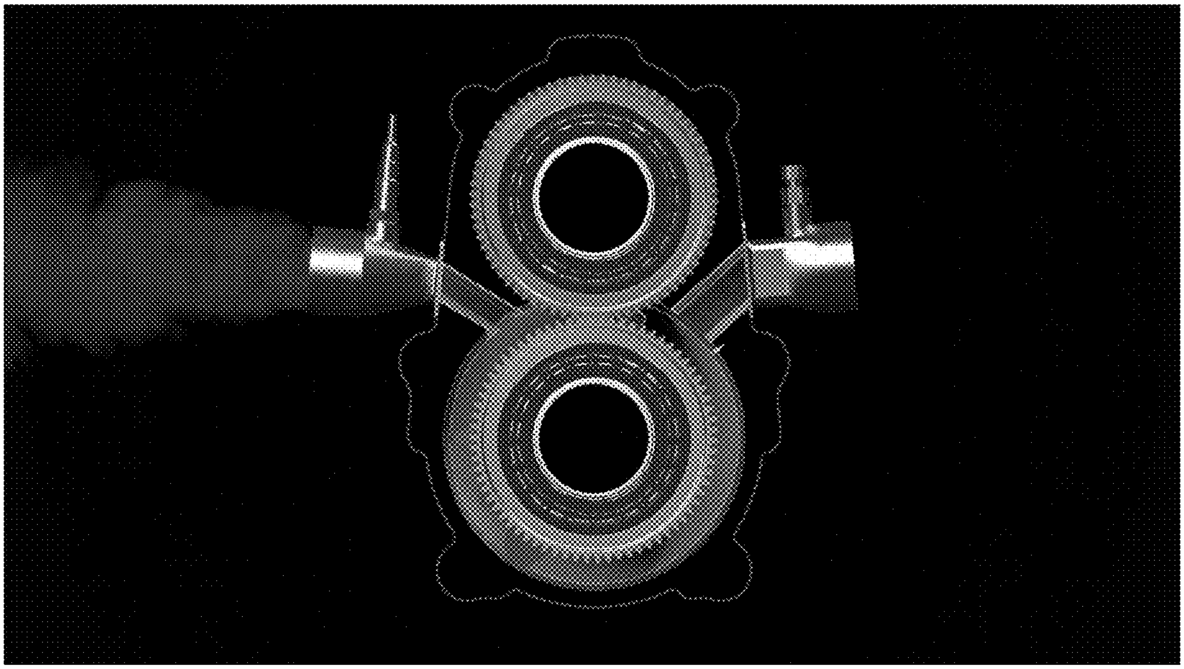
Figure 78:
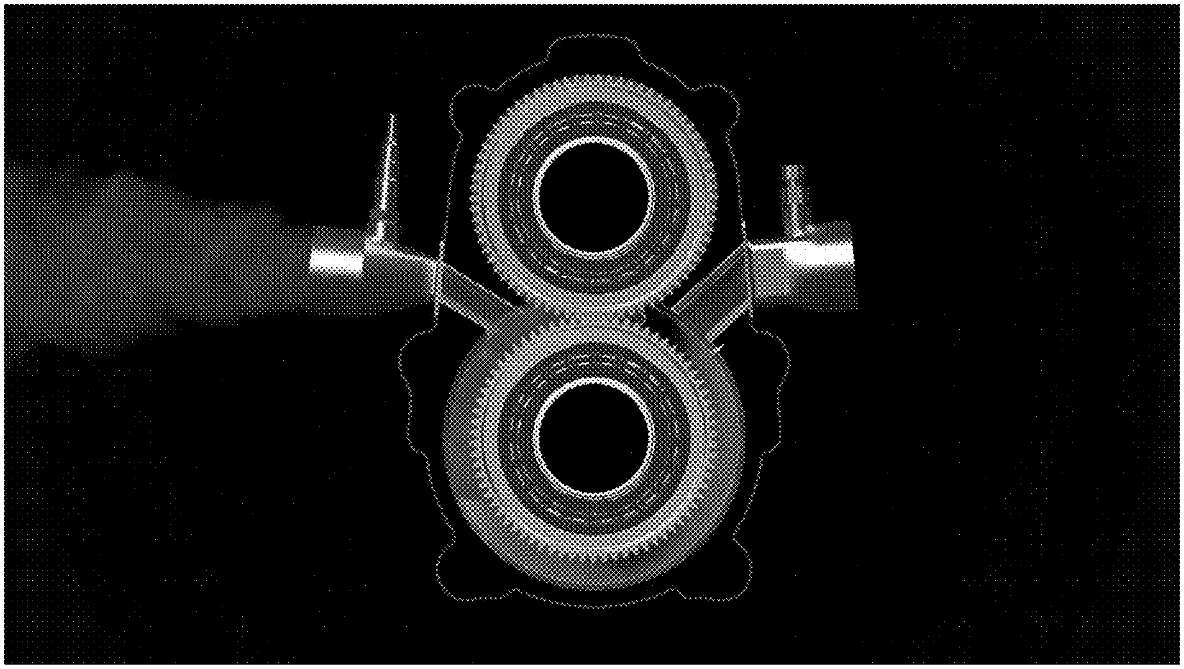
Figure 79:
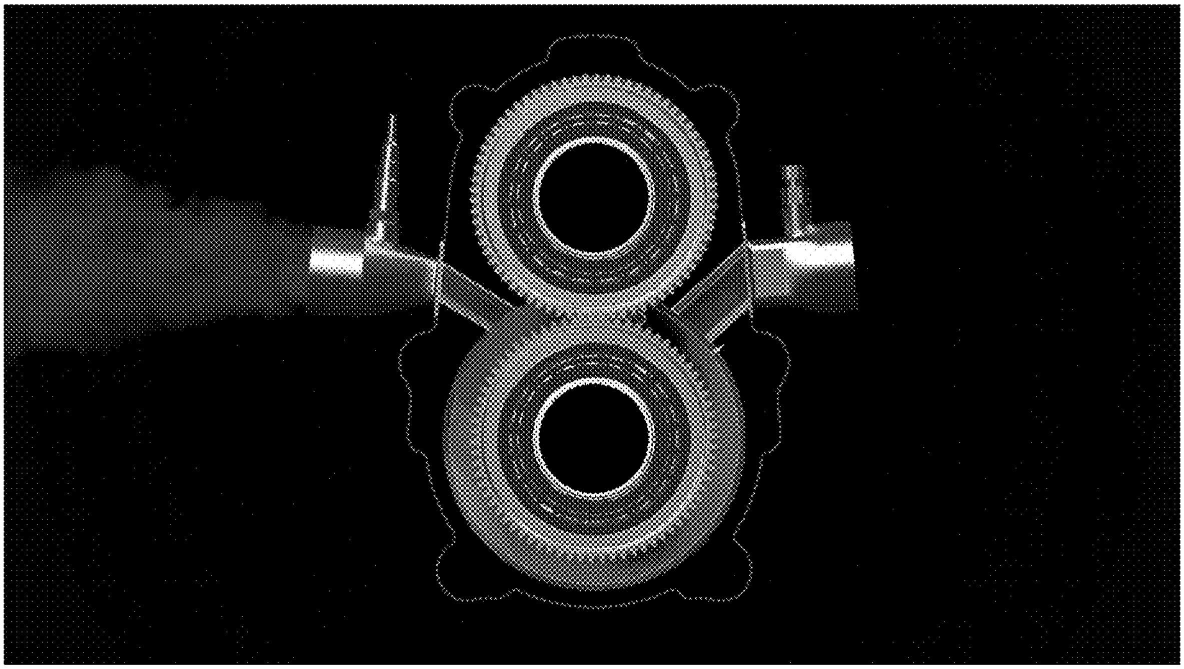
Figure 80:
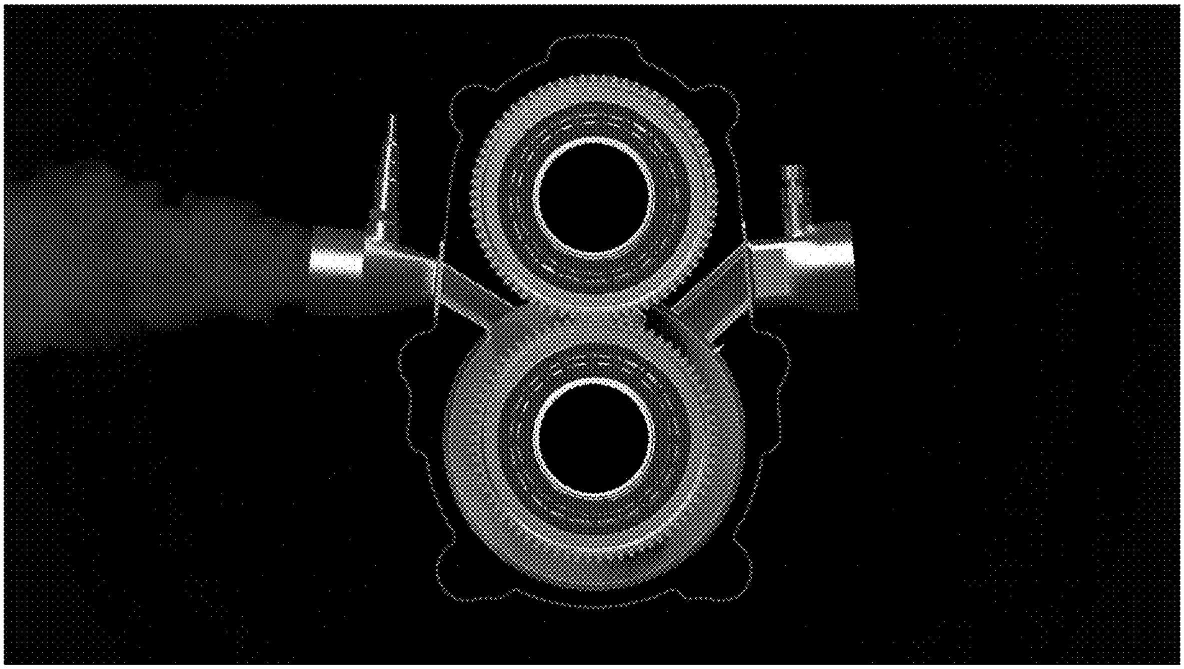
Figure 81:
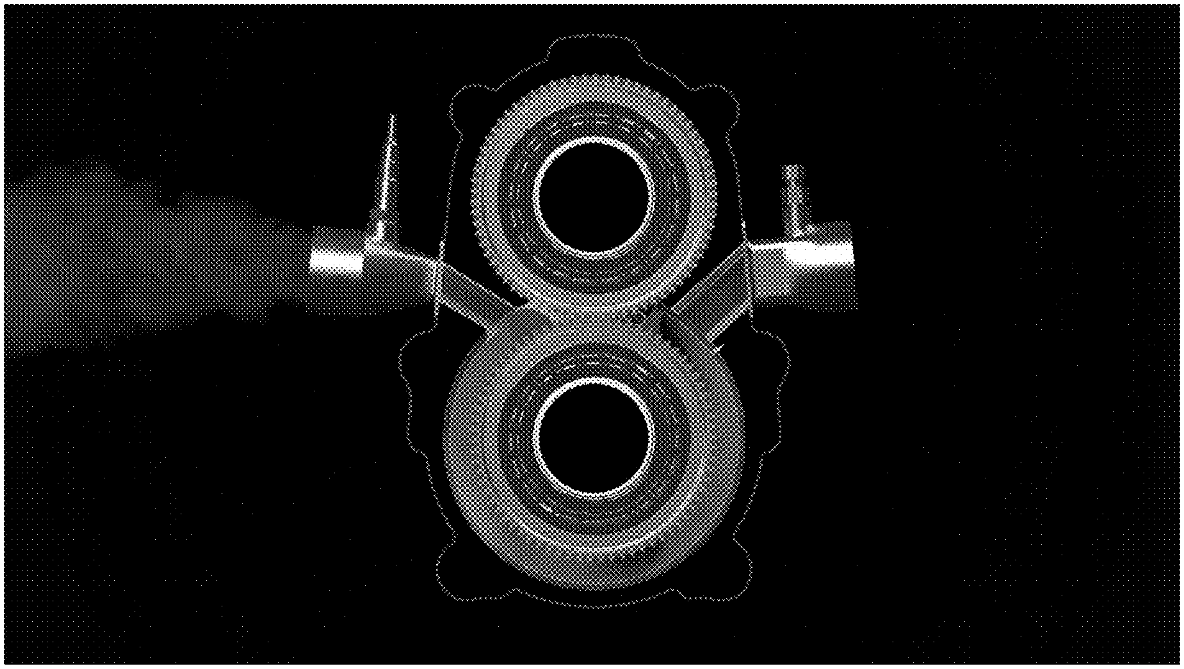
Figure 82:
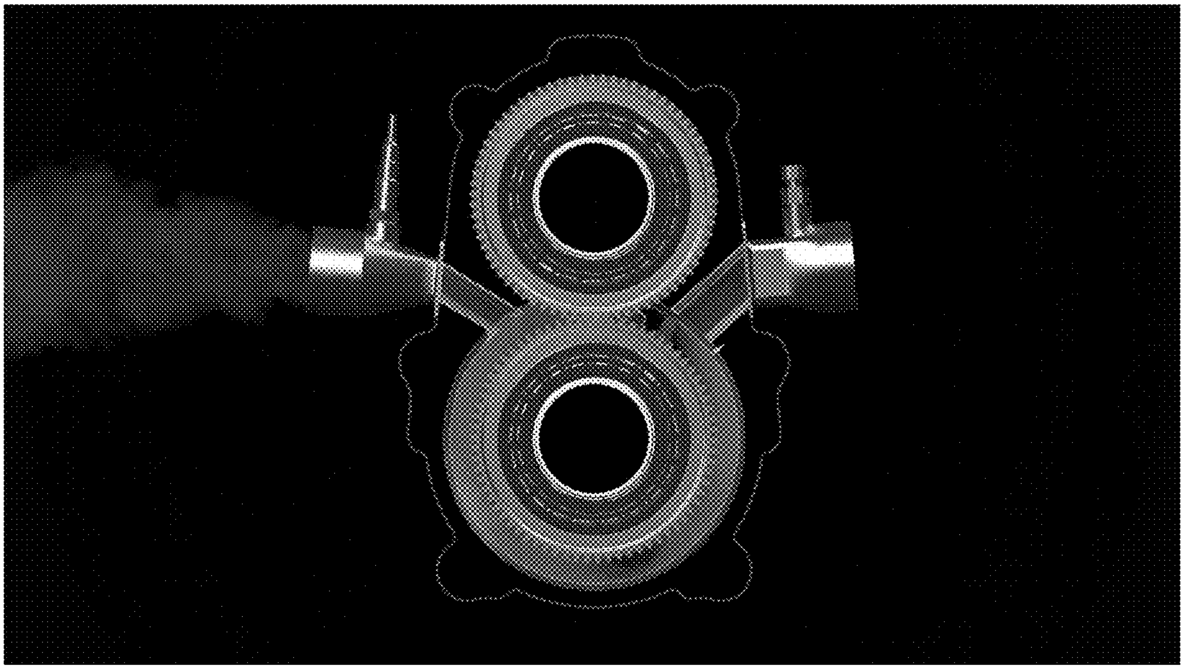
Figure 83:
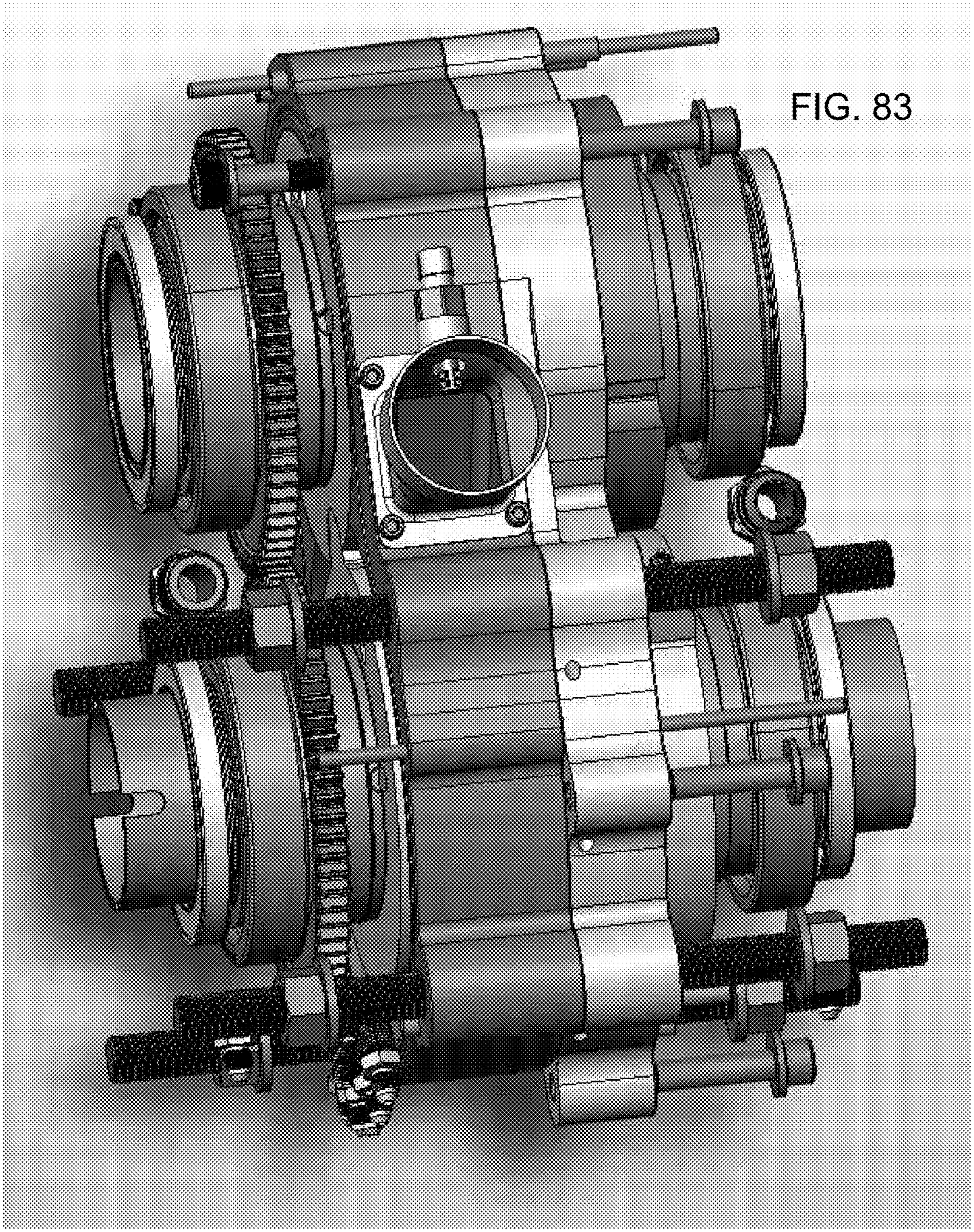
FIGS. 83-88 show various views of the engine of FIG. 1 with gear and bearing housing removed (as well as half of each of the compression and combustion housings) to better illustrate the gear and bearing assemblies relative to the compression and combustion rotors.
Figure 84:
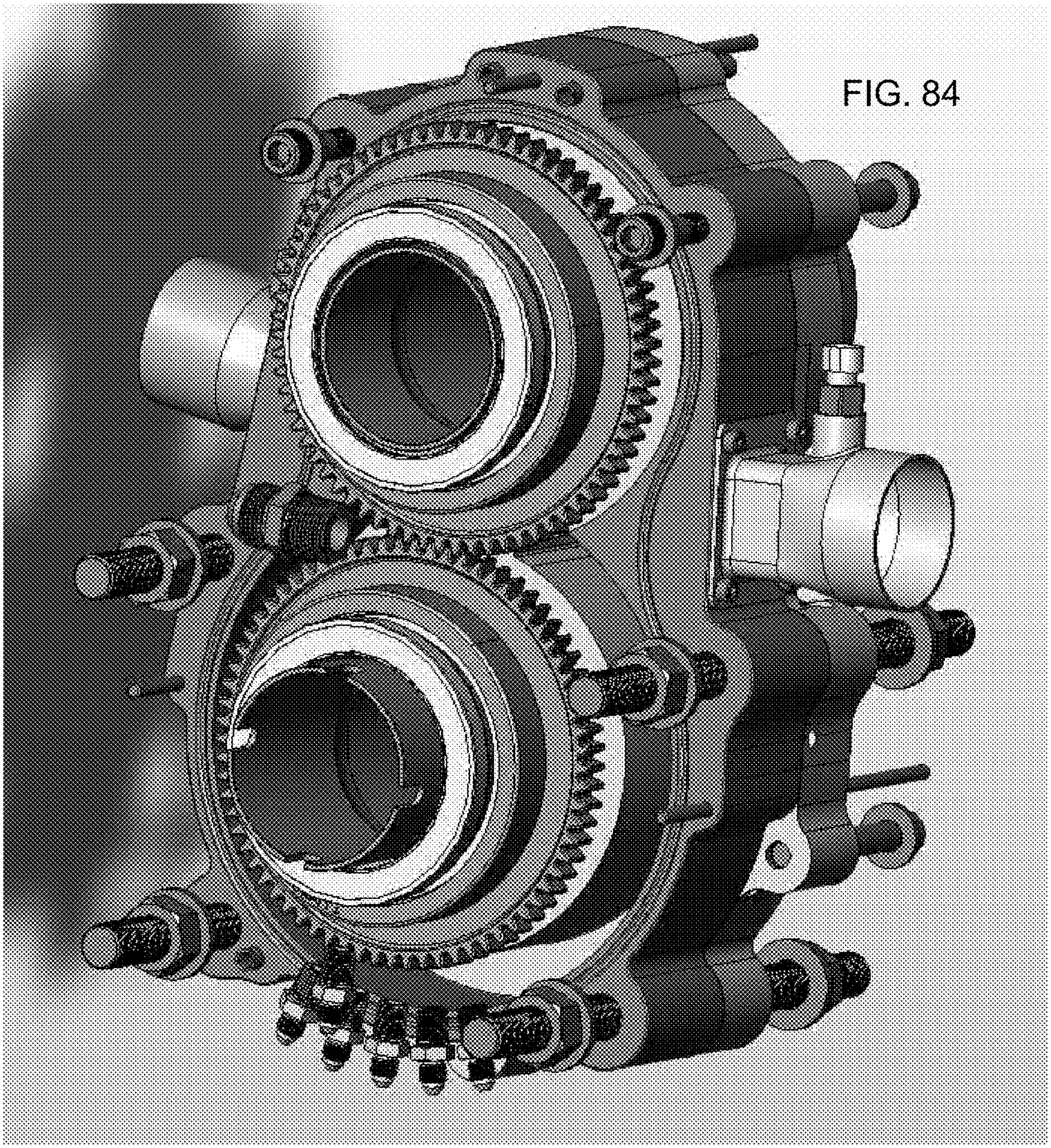
Figure 85:
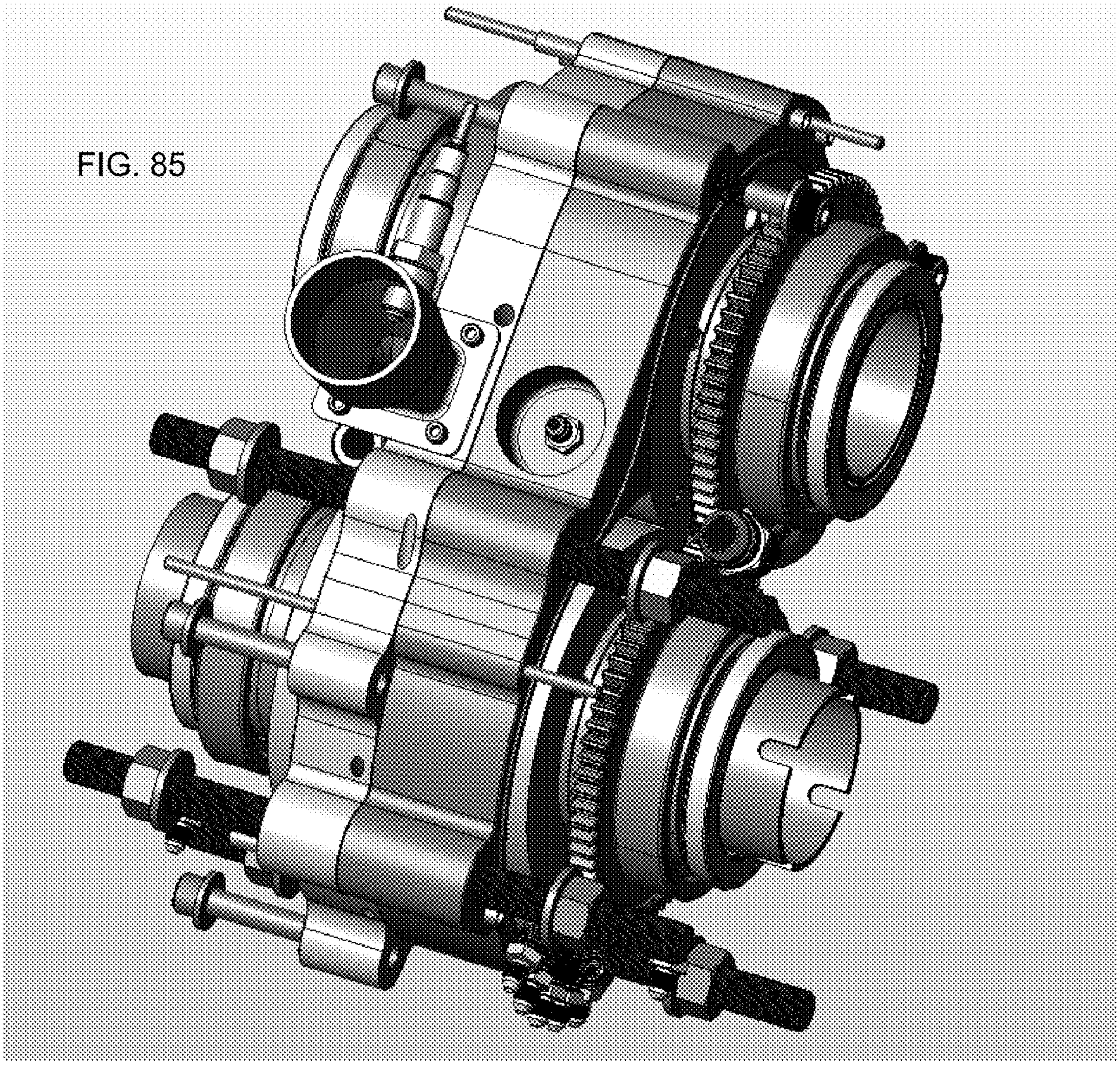
Figure 86:
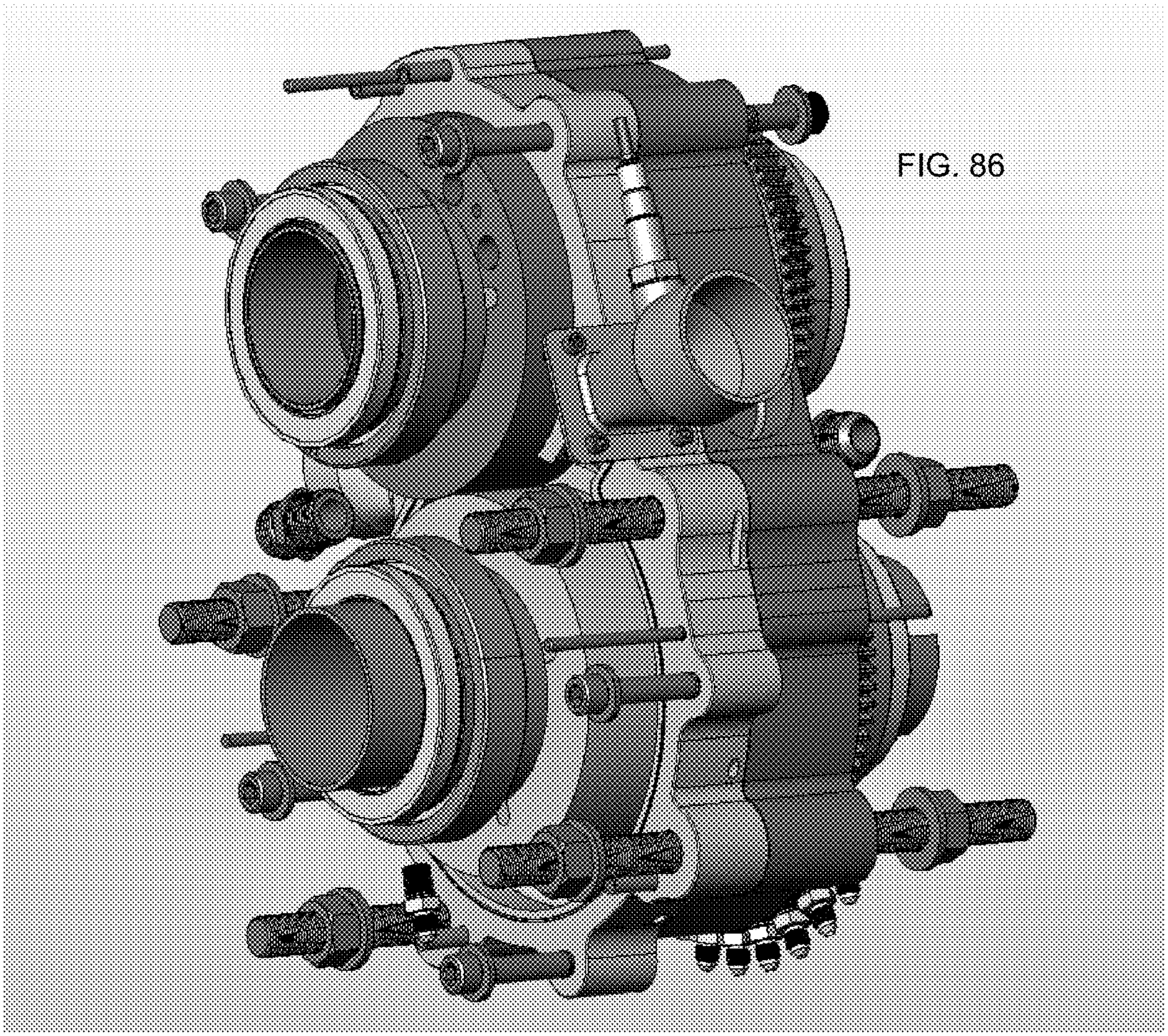
Figure 87:
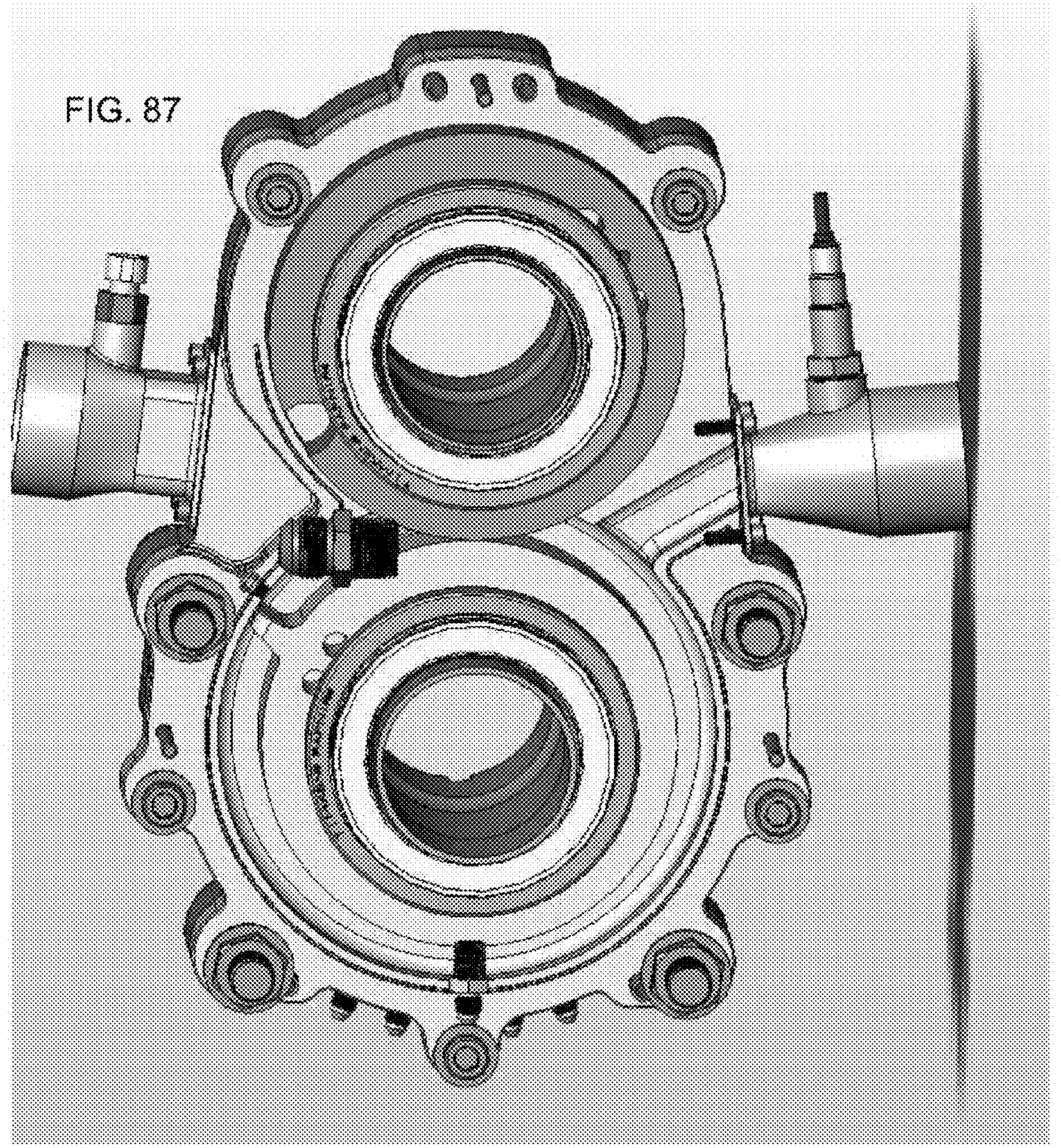
Figure 88:
Figure 89:
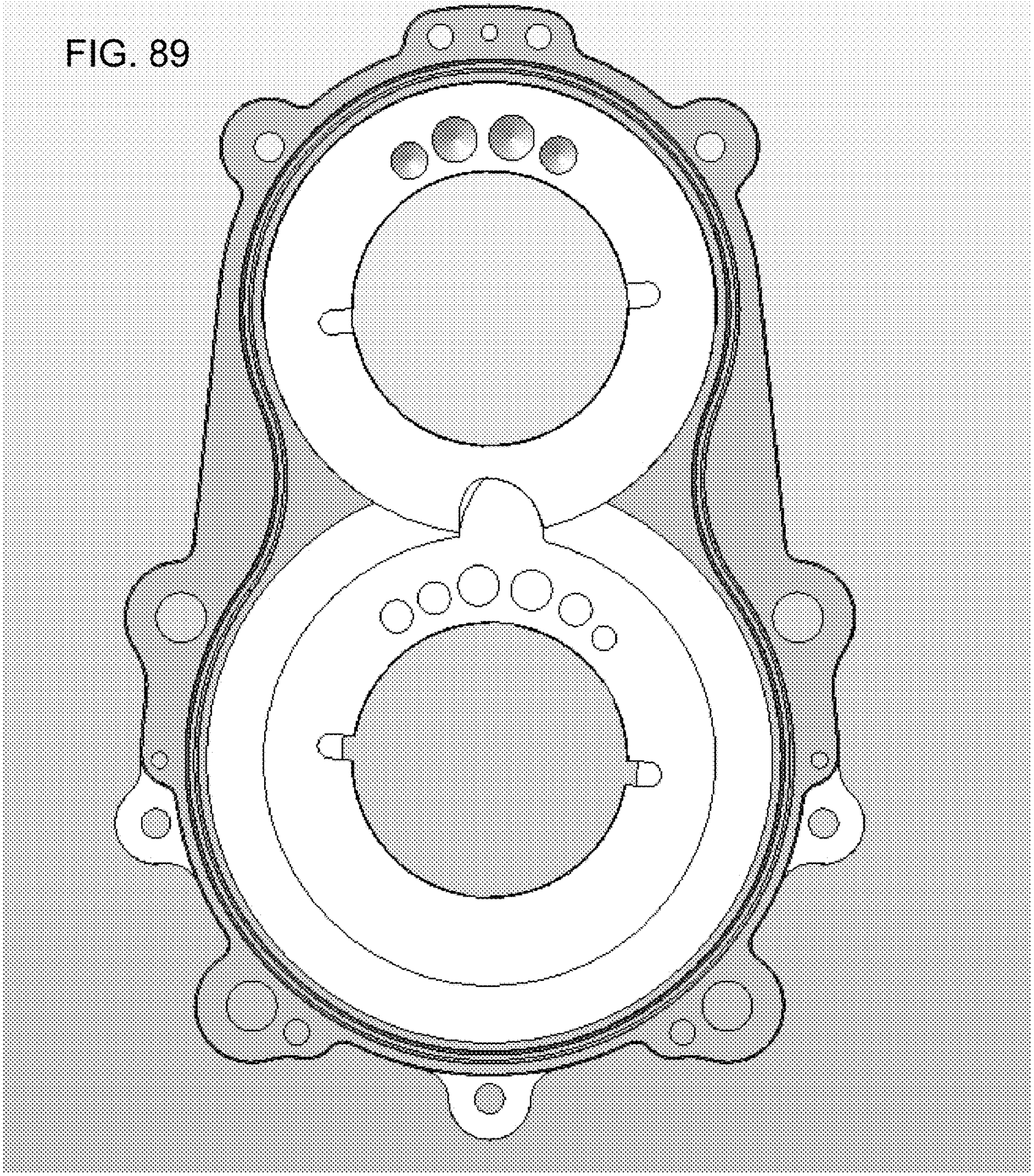
FIGS. 89 and 90 show left and right side, respectively (as seen from FIG. 1), views of the compression and combustion rotors, illustrating the relative timing of the combustion rotors relative to the compression rotors.
Figure 90:
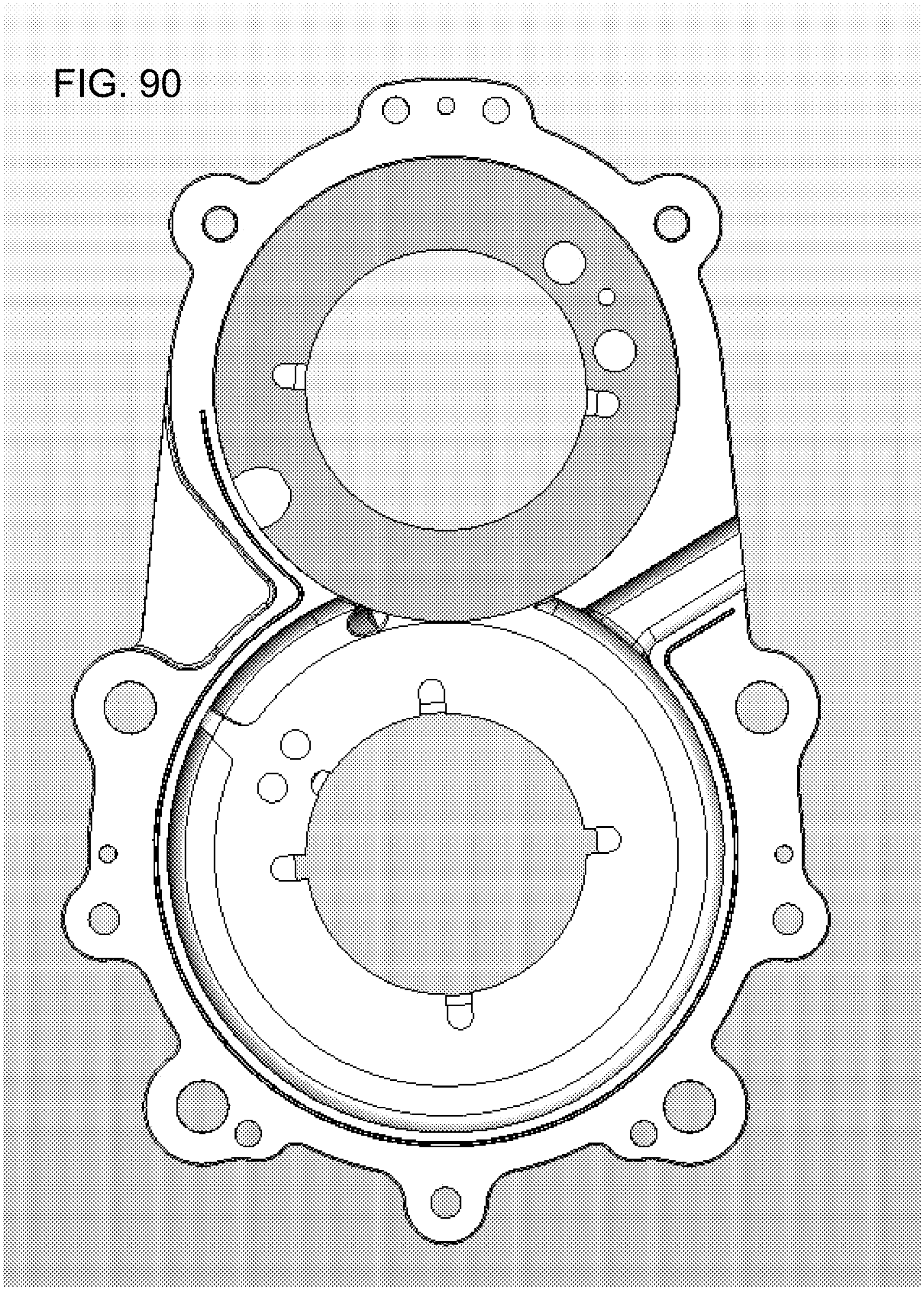

FIGS. 62-75 is a left side view showing the timing of the combustion rotors in relation to the compression rotors during several power cycles, according to an embodiment of the present invention. The compression rotors and light grey portion of the combustion assembly housing are shown as transparent to better illustrate the combustion rotors. FIG. 62 shows the combustion power rotor and the combustion isolation rotor during a combustion power cycle were the combustion power rotor male blade moving through the combustion housing with respect to the combustion power rotor. FIG. 63 shows a combustion power cycle as a male blade of the combustion power rotor moves during a combustion power cycle. FIGS. 64-67 shows the combustion power cycle as a male blade of a compression power rotor approaches a compression isolation rotor receptacle during a compression power stroke and in relation to the combustion power rotor and the combustion isolation rotor. FIG. 68 shows compressed fluid being transitioned from the compression housing into the compression isolation rotor receptacle and into the transition channel. FIGS. 69-70 shows the power stoke where the compressed fluid is transitioned from the compression assembly into the transition channel and then into combustion assembly. FIGS. 71-75 depicts the combustion assembly igniting a charge as a male blade of the combustion power rotor moves through the combustion housing during several power cycles.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

In addition to controlling the flow of fluid without the use of a rotary valve assembly, the structure of the embodiment shown herein of the inventive concept allows for the elimination of one of the bearings on the rear side (right/exhaust side as viewed from FIG. 1) of the engine compared to several embodiments shown in the Astron Engine Technology.

The embodiments of the inventive engine shown herein include less than 0.018% trap volume. As such, almost the entire volume of compressed fluid from the compression assembly is utilized in combustion.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and/or claimed herein. Consequently, the scope of the present invention is intended to be limited only by any claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are to be set forth in related claims.

It is also to be understood that any claims are intended to cover all of the generic and specific features of the invention herein described, and all statements of the scope of the invention which, as a matter of language, might be said to fall therebetween.

What is claimed is:

1. An internal combustion engine comprising:

a compression assembly that is configured to compress working fluid; and a combustion assembly that is configured to generate power from expansion of the working fluid, wherein a rotor of said compression assembly and/or a rotor of said combustion assembly controls the fluid flow out of the compression assembly and/or into the combustion assembly; and wherein an isolator rotor of said combustion assembly is used to control the fluid flow into said compression assembly.

2. The engine of claim 1, wherein the engine enables the ability to independently configure intake compression to power exhaust ratios during operation of the engine.

3. The engine of claim 1, wherein said combustion assembly comprises:

a combustion housing having an interior surface defining an interior area;

a power rotor positioned within the interior area of said combustion housing, said power rotor having a cylindrical exterior surface displaced from said interior surface of said combustion housing, thereby defining a combustion chamber; and a first expansion member attached to and extending from said exterior surface of said power rotor towards said interior surface of said combustion housing, thereby segmenting said combustion chamber into an expansion section and an exhaust section.

4. The engine of claim 1, wherein an isolator rotor of said compression assembly is used to control the fluid flow out of said compression assembly.

5. The engine of claim 1, wherein a combination of power and/or isolator rotors from said combustion and/or compression assemblies is used to control the fluid flow out of said compression assembly and/or into said combustion assembly.

6. The engine of claim 1, wherein water and/or other fluid is injected into an intake of the engine to help reduce temperatures during combustion.

7. The engine of claim 1, wherein steam is utilized within said compression and/or combustion assemblies for sealing and/or cooling purposes.

8. The engine of claim 1, wherein exhaust is recycled into an intake of the engine.

9. The engine of claim 8, wherein the engine utilizes hydrogen fuel, the engine further comprising an electrolyzer that recycles exhaust gases back to an intake to produce hydrogen from exhaust vapors to be used as fuel for the engine.

10. An internal combustion engine comprising:

a compression assembly that is configured to compress working fluid; and a combustion assembly that is configured to generate power from expansion of the working fluid, wherein a rotor of said compression assembly and/or a rotor of said combustion assembly controls the fluid flow out of the compression assembly and/or into the combustion assembly; and wherein steam is utilized within said compression and/or combustion assemblies for sealing and/or cooling purposes.

11. The engine of claim 10, wherein the engine enables the ability to independently configure intake compression to power exhaust ratios during operation of the engine.

12. The engine of claim 10, wherein said combustion assembly comprises:

a combustion housing having an interior surface defining an interior area;

a power rotor positioned within the interior area of said combustion housing, said power rotor having a cylindrical exterior surface displaced from said interior surface of said combustion housing, thereby defining a combustion chamber; and a first expansion member attached to and extending from said exterior surface of said power rotor towards said interior surface of said combustion housing, thereby segmenting said combustion chamber into an expansion section and an exhaust section.

13. The engine of claim 10, wherein an isolator rotor of said compression assembly is used to control the fluid flow out of said compression assembly and wherein an isolator rotor of said compression assembly is used to control the fluid flow out of said compression assembly.

14. The engine of claim 10, wherein a combination of power and/or isolator rotors from said combustion and/or compression assemblies is used to control the fluid flow out of said compression assembly and/or into said combustion assembly.

15. The engine of claim 10, wherein water and/or other fluid is injected into an intake of the engine to help reduce temperatures during combustion.

16. An internal combustion engine comprising:

a compression assembly that is configured to compress working fluid; and a combustion assembly that is configured to generate power from expansion of the working fluid, wherein a rotor of said compression assembly and/or a rotor of said combustion assembly controls the fluid flow out of the compression assembly and/or into the combustion assembly;

wherein exhaust is recycled into an intake of the engine; and wherein the engine utilizes hydrogen fuel, the engine further comprising an electrolyzer that recycles exhaust gases back to an intake to produce hydrogen from exhaust vapors to be used as fuel for the engine.

17. The engine of claim 16, wherein the engine enables the ability to independently configure intake compression to power exhaust ratios during operation of the engine.

18. The engine of claim 16, wherein said combustion assembly comprises:

a combustion housing having an interior surface defining an interior area;

a power rotor positioned within the interior area of said combustion housing, said power rotor having a cylindrical exterior surface displaced from said interior surface of said combustion housing, thereby defining a combustion chamber; and a first expansion member attached to and extending from said exterior surface of said power rotor towards said interior surface of said combustion housing, thereby segmenting said combustion chamber into an expansion section and an exhaust section.

19. The engine of claim 16, wherein a combination of power and/or isolator rotors from said combustion and/or compression assemblies is used to control the fluid flow out of said compression assembly and/or into said combustion assembly.

20. The engine of claim 16, wherein water and/or other fluid is injected into an intake of the engine to help reduce temperatures during combustion.

* * * * *